United States Patent
Roth et al.

(10) Patent No.: US 12,462,377 B1
(45) Date of Patent: Nov. 4, 2025

(54) OBJECT DETECTION USING ONE OR MORE NEURAL NETWORKS

(71) Applicant: Nvidia Corporation, Santa Clara, CA (US)

(72) Inventors: Holger Roth, Rockville, MD (US); Ling Zhang, Rockville, MD (US); Dong Yang, North Bethesda, MD (US); Fausto Milletari, Munich (DE); Ziyue Xu, Reston, VA (US); Xiaosong Wang, Rockville, MD (US); Daguang Xu, Potomac, MD (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/540,694

(22) Filed: Aug. 14, 2019

(51) Int. Cl.
  *G06T 7/00* (2017.01)
  *G06N 3/045* (2023.01)
  *G06N 3/08* (2023.01)
  *G06T 7/11* (2017.01)

(52) U.S. Cl.
  CPC ......... *G06T 7/0012* (2013.01); *G06N 3/045* (2023.01); *G06N 3/08* (2013.01); *G06T 7/11* (2017.01); *G06T 2207/20081* (2013.01); *G06T 2207/20084* (2013.01)

(58) Field of Classification Search
  CPC ....... G06T 7/0012; G06T 7/11; G06N 3/0454; G06N 3/08
  See application file for complete search history.

(56) References Cited

U.S. PATENT DOCUMENTS

| | | | |
|---|---|---|---|
| 10,713,794 B1* | 7/2020 | He | G06N 3/0454 |
| 2006/0269165 A1* | 11/2006 | Viswanathan | G06T 7/33 |
| | | | 382/293 |
| 2007/0025616 A1* | 2/2007 | Grady | G06V 10/267 |
| | | | 382/173 |
| 2011/0243443 A1* | 10/2011 | Varekamp | G06T 7/12 |
| | | | 382/173 |
| 2016/0117836 A1* | 4/2016 | Dubrovina | G06T 7/60 |
| | | | 382/173 |
| 2016/0300343 A1* | 10/2016 | Gazit | G16H 50/50 |
| 2017/0116497 A1* | 4/2017 | Georgescu | A61B 8/0883 |
| 2019/0236394 A1* | 8/2019 | Price | G06N 3/084 |
| 2019/0294970 A1* | 9/2019 | Fidler | G06V 10/454 |
| 2019/0311202 A1* | 10/2019 | Lee | G06K 9/6256 |
| 2020/0043171 A1* | 2/2020 | Laradji | G06K 9/6257 |
| 2020/0167930 A1* | 5/2020 | Wang | G06N 3/08 |
| 2020/0202533 A1* | 6/2020 | Cohen | G06T 3/4046 |
| 2020/0226748 A1* | 7/2020 | Kaufman | G06N 20/20 |

(Continued)

OTHER PUBLICATIONS

Yigit B. Can, Krishna Chaitanya, Basil Mustafa, Lisa M. Koch, Ender Konukoglu, Christian F. Baumgartner; Learning to Segment Medical Images with Scribble-Supervision Alone; arXiv:1807.04668v1; Jul. 12, 2018.

(Continued)

*Primary Examiner* — David Bilodeau
(74) *Attorney, Agent, or Firm* — Davis Wright Tremaine LLP

(57) ABSTRACT

Apparatuses, systems, and techniques to detect object in images including digital representations of those objects. In at least one embodiment, one or more objects are detected in an image based, at least in part, on points corresponding to a surface of one or more objects.

32 Claims, 45 Drawing Sheets

(56) References Cited

U.S. PATENT DOCUMENTS

| | | | |
|---|---|---|---|
| 2021/0027471 A1* | 1/2021 | Cohen | G06T 7/90 |
| 2021/0201066 A1* | 7/2021 | Cui | G06K 9/6256 |
| 2021/0233247 A1* | 7/2021 | Cao | G06N 3/0454 |
| 2021/0366123 A1* | 11/2021 | Wang | G06V 10/82 |

OTHER PUBLICATIONS

Leo Grady; Random Walks for Image Segmentation; IEEE Transactions on Pattern Analysis and Machine Intelligence, vol. 28, No. 11, Nov. 2006.

Martin Rajchl, Matthew C. H. Lee, Ozan Oktay, Konstantinos Kamnitsas, Jonathan Passerat-Palmbach, Wenjia Bai, Mellisa Damodaram, Mary a Rutherford, Joseph V Hajnal, Bernhard Kainz, Daniel Rueckert; DeepCut: Object Segmentation from Bounding Box Annotations using Convolutional Neural Networks; arXiv:1605.07866v2; Jun. 5, 2016.

Jinzheng Cai, Youbao Tang, Le Lu, Adam P. Harrison, Ke Yan, Jing Xiao, Lin Yang, Ronald M. Summers; Accurate Weakly Supervised Deep Lesion Segmentation on CT Scans: Self-Paced 3D Mask Generation from Recist; arXiv:1801.08614v1; Jan. 25, 2018.

K.-K. Maninis, S. Caelles, J. Pont-Tuset, L. Van Gool; Deep Extreme Cut: From Extreme Points to Object Segmentation; Computer Vision Foundation; pp. 616-625, Nov. 24, 2017.

Devaraj et al., "Use of Volumetry for Lung Nodule Management: Theory and Practice," Radiology, 284(3): 2017, 15 pages.

Dijkstra, "A Note on Two Problems in Connexion with Graphs," Numerische Mathematik, 1959, 3 pages.

IEEE, "IEEE Standard 754-2008 (Revision of IEEE Standard 754-1985): IEEE Standard for Floating-Point Arithmetic," Aug. 29, 2008, 70 pages.

Kervadec et al., "Constrained-CNN Losses for Weakly Supervised Segmentation," Medical Image Analysis, 2019, 10 pages.

Liu et al., "3D Anisotropic Hybrid Network: Transferring Convolutional Features from 2D Images to 3D Anisotropic Volumes," International Conference on Medical Image Computing and Computer-Assisted Intervention, 2018, 8 pages.

Long et al., "Fully Convolutional Networks for Semantic Segmentation," CVPR, 2015, 10 pages.

Milletari et al., "V-net: Fully convolutional neural networks for volumetric medical image segmentation," 2016 Fourth International Conference on 3D Vision (3DV), Oct. 25, 2016, 11 pages.

Papadopoulos et al., "Extreme Clicking for Efficient Object Annotation," Proceedings of the IEEE International Conference on Computer Vision, 2017, 10 pages.

Ronneberger et al., "U-net: Convolutional networks for biomedical image segmentation," International Conference on Medical Image Computing and Computer-Assisted Intervention, Oct. 5, 2015, 8 pages.

Roth et al., "Spatial Aggregation of Holistically-nested Convolutional Neural Networks for Automated Pancreas Localization and Segmentation," Medical Image Analysis 45, 2018, 14 pages.

Sakinis et al., "Interactive Segmentation of Medical Images Through Fully Convolutional Neural Networks," Mar. 19, 2019, 10 pages.

Wang et al., "DeeplGeos: A Deep Interactive Geodesic Framework for Medical Image Segmentation," IEEE Transactions on Pattern Analysis and Machine Intelligence, Jul. 4, 2017, 14 pages.

Wang et al., "Interactive Medical Image Segmentation using Deep Learning with Image-Specific Fine Tuning," IEEE transactions on medical imaging, 37(7): Oct. 11, 2017, 11 pages.

Zhang et al., "Self-learning to Detect and Segment Cysts in Lung CT Images without Manual Annotation," International Symposium on Biomedical Imaging, Jan. 25, 2018, 4 pages.

Çiçek et al., "3D U-Net: Learning Dense Volumetric Segmentation from Sparse Annotation," International Conference on Medical Image Computing and Computer-Assisted Intervention, 2016, 8 pages.

* cited by examiner

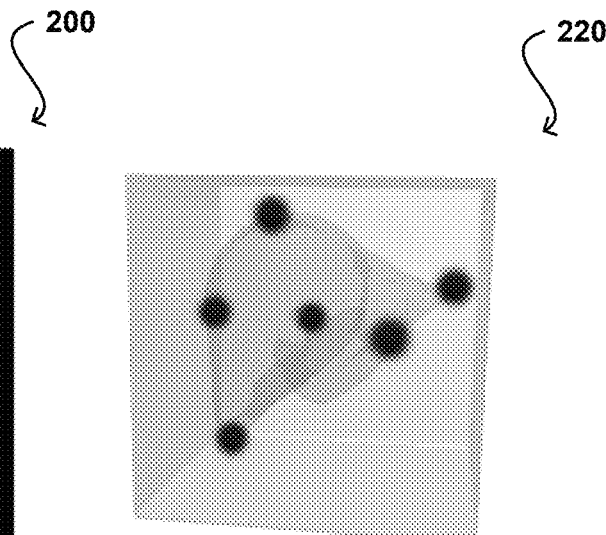
FIG. 2A  FIG. 2B
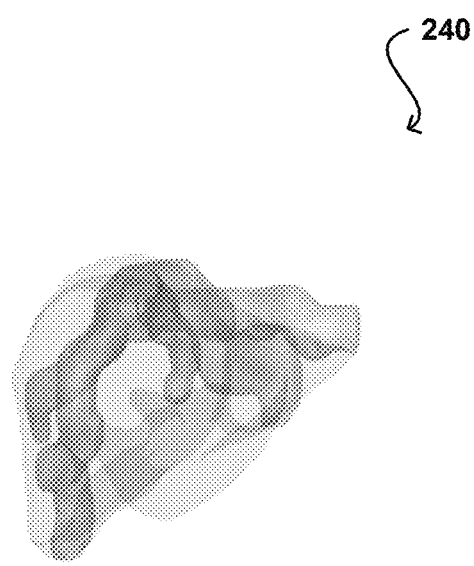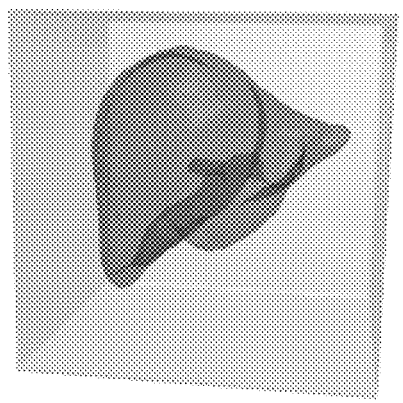
FIG. 2C  FIG. 2D

OBJECT DETECTION USING ONE OR MORE NEURAL NETWORKS

FIELD

At least one embodiment pertains to processing resources used to perform and facilitate artificial intelligence. For example, at least one embodiment, pertains to processors or computing systems used to train neural networks according to various novel techniques described herein.

BACKGROUND

Advances in computer technology have resulted in improved capabilities in object identification and analysis. Machine learning has been used as a tool for detecting objects in image data for purposes of such analysis. In order to train machine learning, however, various approaches require a significant amount of labeled training data, where training data includes images with full annotation information for various objects represented in an image. Creating this training data can be a long and complicated process, which may be too expensive for various uses and may result in an insufficient amount of training data.

BRIEF DESCRIPTION OF THE DRAWINGS

Various embodiments in accordance with the present disclosure will be described with reference to the drawings, in which:

FIGS. 2A, 2B, 2C, and 2D illustrate representations of representations of an object of interest that can be identified, according to at least one embodiment;

DETAILED DESCRIPTION

Figure 1A:
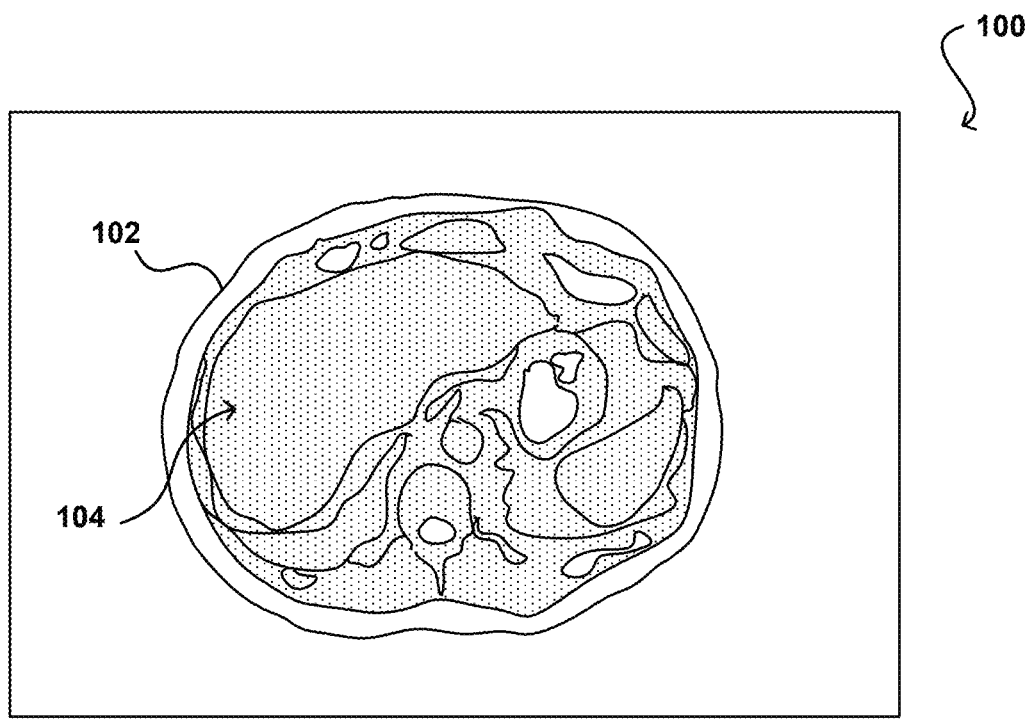
FIGS. 1A and 1B illustrate images that can be processed using one or more neural networks, according to at least one embodiment.

In at least one embodiment, an image 100 illustrated in FIG. 1A can be analyzed. In at least one embodiment, image 100 includes representations of internal organs in a cross-sectional view of a torso 102 of a human patient, as may be included in an image of magnetic resonance imaging (MRI) or computerized tomography (CT) data. In at least one embodiment, although a two-dimensional representation is illustrated, image data may be three-dimensional. In at least one embodiment, image 100 includes a representation of an object 104 of interest, in this case a human liver to be analyzed. In at least one embodiment, in order to analyze a liver, such as to measure dimensions, shape, or other such aspects, a portion of an image corresponding to a liver is determined.

Figure 1B:
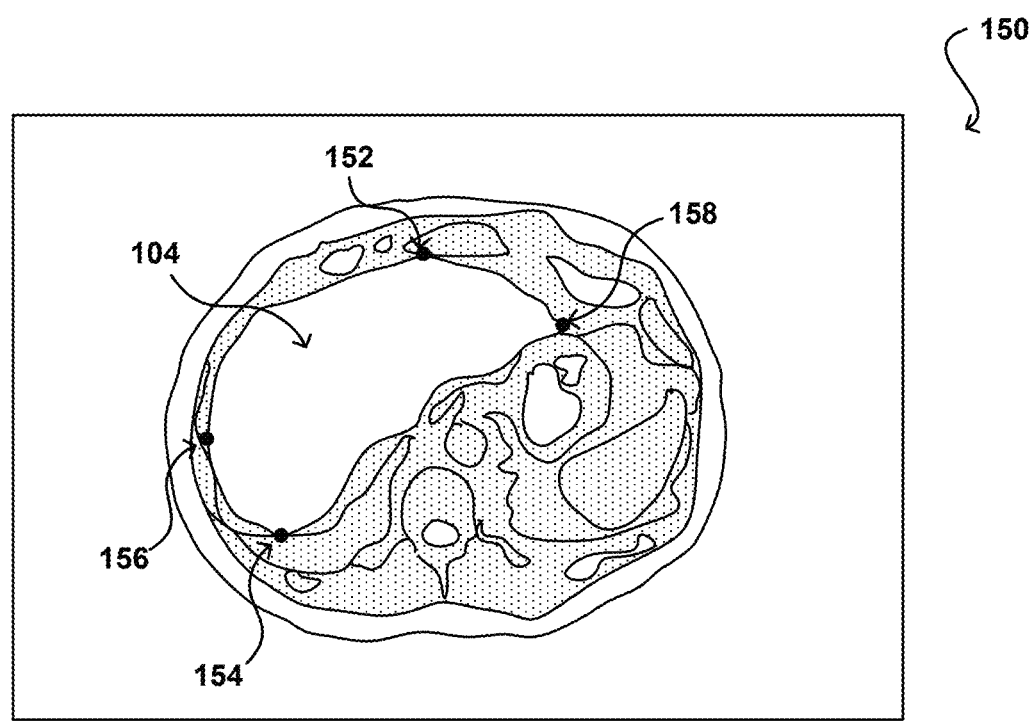

In at least one embodiment, training data is generated without manual annotations to train machine learning for segmentation. In at least one embodiment, a user can indicate a set of points corresponding to a surface of an object of interest in an image. In at least one embodiment, image 150 of FIG. 1B has extreme points indicated for an object. In at least one embodiment, this includes a top-most point 152, a bottom-most point 154, a left-most point 156, and a right-most point 158. In at least one embodiment, if image 150 were in three dimensions, these points could include a front-most and back-most point (or posterior and anterior, etc.) as well. In at least one embodiment, additional points may be included. In at least one embodiment, these points are referred to "extreme" points, as they indicate at least extreme positions of a representation of an object 104 along certain dimensions. In at least one embodiment, these extreme points can be used to determine segmentation for object 104.

In at least one embodiment, segmentation is provided that can be particularly advantageous for applications or use cases, as may correspond to processing and analyses of medical image data. In at least one embodiment, minimal user interaction is required, in a form of extreme point clicks, in order to train a segmentation model that can, in turn, be used to quickly annotate medical images. In at least one embodiment, extreme points can be used in each dimension of a medical image to constrain an initial segmentation based on an algorithm such as a random walker algorithm. In at least one embodiment, an initial segmentation can be used as a weak supervisory signal to train a fully convolutional network that can segment an organ of interest based on provided user clicks or other such point indications. In at least one embodiment, network inferences can be refined through several iterations of training and prediction using this weakly annotated data. In at least one embodiment, such an approach can be used to quickly generate new training datasets for development of new machine learning and deep learning-based models for medical image analysis.

In at least one embodiment, segmentation is achieved using user-provided clicks on extreme points of an object of interest. In at least one embodiment, an algorithm for weakly-supervised segmentation from extreme points can be divided into various steps, including extreme point selection and initial segmentation from scribbles via a random walker algorithm. In at least one embodiment, additional steps can include performing segmentation via a deep fully convolutional network, as well as refinement using a random walker algorithm. In at least one embodiment these last three steps can be performed iteratively until convergence. In at least one embodiment, convergence corresponds to differences between two consecutive rounds of predictions. In at least one embodiment, defining extreme points on an organ surface, such as illustrated in image 200 of FIG. 2A, can allow extraction of a bounding box around an organ (plus some padding). In at least one embodiment, bounding box selection can minimize an amount of image content that a 3D network has to analyze. In at least one embodiment, extreme points provide information beyond coordinates to a segmentation model. In at least one embodiment, these points can reside on an object surface and can be modeled as an additional input channel together with image intensities. In at least one embodiment, this extra channel includes 3D Gaussians G centered on each point location clicked by a user.

In at least one embodiment, in order to make use of extreme point clicks as a weak supervision signal, these clicks or points, as illustrated in image 220 of FIG. 2B in three dimensions, can be turned into a probability map $\hat{Y}$ that can act as a pseudo-dense label map for driving a 3D fully-connected network to learn a segmentation task. In at least one embodiment, and based at least in part on an initial set of extreme points, a set of foreground and background scribbles can be created that function as input seeds for a random walker algorithm. In at least one embodiment, foreground scribbles can be generated from extreme points as illustrated in image 240 of FIG. 2C. In at least one embodiment, a computation of Dijkstra's shortest path can be performed between each extreme point pair along each image dimension, where a distance between neighboring voxels by gradient magnitude can be modeled. In at least one embodiment, a shortest path can be seen as an approximation of a geodesic distance between two extreme points in each dimension. In at least one embodiment, foreground scribbles can be used as input seeds to a random walker algorithm. In at least one embodiment, other algorithms can be used, as may correspond to an image cut algorithm. In at least one embodiment, in order to increase a number of foreground seeds, each path can be dilated with a 3D ball structure element of $r_{foreground}=2$. In at least one embodiment, background seeds can be defined as a dilated version of input scribbles. In at least one embodiment, while an amount of dilation can depend on a size of an organ of interest, a ball structure element of radius $r_{background}=30$ can be used for dilation, which can achieve good initial seeds for organs such as a spleen or liver.

In at least one embodiment, a random walker algorithm can be used to generate an initial prediction map $\hat{Y}$ based on background $s_0$ and foreground $s_1$ scribbles described above. In at least one embodiment, a random walker algorithm can solve a diffusion equation between voxels defined as source and sink as defined by scribbles S. In at least one embodiment, a 3D volume is defined as a graph G(E,V) with edges $e \in E$ and vertices $v \in V$. In at least one embodiment, an edge between two vertices $v_i$ and $v_j$ can be denoted as $e_{ij}$ and can be assigned a weight $w_{ij}$ based at least in part on image intensity gradients. In at least one embodiment, a degree of a given vertex can be given by $d_i = \Sigma w_{ij}$. In at least one embodiment, a diffusion equation can be solved in order to get a probability $p(w|x)=x_j^w$ for each vertex $v_i$ to belong to foreground class $\omega_1$.

In at least one embodiment, given all pairs of images X and pseudo labels $\hat{Y}$, a fully convolutional neural network can be trained to segment a given foreground class, with P(X)=f(X). In at least one embodiment, a network architecture can utilize an encoder-decoder network utilizing anisotropic (3×3×1) kernels in an encoder path, in order to make use of pre-trained weights from 2D computer vision tasks. In at least one embodiment, this process can initialize from pre-trained weights using an appropriate encoder branch. In at least one embodiment, while initial weights are learned from 2D, these convolutions can be applied in a full 3D fashion throughout a network, allowing it to efficiently learn 3D features from an image. In at least one embodiment a Dice loss can be used, as has been established as an objective function of choice for medical image segmentation tasks. In at least one embodiment, its properties allow automatic scaling to unbalanced labeling problems. In at least one embodiment, it also naturally adapts to comparing probability maps without any modifications to an original formulation.

Figure 3:
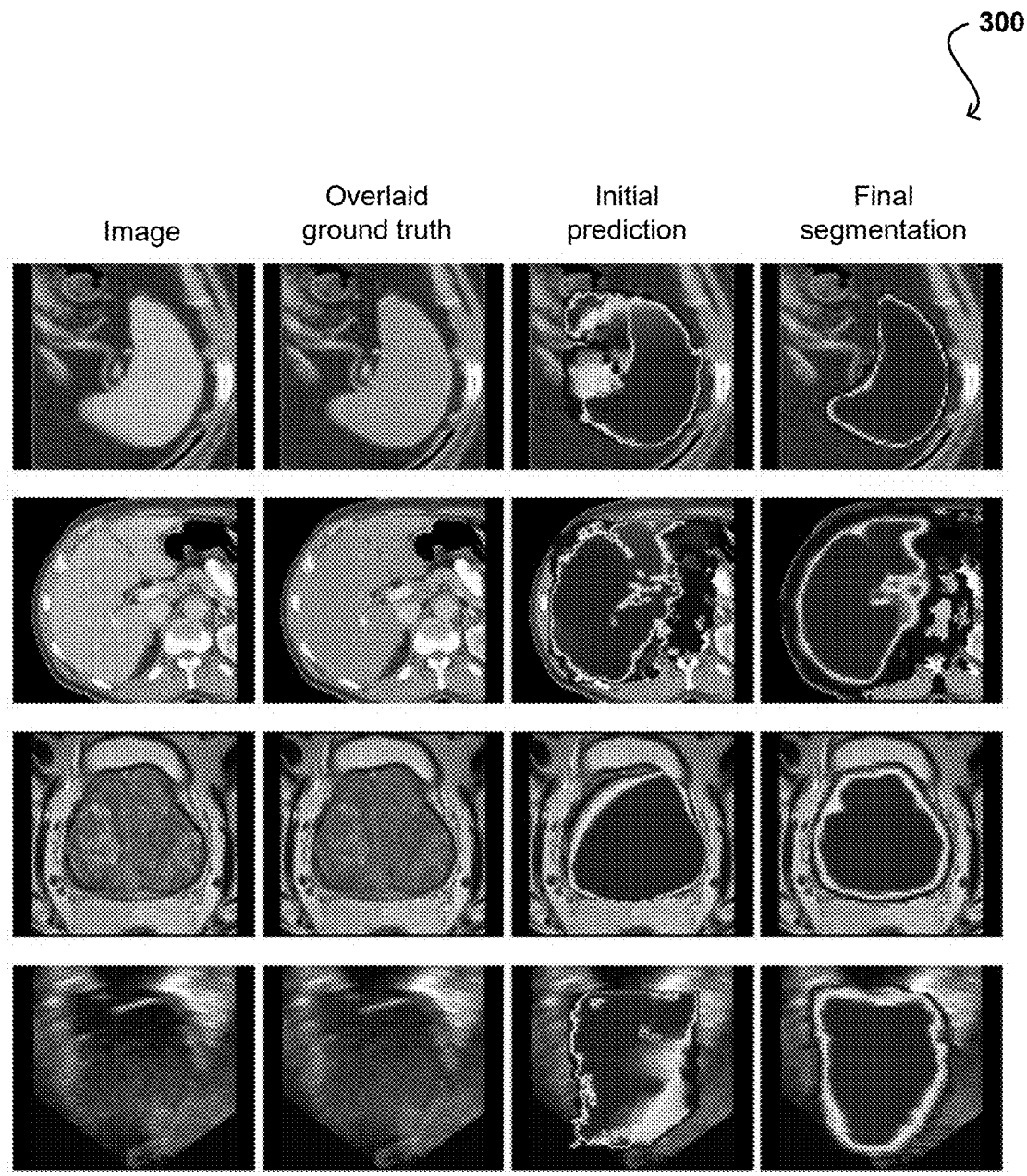
FIG. 3 illustrates images that can be analyzed or generated, according to at least one embodiment.

In at least one embodiment, a segmentation approach can stop learning after segmentation network f above is trained on pseudo labels Y. In at least one embodiment, an additional refinement step by an additional random walker segmentation as described above can, however, be very beneficial to convergence of a weakly-supervised segmentation approach. In at least one embodiment, in order to increase an amount of refinement a random walker can bring to predictions of a network, an area of uncertainty can be added by eroding foreground prediction P(X)>=0.5 and eroding background P(X)<0.5 both with a ball structure element of radius $r_{randomwalker}=4$ in some use cases. In at least one embodiment, this allows a random walker to produce new predictions around a boundary of a foreground object that differ from previous 3D fully-connected network predictions and, in turn, help a next iteration to learn new features from a same set of training images, and not to get stuck in a local optimum. In at least one embodiment that does not utilize this step, a weakly-supervised segmentation framework may become unstable and may not easily converge to a satisfying performance. In at least one embodiment, a set of images 300 as illustrated in FIG. 3 can be input for inferencing, including segmentations that can be inferred using a neural network trained as discussed herein. In at least one embodiment, these images include an initial prediction from an image detection branch, as well as a final segmentation after refinement, which as illustrated much more accurately represents a shape of an object of interest for each input image. In at least one embodiment, a second column (from left) indicates ground truth segmentations for objects represented in these images, as may have been generated manually.

Figure 4A:
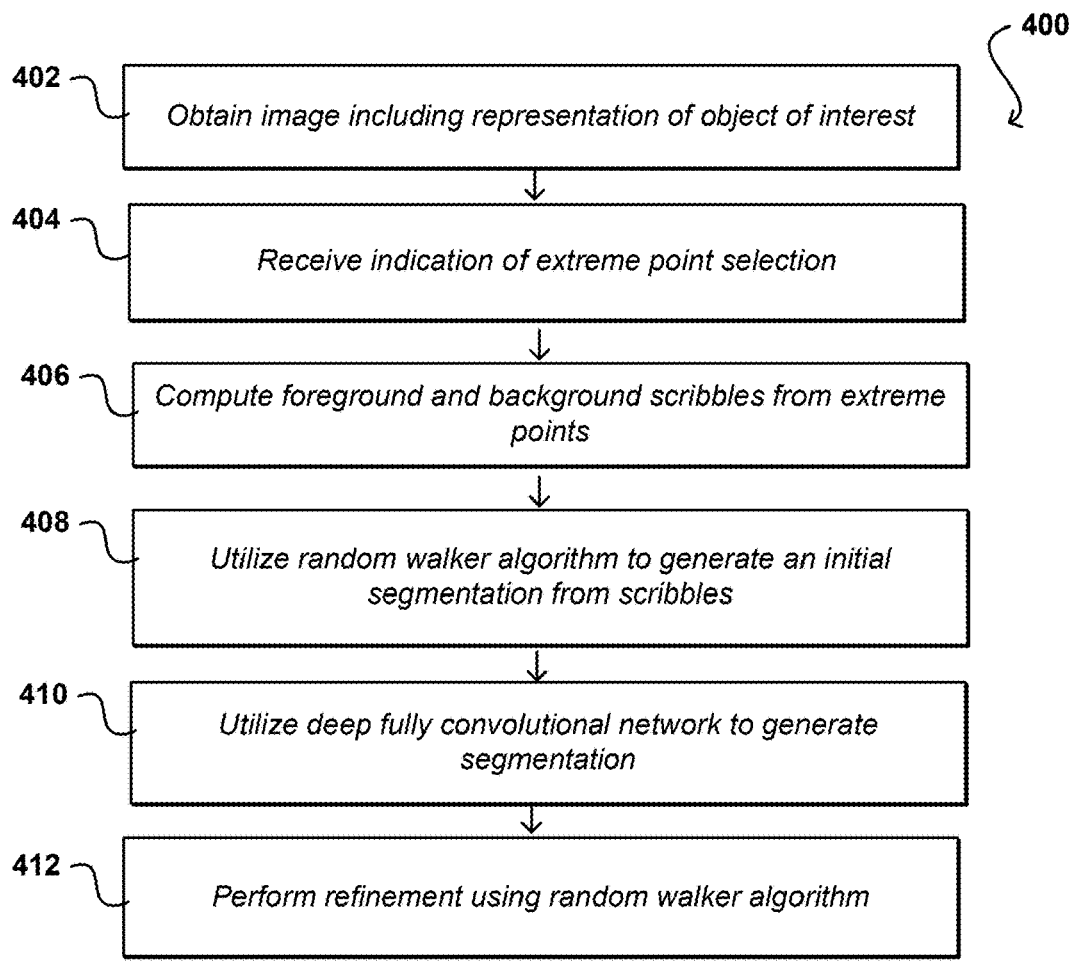
FIGS. 4A and 4B illustrate portions of a process for generating a segmentation, according to at least one embodiment.

In at least one embodiment, a process 400 illustrated in FIG. 4 can be used for training a neural network, such as a fully convolutional neural network, to infer object detections and/or segmentations. In at least one embodiment, an image is obtained 402 that includes a representation of an object of interest. In at least one embodiment, this can include two-dimensional or three-dimensional image data including a representation of an object, such as an organ represented in a medical image. In at least one embodiment, along with an image, an indication of selected extreme points can be received 404. In at least one embodiment, this can be a result of a user viewing an image through an interface and clicking on, or otherwise indicating, pixel or voxel locations that correspond to extreme points as discussed herein. In at least one embodiment, additional points on a surface may be indicated as well. In at least one embodiment, this indication may include a set of pixel coordinates corresponding to extreme point selection. In at least one embodiment these extreme points can be used to compute 406 foreground and background scribbles. In at least one embodiment an algorithm, such as a random walker algorithm, can be utilized 408 to generate an initial segmentation of an object of interest from these scribbles. In at least one embodiment, an initial segmentation can be provided, along with data for extreme points, as input to a deep fully convolutional network. In at least one embodiment, a network can utilize 410 this input to generate a segmentation for an object of interest. In at least one embodiment, refinement can be performed 412 using a random walker algorithm. In at least one embodiment, some of these steps can be performed iteratively until an appropriate convergence or training criterion is satisfied.

Figure 4B:
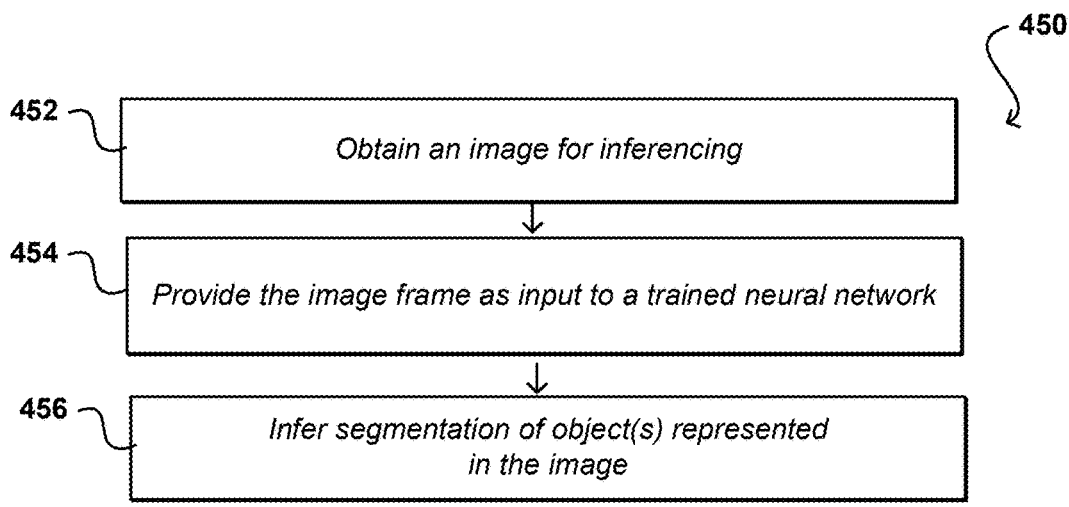

In at least one embodiment, a process 450 illustrated in FIG. 4B can be used to generate an object segmentation for an image using such a trained model. In at least one embodiment, an image or video frame is obtained 452 that is to be used for inferencing. In at least one embodiment, an image is provided 454 as input to a trained model or neural network. In at least one embodiment, this trained model can process data, such as an image, and infer 456 a segmentation for at least one object represented in this image.

Figure 5:
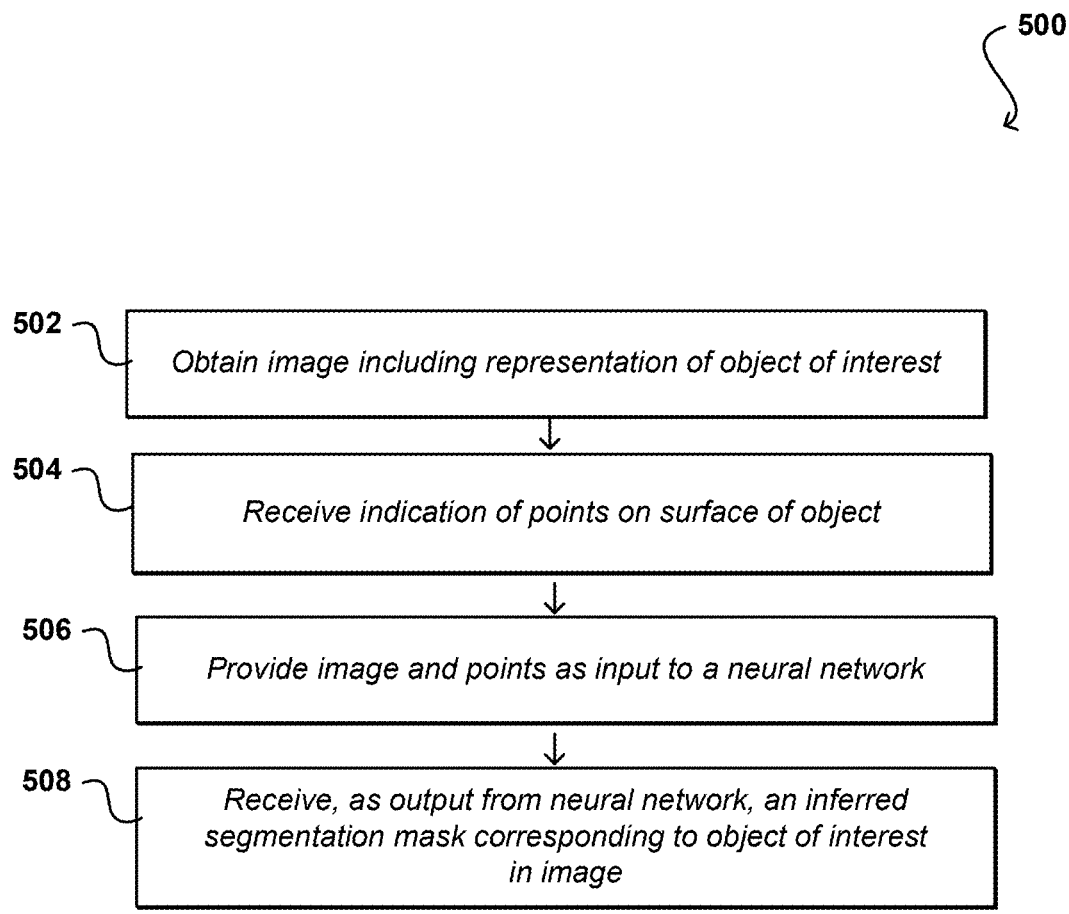
FIG. 5 illustrates a segmentation process, according to at least one embodiment.

In at least one embodiment, a process 500 illustrated in FIG. 5 generates a segmentation for an object represented in an image. In at least one embodiment, an image is obtained 502 that includes a representation of an object of interest. In at least one embodiment, an indication of points on a surface of an object of interest is received 504. In at least one embodiment, this image and point data are provided 506 as input to a network, such as a deep convolutional network. In at least one embodiment, an inferred segmentation mask is received 508 as output from a neural network that corresponds to an object of interest represented in an image.

In at least one embodiment a novel loss function is utilized. In at least one embodiment, extreme points selected by a user for weak annotation can, in addition to being used for generating initial scribbles, be used as an additional loss function during weakly-supervised training of deep neural network. In at least one embodiment, a standard loss used for medical image segmentation is a Dice loss, as given by:

$$L_{Dice} = 1 - \frac{2\sum_{i=1}^{N} y_i \hat{y}_i}{\sum_{i=1}^{N} y_i^2 + \sum_{i=1}^{N} \hat{y}_i^2}$$

In at least one embodiment, an additional constraint is added to deep learning training, making use of extreme points a user has already selected. In at least one embodiment, this new loss $L_{pointdistance}$ penalizes a distance between a boundary of a model's predicted segmentation mask P=f(X) and locations of extreme points. In at least one embodiment, B convolution operations are used in order to enhance a boundary b(P) of a prediction:

$$b_0(P) = \text{conv}_B(\ldots (\text{conv}_3(\text{conv}_2(\text{conv}_1(P)))) \ldots)$$

$$b_1(P) = (b_0(P) - 0.5)^2$$

$$b(P) = e^{-b_1(P)}$$

In at least one embodiment, a convolutional kernel in each conv operation is set to be constant n×n×n kernel with each element being $1/n^3$. In at least one embodiment, a point distance loss is computed between prediction P(X) and extreme points channel G(X), which includes a Gaussian kernel placed over each extreme point:

$$L_{pointdistance} = \Sigma(b(P) \cdot G(X)),$$

where · denotes a point-wise multiplication. In at least one embodiment, a new total loss used for training can be given by:

$$L = L_{Dice} + \alpha L_{pointdistance}$$

where α is a hyperparameter weight that controls an amount of influence of this point distance loss.

Neural Network Training and Development

An increasing variety of industries and applications are taking advantage of machine learning. In at least one embodiment, deep neural networks (DNNs) developed on processors have been used for diverse use cases, from self-driving cars to faster drug development, from automatic image analysis for security systems to smart real-time language translation in video chat applications. In at least one embodiment, deep learning is a technique that models a neural learning process of a human brain, continually learning, continually getting smarter, and delivering more accurate results more quickly over time. A child is initially taught by an adult to correctly identify and classify various shapes, eventually being able to identify shapes without any coaching. Similarly, in at least one embodiment a deep learning or neural learning system designed to accomplish a similar task would need to be trained for it to get smarter and more efficient at identifying basic objects, occluded objects, etc., while also assigning context to those objects.

In at least one embodiment, neurons in a human brain look at various inputs that are received, importance levels are assigned to each of these inputs, and output is passed on to other neurons to act upon. An artificial neuron or perceptron is a most basic model of a neural network. In at least one embodiment, a perceptron may receive one or more inputs that represent various features of an object that a perceptron is being trained to recognize and classify, and each of these features is assigned a certain weight based on importance of that feature in defining a shape of an object.

A deep neural network (DNN) model includes multiple layers of many connected perceptrons (e.g., nodes) that can be trained with enormous amounts of input data to quickly solve complex problems with high accuracy. In one example, a first layer of a DNN model breaks down an input image of an automobile into various sections and looks for basic patterns such as lines and angles. Second layer assembles lines to look for higher-level patterns such as wheels, windshields, and mirrors. A next layer identifies a type of vehicle, and a final few layers generate a label for an input image, identifying a model of a specific automobile brand. Once a DNN is trained, this DNN can be deployed and used to identify and classify objects or patterns in a process known as inference. Examples of inference (a process through which a DNN extracts useful information from a given input) include identifying handwritten numbers on checks deposited into ATM machines, identifying images of friends in photos, delivering movie recommendations, identifying and classifying different types of automobiles, pedestrians, and road hazards in driverless cars, or translating human speech in near real-time.

During training, data flows through a DNN in a forward propagation phase until a prediction is produced that indicates a label corresponding to input. If a neural network does not correctly label input, then errors between a correct label and a predicted label are analyzed, and weights are adjusted for each feature during a backward propagation phase until a DNN correctly labels input and other inputs in a training dataset. Training complex neural networks requires massive amounts of parallel computing performance, including floating-point multiplications and additions that are supported. Inferencing is less compute-intensive than training, being a latency-sensitive process where a trained neural network is applied to new inputs it has not seen before to classify images, translate speech, and infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver performance required for deep neural network-based artificial intelligence and machine learning applications.

Figure 6:
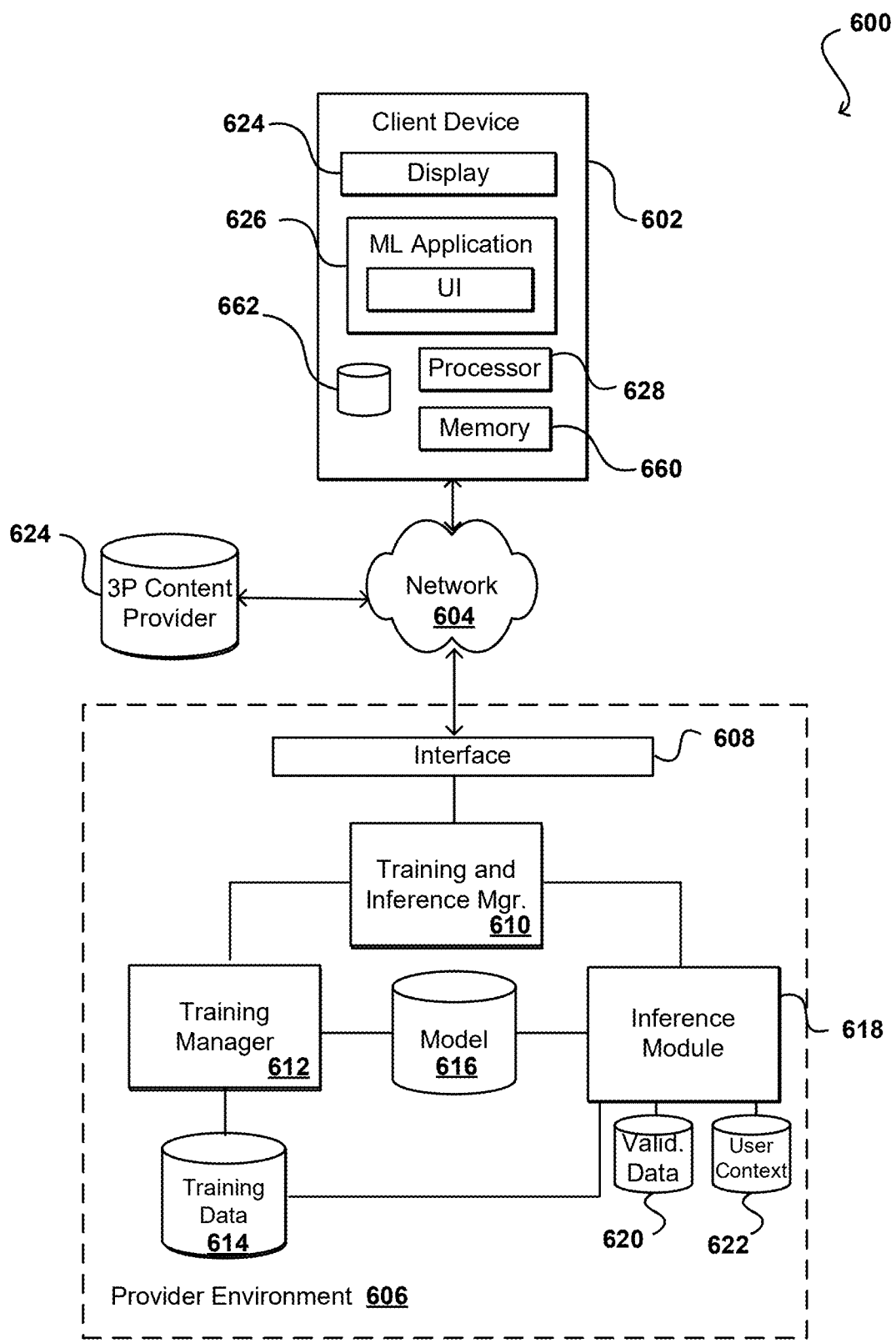
FIG. 6 illustrates an environment, according to at least one embodiment.

FIG. 6 illustrates components of a system 600 that can be used to train and utilize machine learning, in at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 606, while in at least one embodiment training might be requested by a customer or other user having access to a provider environment through a client device 602 or other such resource. In at least one embodiment, training data (or data to be analyzed by a trained neural network) can be provided by a provider, a user, or a third party content provider 624. In at least one embodiment, client device 602 may be a vehicle or object that is to be navigated on behalf of a user, for example, which can submit requests and/or receive instructions that assist in navigation of a device.

In at least one embodiment, requests are able to be submitted across at least one network 604 to be received to a provider environment 606. In at least one embodiment, a client device may be any appropriate electronic and/or computing devices enabling a user to generate and send such requests, as may include desktop computers, notebook computers, computer servers, smartphones, tablet computers, gaming consoles (portable or otherwise), computer processors, computing logic, and set-top boxes. Network(s) 604 can include any appropriate network for transmitting a request or other such data, as may include Internet, an intranet, an Ethernet, a cellular network, a local area network (LAN), a network of direct wireless connections among peers, and so on.

In at least one embodiment, requests can be received to an interface layer 608, which can forward data to a training and inference manager 610 in this example. This manager can be a system or service including hardware and software for managing requests and service corresponding data or content. In at least one embodiment, this manager can receive a request to train a neural network, and can provide data for a request to a training manger 612. In at least one embodiment, training manager 612 can select an appropriate model or network to be used, if not specified by a request, and can train a model using relevant training data. In at least one embodiment training data can be a batch of data stored to a training data repository 614, received from client device 602 or obtained from a third party provider 624. In at least one embodiment, training manager 612 can be responsible for training data, such as by using a LARC-based approach as discussed herein. A network can be any appropriate network, such as a recurrent neural network (RNN) or convolutional neural network (CNN). Once a network is trained and successfully evaluated, a trained network can be stored to a model repository 616, for example, that may store different models or networks for users, applications, or services, etc. In at least one embodiment there may be multiple models for a single application or entity, as may be utilized based on a number of different factors.

In at least one embodiment, at a subsequent point in time, a request may be received from client device 602 (or another such device) for content (e.g., path determinations) or data that is at least partially determined or impacted by a trained neural network. This request can include, for example, input data to be processed using a neural network to obtain one or more inferences or other output values, classifications, or predictions. In at least one embodiment, input data can be received to interface layer 608 and directed to inference module 618, although a different system or service can be used as well. In at least one embodiment, inference module 618 can obtain an appropriate trained network, such as a trained deep neural network (DNN) as discussed herein, from model repository 616 if not already stored locally to inference module 618. Inference module 618 can provide data as input to a trained network, which can then generate one or more inferences as output. This may include, for example, a classification of an instance of input data. In at least one embodiment, inferences can then be transmitted to client device 602 for display or other communication to a user. In at least one embodiment, context data for a user may also be stored to a user context data repository 622, which may include data about a user which may be useful as input to a network in generating inferences, or determining data to return to a user after obtaining instances. In at least one embodiment, relevant data, which may include at least some of input or inference data, may also be stored to a local database 620 for processing future requests. In at least one embodiment, a user can use account or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 626 executing on client device 602, and results displayed through a same interface. A client device can include resources such as a processor 628 and memory 660 for generating a request and processing results or a response, as well as at least one data storage element 632 for storing data for machine learning application 626.

In at least one embodiment a processor 628 (or a processor of training manager 612 or inference module 618) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

Figure 7:
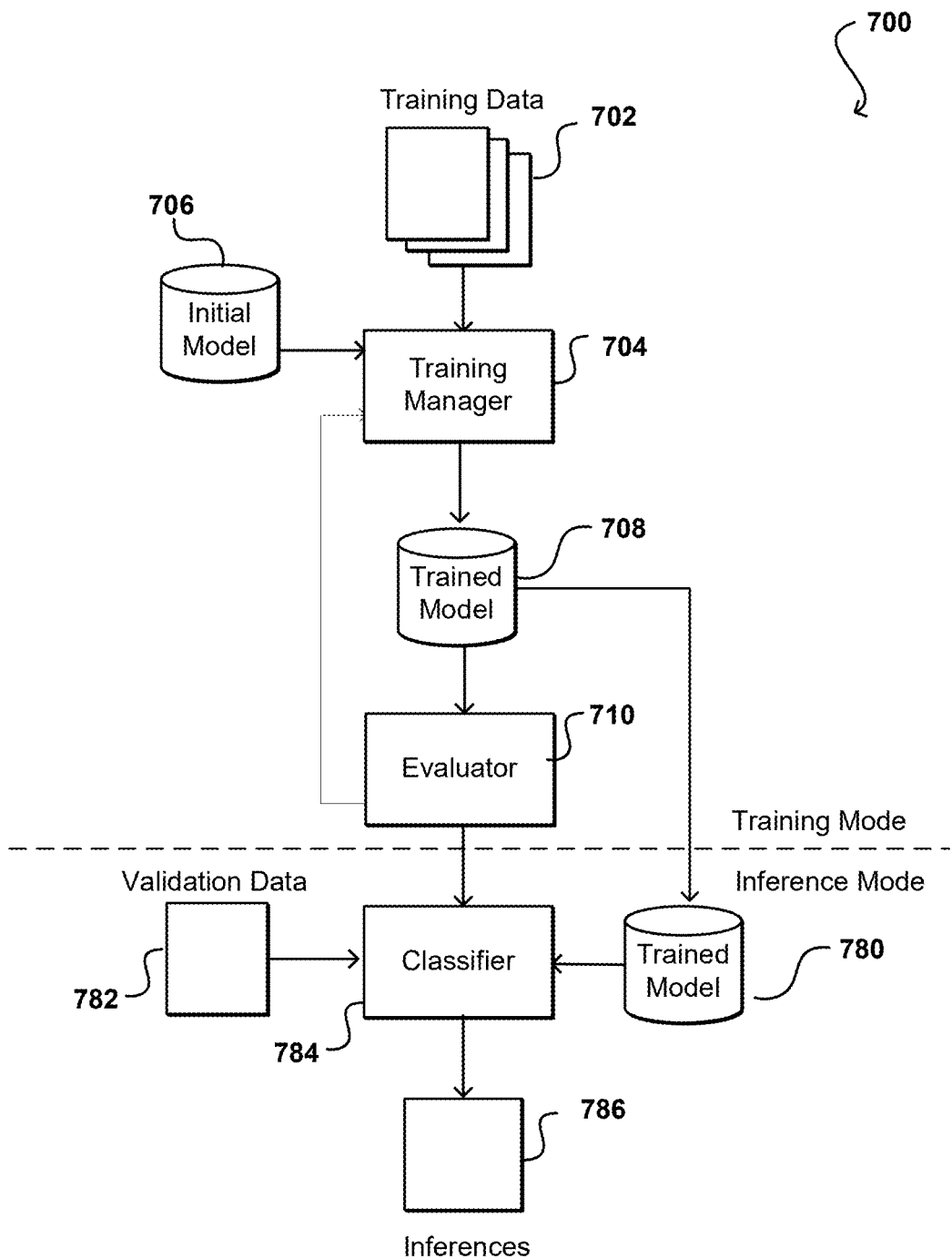
FIG. 7 illustrates a system for training an image synthesis network that can be utilized, according to at least one embodiment.

FIG. 7 illustrates an example system 700 that can be used to classify data, or generate inferences, in at least one embodiment. In at least one embodiment, both supervised and unsupervised training can be used in at least one embodiment discussed herein. In at least one embodiment, a set of training data 702 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 702 is provided as training input to a training manager 704. In at least one embodiment, training manager 704 can be a system or service that includes hardware and software, such as one or more computing devices executing a training application, for training a neural network (or other model or algorithm, etc.). In at least one embodiment, training manager 704 receives an instruction or request indicating a type of model to be used for training. In at least one embodiment, a model can be any appropriate statistical model, network, or algorithm useful for such purposes, as may include an artificial neural network, deep learning algorithm, learning classifier, Bayesian network, and so on. In at least one embodiment, training manager 704 can select an initial model, or other untrained model, from an appropriate repository 706 and utilize training data 702 to train a model, generating a trained model 708 (e.g., trained deep neural network) that can be used to classify similar types of data, or generate other such inferences. In at least one embodiment where training data is not used, an appropriate initial model can still be selected for training on input data per training manager 704.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, a training manager 704 can select from a set of machine learning models including binary classification, multiclass classification, and regression models. In at least one embodiment, a type of model to be used can depend at least in part upon a type of target to be predicted. In at least one embodiment, machine learning models for binary classification problems predict a binary outcome, such as one of two possible classes. In at least one embodiment, a learning algorithm such as logistic regression can be used to train binary classification models. In at least one embodiment, machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In at least one embodiment, in order to train a machine learning model in accordance with one embodiment, a training manager must determine an input training data source, as well as other information such as a name of a data attribute that contains a target to be predicted, required data transformation instructions, and training parameters to control a learning algorithm. In at least one embodiment, during a training process, a training manager 704 may automatically select an appropriate learning algorithm based on a type of target specified in a training data source. In at least one embodiment, machine learning algorithms can accept parameters used to control certain properties of a training process and of a resulting machine learning model. These are referred to herein as training parameters. In at least one embodiment, if no training parameters are specified, a training manager can utilize default values that are known to work well for a large range of machine learning tasks. Examples of training parameters for which values can be specified include a maximum model size, maximum number of passes over training data, shuffle type, regularization type, learning rate, and regularization amount. Default settings may be specified, with options to adjust values to fine-tune performance.

In at least one embodiment, a maximum model size is a total size, in units of bytes, of patterns that are created during a training of a model. In at least one embodiment, a model may be created of a specified size by default, such as a model of 100 MB. If a training manager is unable to determine enough patterns to fill a model size, a smaller model may be created. If a training manager finds more patterns than will fit into a specified size, a maximum cut-off may be enforced by trimming patterns that least affect a quality of a learned model. Choosing a model size provides for control of a trade-off between a predictive quality of a model and a cost of use. In at least one embodiment, smaller models can cause a training manager to remove many patterns to fit within a maximum size limit, affecting a quality of predictions. In at least one embodiment, larger models may cost more to query for real-time predictions. In at least one embodiment, larger input data sets do not necessarily result in larger models because models store patterns, not input data. In at least one embodiment, if patterns are few and simple, a resulting model will be small. Input data that has a large number of raw attributes (input columns) or derived features (outputs of data transformations) will likely have more patterns found and stored during a training process.

In at least one embodiment, training manager 704 can make multiple passes or iterations over training data to attempt to discover patterns. In at least one embodiment, there may be a default number of passes, such as ten passes, while in at least one embodiment up to a maximum number of passes may be set, such as up to one hundred passes. In at least one embodiment there may be no maximum set, or there may be a convergence criterion or other factor set that will trigger an end to a training process. In at least one embodiment training manager 704 can monitor a quality of patterns (such as for model convergence) during training, and can automatically stop training when there are no more data points or patterns to discover. In at least one embodiment, data sets with only a few observations may require more passes over data to obtain sufficiently high model quality. Larger data sets may contain many similar data points, which can reduce a need for a large number of passes. A potential impact of choosing more data passes over data is that model training can takes longer and cost more in terms of resources and system utilization.

In at least one embodiment training data is shuffled before training, or between passes of training. In at least one embodiment, shuffling is a random or pseudo-random shuffling to generate a truly random ordering, although there may be some constraints in place to ensure that there is no grouping of certain types of data, or shuffled data may be reshuffled if such grouping exists, etc. In at least one embodiment, shuffling changes an order or arrangement in which data is utilized for training so that a training algorithm does not encounter groupings of similar types of data, or a single type of data for too many observations in succession.

In at least one embodiment, a model might be trained to predict an object. In at least one embodiment, data might be sorted by object type before uploading. In at least one embodiment, an algorithm can then process data alphabetically by object type, encountering only data for a certain object type first. In at least one embodiment, a model will begin to learn patterns for that type of object. In at least one embodiment, a model will then encounter only data for a second object type, and will try to adjust a model to fit that object type, which can degrade patterns that fit that a first object type. This sudden switch from between object types can produce a model that does not learn how to predict object types accurately. In at least one embodiment, shuffling can be performed in at least one embodiment before a training data set is split into training and evaluation subsets, such that a relatively even distribution of data types is utilized for both stages. In at least one embodiment training manager 704 can automatically shuffle data using, for example, a pseudo-random shuffling technique.

In at least one embodiment, when creating a machine learning model in at least one embodiment, training manager 704 can enable a user to specify settings or apply custom options. In at least one embodiment, a user may specify one or more evaluation settings, indicating a portion of input data to be reserved for evaluating a predictive quality of a machine learning model. In at least one embodiment, a user may specify a policy that indicates which attributes and attribute transformations are available for model training. In at least one embodiment, user may also specify various training parameters that control certain properties of a training process and of a resulting model.

In at least one embodiment, once a training manager has determined that training of a model is complete, such as by using at least one end criterion discussed herein, trained model 708 can be provided for use by a classifier 784 in classifying (or otherwise generating inferences for) validation data 782. In at least one embodiment, this involves a logical transition between a training mode for a model and an inference mode for a model. In at least one embodiment, however, trained model 708 will first be passed to an evaluator 710, which may include an application, process, or service executing on at least one computing resource (e.g., a CPU or GPU of at least one server) for evaluating a quality (or another such aspect) of a trained model. In at least one embodiment, a model is evaluated to determine whether this model will provide at least a minimum acceptable or threshold level of performance in predicting a target on new and future data. If not, training manager 704 can continue to train this model. In at least one embodiment, since future data instances will often have unknown target values, it can be desirable to check an accuracy metric of machine learning on data for which a target answer is known, and use this assessment as a proxy for predictive accuracy on future data.

In at least one embodiment, a model is evaluated using a subset of training data 702 that was provided for training. This subset can be determined using a shuffle and split approach as discussed above. In at least one embodiment, this evaluation data subset will be labeled with a target, and thus can act as a source of ground truth for evaluation. Evaluating a predictive accuracy of a machine learning model with same data that was used for training is not useful, as positive evaluations might be generated for models that remember training data instead of generalizing from it. In at least one embodiment, once training has completed, evaluation data subset is processed using trained model 708 and evaluator 710 can determine accuracy of this model by comparing ground truth data against corresponding output (or predictions/observations) of this model. In at least one embodiment, evaluator 710 in at least one embodiment can provide a summary or performance metric indicating how well predicted and true values match. In at least one embodiment, if a trained model does not satisfy at least a minimum performance criterion, or other such accuracy threshold, then training manager 704 can be instructed to perform further training, or in some instances try training a new or different model. In at least one embodiment, if trained model 708 satisfies relevant criteria, then a trained model can be provided for use by classifier 784.

In at least one embodiment, when creating and training a machine learning model, it can be desirable in at least one embodiment to specify model settings or training parameters that will result in a model capable of making accurate predictions. In at least one embodiment, parameters include a number of passes to be performed (forward and/or backward), regularization or refinement, model size, and shuffle type. In at least one embodiment, selecting model parameter settings that produce a best predictive performance on evaluation data might result in an overfitting of a model. In at least one embodiment, overfitting occurs when a model has memorized patterns that occur in training and evaluation data sources, but has failed to generalize patterns in data. Overfitting often occurs when training data includes all data used in an evaluation. In at least one embodiment, a model that has been over fit may perform well during evaluation, but may fail to make accurate predictions on new or otherwise validation data. In at least one embodiment, to avoid selecting an over fitted model as a best model, a training manager can reserve additional data to validate a performance of a model. For example, training data set might be divided into 60 percent for training, and 40 percent for evaluation or validation, which may be divided into two or more stages. In at least one embodiment, after selecting model parameters that work well for evaluation data, leading to convergence on a subset of validation data, such as half this validation data, a second validation may be executed with a remainder of this validation data to ensure performance of this model. If this model meets expectations on validation data, then this model is not overfitting data. In at least one embodiment, a test set or held-out set may be used for testing parameters. In at least one embodiment, using a second validation or testing step helps to select appropriate model parameters to prevent overfitting. However, holding out more data from a training process for validation makes less data available for training. This may be problematic with smaller data sets as there may not be sufficient data available for training. In at least one embodiment, an approach in such a situation is to perform cross-validation as discussed elsewhere herein.

In at least one embodiment, there are many metrics or insights that can be used to review and evaluate a predictive accuracy of a given model. In at least one embodiment, an evaluation outcome contains a prediction accuracy metric to report on an overall success of a model, as well as visualizations to help explore accuracy of a model beyond a prediction accuracy metric. An outcome can also provide an ability to review impact of setting a score threshold, such as for binary classification, and can generate alerts on criteria to check a validity of an evaluation. A choice of a metric and visualization can depend at least in part upon a type of model being evaluated.

In at least one embodiment, once trained and evaluated satisfactorily, a trained machine learning model can be used to build or support a machine learning application. In one embodiment building a machine learning application is an iterative process that involves a sequence of steps. In at least one embodiment, a core machine learning problem(s) can be framed in terms of what is observed and what answer a model is to predict. In at least one embodiment, data can then be collected, cleaned, and prepared to make data suitable for consumption by machine learning model training algorithms. This data can be visualized and analyzed to run sanity checks to validate a quality of data and to understand data. It might be that raw data (e.g., input variables) and answer data (e.g., a target) are not represented in a way that can be used to train a highly predictive model. Therefore, it may be desirable to construct more predictive input representations or features from raw variables. Resulting features can be fed to a learning algorithm to build models and evaluate a quality of models on data that was held out from model building. A model can then be used to generate predictions of a target answer for new data instances.

In at least one embodiment, in system 700 of FIG. 7, a trained model 708 after evaluation is provided, or made available, to a classifier 714 that is able to use a trained model to process validation data. In at least one embodiment, this may include, for example, data received from users or third parties that are not classified, such as query images that are looking for information about what is represented in those images. In at least one embodiment, validation data can be processed by a classifier using a trained model, and results 716 (such as classifications or predictions) that are produced can be sent back to respective sources or otherwise processed or stored. In at least one embodiment, and where such usage is permitted, these now-classified data instances can be stored to a training data repository, which can be used for further training of trained model 708 by a training manager. In at least one embodiment a model will be continually trained as new data is available, but in at least one embodiment these models will be retrained periodically, such as once a day or week, depending upon factors such as a size of a data set or complexity of a model.

In at least one embodiment, classifier 714 can include appropriate hardware and software for processing validation data 712 using a trained model. In at least one embodiment, a classifier will include one or more computer servers each having one or more graphics processing units (GPUs) that are able to process data. In at least one embodiment, configuration and design of GPUs can make them more desirable to use in processing machine learning data than CPUs or other such components. In at least one embodiment, a trained model in at least one embodiment can be loaded into GPU memory and a received data instance provided to a GPU for processing. GPUs can have a much larger number of cores than CPUs, and GPU cores can also be much less complex. In at least one embodiment, a given GPU may be able to process thousands of data instances concurrently via different hardware threads. In at least one embodiment, a GPU can also be configured to maximize floating point throughput, which can provide significant additional processing advantages for a large data set.

In at least one embodiment, even when using GPUs, accelerators, and other such hardware to accelerate tasks such as training of a model or classification of data using such a model, such tasks can still require significant time, resource allocation, and cost. In at least one embodiment, if a machine learning model is to be trained using 700 passes, and a data set includes 1,000,000 data instances to be used for training, then all million instances would need to be processed for each pass. Different portions of an architecture can also be supported by different types of devices. In at least one embodiment, training may be performed using a set of servers at a logically centralized location, as may be offered as a service, while classification of raw data may be performed by such a service or on a client device, among other such options. These devices may also be owned, operated, or controlled by a same entity or multiple entities.

Figure 8:
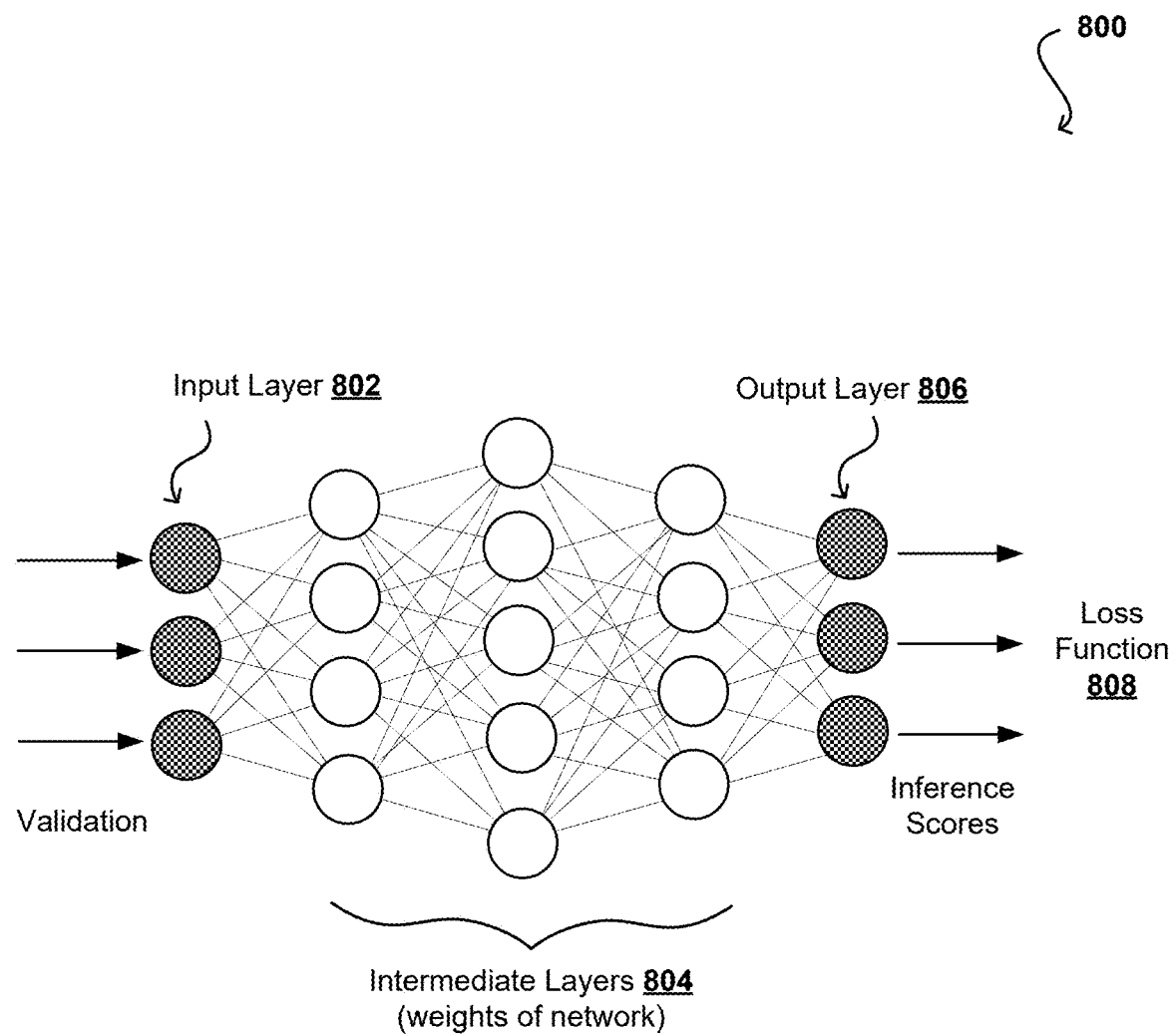
FIG. 8 illustrates layers of a statistical model that can be utilized, according to at least one embodiment.

In at least one embodiment, an example neural network 800 illustrated in FIG. 8 can be trained or otherwise utilized in at least one embodiment. In at least one embodiment, a statistical model is an artificial neural network (ANN) that includes a multiple layers of nodes, including an input layer 802, an output layer 806, and multiple layers 804 of intermediate nodes, often referred to as "hidden" layers, as internal layers and nodes are typically not visible or accessible in neural networks. In at least one embodiment, although only a few intermediate layers are illustrated for purposes of explanation, it should be understood that there is no limit to a number of intermediate layers that can be utilized, and any limit on layers will often be a factor of resources or time required for processed using a model. In at least one embodiment, there can be additional types of models, networks, algorithms, or processes used as well, as may include other numbers or selections of nodes and layers, among other such options. In at least one embodiment, validation data can be processed by layers of a network to generate a set of inferences, or inference scores, which can then be fed to a loss function 808.

In at least one embodiment, all nodes of a given layer are interconnected to all nodes of an adjacent layer. In at least one embodiment, nodes of an intermediate layer will then each be connected to nodes of two adjacent layers. In at least one embodiment, nodes are also referred to as neurons or connected units in some models, and connections between nodes are referred to as edges. Each node can perform a function for inputs received, such as by using a specified function. In at least one embodiment, nodes and edges can obtain different weightings during training, and individual layers of nodes can perform specific types of transformations on received input, where those transformations can also be learned or adjusted during training. In at least one embodiment, learning can be supervised or unsupervised learning, as may depend at least in part upon a type of information contained in a training data set. In at least one embodiment, various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In at least one embodiment, such a complex machine learning model can be trained using various tuning parameters. Choosing parameters, fitting a model, and evaluating a model are parts of a model tuning process, often referred to as hyperparameter optimization. Such tuning can involve introspecting an underlying model or data in at least one embodiment. In a training or production setting, a robust workflow can be important to avoid overfitting of hyperparameters as discussed elsewhere herein. Cross-validation and adding Gaussian noise to a training dataset are techniques that can be useful for avoiding overfitting to any one dataset. For hyperparameter optimization it may be desirable to keep training and validation sets fixed. In at least one embodiment, hyperparameters can be tuned in certain categories, as may include data preprocessing (such as translating words to vectors), CNN architecture definition (for example, filter sizes, number of filters), stochastic gradient descent (SGD) parameters (for example, learning rate), and regularization or refinement (for example, dropout probability), among other such options.

In at least one embodiment, instances of a dataset can be embedded into a lower dimensional space of a certain size during pre-processing. In at least one embodiment, a size of this space is a parameter to be tuned. In at least one embodiment, an architecture of a CNN contains many tunable parameters. A parameter for filter sizes can represent an interpretation of information that corresponds to a size of an instance that will be analyzed. In computational linguistics, this is known as an n-gram size. An example CNN uses three different filter sizes, which represent potentially different n-gram sizes. A number of filters per filter size can correspond to a depth of a filter. Each filter attempts to learn something different from a structure of an instance, such as a sentence structure for textual data. In a convolutional layer, an activation function can be a rectified linear unit and a pooling type set as max pooling. Results can then be concatenated into a single dimensional vector, and a last layer is fully connected onto a two-dimensional output. This corresponds to a binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. In at least one embodiment input data may be relatively sparse. A main hyperparameter in such a situation can be a dropout at a penultimate layer, which represents a proportion of nodes that will not "fire" at each training cycle. An example training process can suggest different hyperparameter configurations based on feedback for a performance of previous configurations. This model can be trained with a proposed configuration, evaluated on a designated validation set, and performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning model architecture and preprocessing and stochastic gradient descent parameters. This expands a model configuration space. In a basic scenario, only preprocessing and stochastic gradient descent parameters are tuned. There can be a greater number of configuration parameters in a complex scenario than in a basic scenario. Tuning in a joint space can be performed using a linear or exponential number of steps, iteration through an optimization loop for models. A cost for such a tuning process can be significantly less than for tuning processes such as random search and grid search, without any significant performance loss.

In at least one embodiment backpropagation can be utilized to calculate a gradient used for determining weights for a neural network. Backpropagation is a form of differentiation, and can be used by a gradient descent optimization algorithm to adjust weights applied to various nodes or neurons as discussed above. Weights can be determined using a gradient of a relevant loss function. Backpropagation can utilize a derivative of a loss function with respect to output generated by a statistical model. As mentioned, various nodes can have associated activation functions that define output of respective nodes. Various activation functions can be used as appropriate, as may include radial basis functions (RBFs) and sigmoids, which can be utilized by various support vector machines (SVMs) for transformation of data. An activation function of an intermediate layer of nodes is referred to herein as an inner product kernel. These functions can include, for example, identity functions, step functions, sigmoidal functions, ramp functions, and so on. Activation functions can also be linear or non-linear, among other such options.

In at least one embodiment, an untrained neural network is trained using a training dataset. In at least one embodiment, training framework is a PyTorch framework, whereas in other embodiments, training framework is a Tensorflow, Boost, Caffe, Microsoft Cognitive Toolkit/CNTK, MXNet, Chainer, Keras, Deeplearning4j, or other training framework. In at least one embodiment training framework trains an untrained neural network and enables it to be trained using processing resources described herein to generate a trained neural network. In at least one embodiment, weights may be chosen randomly or by pre-training using a deep belief network. In at least one embodiment, training may be performed in either a supervised, partially supervised, or unsupervised manner.

In at least one embodiment, untrained neural network is trained using supervised learning, wherein training dataset includes an input paired with a desired output for an input, or where training dataset includes input having a known output and an output of neural network is manually graded. In at least one embodiment, untrained neural network is trained in a supervised manner processes inputs from training dataset and compares resulting outputs against a set of expected or desired outputs. In at least one embodiment, errors are then propagated back through untrained neural network. In at least one embodiment, training framework adjusts weights that control untrained neural network. In at least one embodiment, training framework includes tools to monitor how well untrained neural network is converging towards a model, such as trained neural network, suitable to generating correct answers, such as in result, based on known input data, such as new data. In at least one embodiment, training framework trains untrained neural network repeatedly while adjust weights to refine an output of untrained neural network using a loss function and adjustment algorithm, such as stochastic gradient descent. In at least one embodiment, training framework trains untrained neural network until untrained neural network achieves a desired accuracy. In at least one embodiment, trained neural network can then be deployed to implement any number of machine learning operations.

In at least one embodiment, untrained neural network is trained using unsupervised learning, wherein untrained neural network attempts to train itself using unlabeled data. In at least one embodiment, unsupervised learning training dataset will include input data without any associated output data or "ground truth" data. In at least one embodiment, untrained neural network can learn groupings within training dataset and can determine how individual inputs are related to untrained dataset. In at least one embodiment, unsupervised training can be used to generate a self-organizing map, which is a type of trained neural network capable of performing operations useful in reducing dimensionality of new data. In at least one embodiment, unsupervised training can also be used to perform anomaly detection, which allows identification of data points in a new dataset that deviate from normal patterns of new dataset.

In at least one embodiment, semi-supervised learning may be used, which is a technique in which in training dataset includes a mix of labeled and unlabeled data. In at least one embodiment, training framework may be used to perform incremental learning, such as through transferred learning techniques. In at least one embodiment, incremental learning enables trained neural network to adapt to new data without forgetting knowledge instilled within network during initial training.

Inference and Training Logic

Figure 9:
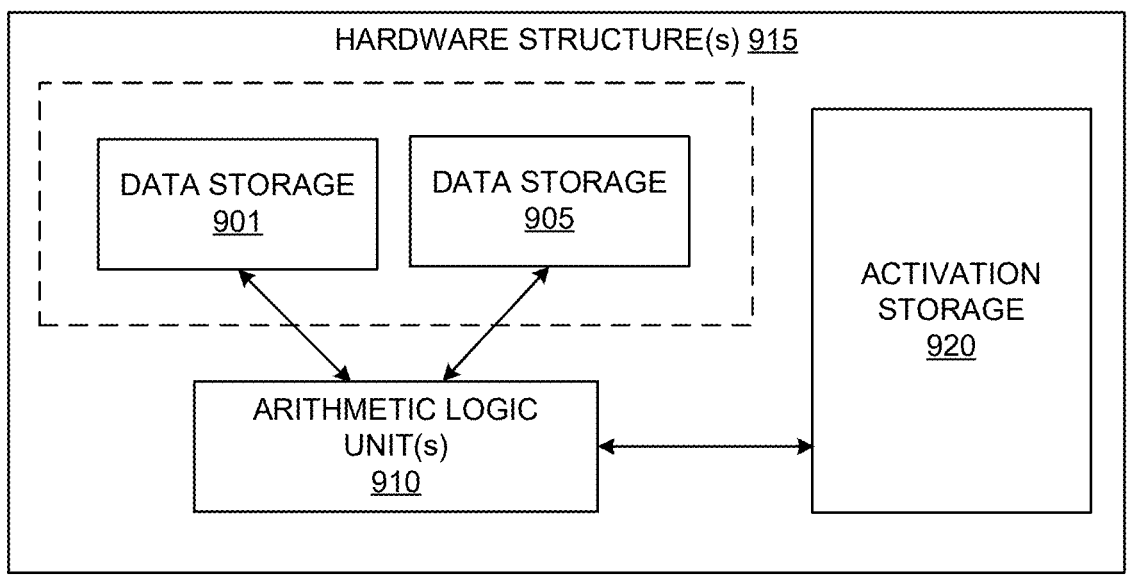
FIG. 9 illustrates inference and/or training logic, according to at least one embodiment.

FIG. 9 illustrates inference and/or training logic 915 used to perform inferencing and/or training operations associated with one or more embodiments. Details regarding inference and/or training logic 915 are provided below in conjunction with FIGS. 9 and/or 10.

In at least one embodiment, inference and/or training logic 915 may include, without limitation, code and/or data storage 901 to store forward and/or output weight and/or input/output data, and/or other parameters to configure neurons or layers of a neural network trained and/or used for inferencing in aspects of one or more embodiments. In at least one embodiment, training logic 915 may include, or be coupled to code and/or data storage 901 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which this code corresponds. In at least one embodiment, code and/or data storage 901 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 901 may be included with other on-chip or off-chip data storage, including a processor's L1, L2, or L3 cache or system memory.

In at least one embodiment, any portion of code and/or data storage 901 may be internal or external to one or more processors or other hardware logic devices or circuits. In at least one embodiment, code and/or code and/or data storage 901 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 901 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 915 may include, without limitation, a code and/or data storage 905 to store backward and/or output weight and/or input/output data corresponding to neurons or layers of a neural network trained and/or used for inferencing in aspects of one or more embodiments. In at least one embodiment, code and/or data storage 905 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 915 may include, or be coupled to code and/or data storage 905 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which this code corresponds. In at least one embodiment, any portion of code and/or data storage 905 may be included with other on-chip or off-chip data storage, including a processor's L1, L2, or L3 cache or system memory. In at least one embodiment, any portion of code and/or data storage 905 may be internal or external to on one or more processors or other hardware logic devices or circuits. In at least one embodiment, code and/or data storage 905 may be cache memory, DRAM, SRAM, non-volatile memory (e.g., Flash memory), or other storage. In at least one embodiment, choice of whether code and/or data storage 905 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 901 and code and/or data storage 905 may be separate storage structures. In at least one embodiment, code and/or data storage 901 and code and/or data storage 905 may be same storage structure. In at least one embodiment, code and/or data storage 901 and code and/or data storage 905 may be partially same storage structure and partially separate storage structures. In at least one embodiment, any portion of code and/or data storage 901 and code and/or data storage 905 may be included with other on-chip or off-chip data storage, including a processor's L1, L2, or L3 cache or system memory.

In at least one embodiment, inference and/or training logic 1015 may include, without limitation, one or more arithmetic logic unit(s) ("ALU(s)") 1010, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1020 that are functions of input/output and/or weight parameter data stored in code and/or data storage 1001 and/or code and/or data storage 1005. In at least one embodiment, activations stored in activation storage 1020 are generated according to linear algebraic and or matrix-based mathematics performed by ALU(s) 1010 in response to performing instructions or other code, wherein weight values stored in code and/or data storage 1005 and/or code and/or data storage 1001 are used as operands along with other values, such as bias values, gradient information, momentum values, or other parameters or hyperparameters, any or all of which may be stored in code and/or data storage 1005 or code and/or data storage 1001 or another storage on or off-chip.

In at least one embodiment, ALU(s) 1010 are included within one or more processors or other hardware logic devices or circuits, whereas in another embodiment, ALU(s) 1010 may be external to a processor or other hardware logic device or circuit that uses them (e.g., a co-processor). In at least one embodiment, ALUs 1010 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1001, code and/or data storage 1005, and activation storage 1020 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1020 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1020 may be cache memory, DRAM, SRAM, non-volatile memory (e.g., Flash memory), or other storage. In at least one embodiment, activation storage 1020 may be completely or partially within or external to one or more processors or other logical circuits. In at least one embodiment, choice of whether activation storage 1020 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1015 illustrated in FIG. 9 may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 9 may be used in conjunction with central processing unit ("CPU") hardware, graphics processing unit ("GPU") hardware or other hardware, such as field programmable gate arrays ("FPGAs").

Figure 10:
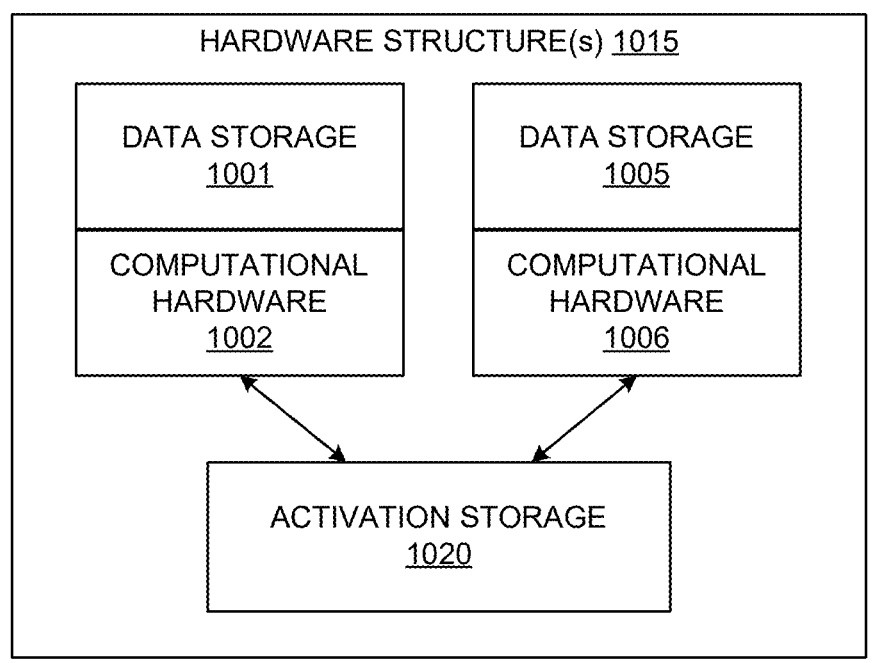
FIG. 10 illustrates inference and/or training logic, according to at least one embodiment.

FIG. 10 illustrates inference and/or training logic 1015, according to at least one or more embodiments. In at least one embodiment, inference and/or training logic 1015 may include, without limitation, hardware logic in which computational resources are dedicated or otherwise exclusively used in conjunction with weight values or other information corresponding to one or more layers of neurons within a neural network. In at least one embodiment, inference and/or training logic 1015 illustrated in FIG. 10 may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10 may be used in conjunction with central processing unit (CPU) hardware, graphics processing unit (GPU) hardware or other hardware, such as field programmable gate arrays (FPGAs). In at least one embodiment, inference and/or training logic 1015 includes, without limitation, code and/or data storage 1001 and code and/or data storage 1005, which may be used to store code (e.g., graph code), weight values and/or other information, including bias values, gradient information, momentum values, and/or other parameter or hyperparameter information. In at least one embodiment illustrated in FIG. 10, each of code and/or data storage 1001 and code and/or data storage 1005 is associated with a dedicated computational resource, such as computational hardware 1002 and computational hardware 1006, respectively. In at least one embodiment, each of computational hardware 1002 and computational hardware 1006 comprises one or more ALUs that perform mathematical functions, such as linear algebraic functions, only on information stored in code and/or data storage 1001 and code and/or data storage 1005, respectively, result of which is stored in activation storage 1020.

In at least one embodiment, each of code and/or data storage 1001 and 1005 and corresponding computational hardware 1002 and 1006, respectively, correspond to different layers of a neural network, such that resulting activation from one "storage/computational pair 1001/1002" of code and/or data storage 1001 and computational hardware 1002 is provided as an input to "storage/computational pair 1005/1006" of code and/or data storage 1005 and computational hardware 1006, in order to mirror conceptual organization of a neural network. In at least one embodiment, each of storage/computational pairs 1001/1002 and 1005/1006 may correspond to more than one neural network layer. In at least one embodiment, additional storage/computation pairs (not shown) subsequent to or in parallel with storage computation pairs 1001/1002 and 1005/1006 may be included in inference and/or training logic 1015.

Data Center

Figure 11:
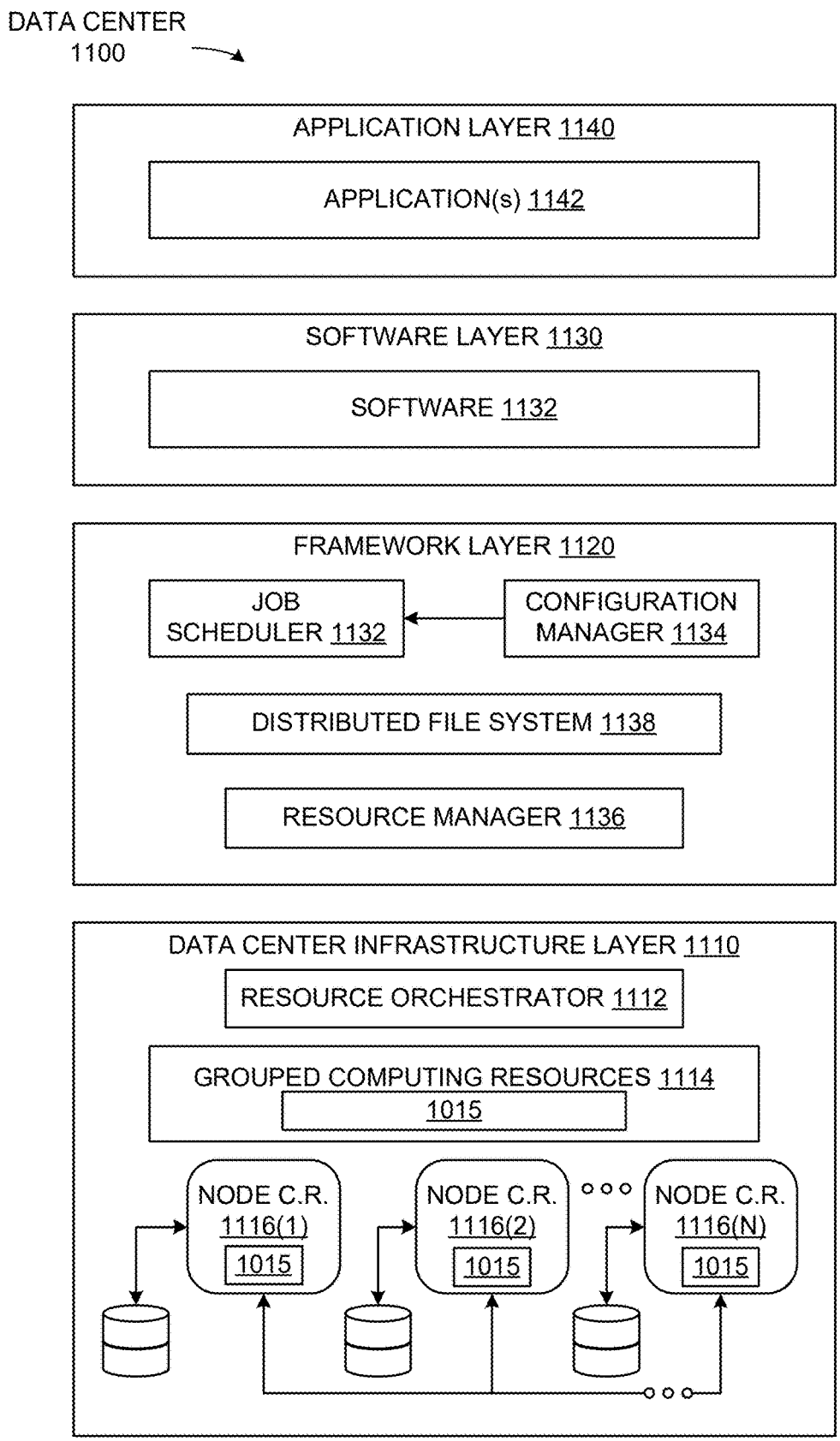
FIG. 11 illustrates a data center system, according to at least one embodiment.

FIG. 11 illustrates an example data center 1100, in which at least one embodiment may be used. In at least one embodiment, data center 1100 includes a data center infrastructure layer 1110, a framework layer 1120, a software layer 1130, and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). Separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1112 may configure or otherwise control one or more node C.R.s 1116(1)-1116(N) and/or grouped computing resources 1114. In at least one embodiment, resource orchestrator 1112 may include a software design infrastructure ("SDI") management entity for data center 1100. In at least one embodiment, resource orchestrator may include hardware, software or some combination thereof.

In at least one embodiment, as shown in FIG. 11, framework layer 1120 includes a job scheduler 1122, a configuration manager 1124, a resource manager 1126 and a distributed file system 1128. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1128 for large-scale data processing (e.g., "big data"). In at least one embodiment, job scheduler 1122 may include a Spark driver to facilitate scheduling of workloads supported by various layers of data center 1100. In at least one embodiment, configuration manager 1124 may be capable of configuring different layers such as software layer 1130 and framework layer 1120 including Spark and distributed file system 1128 for supporting large-scale data processing. In at least one embodiment, resource manager 1126 may be capable of managing clustered or grouped computing resources mapped to or allocated for support of distributed file system 1128 and job scheduler 1122. In at least one embodiment, clustered or grouped computing resources may include grouped computing resource 1114 at data center infrastructure layer 1110. In at least one embodiment, resource manager 1126 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1128 of framework layer 1120. one or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1128 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1124, resource manager 1126, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underutilized and/or poor performing portions of a data center.

In at least one embodiment, data center 1100 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 11 for inferencing or predicting operations based, at least in part, on weight parameters calculated using neural network training operations, neural network functions and/or architectures, or neural network use cases described herein. In at least one embodiment, inference and/or training logic 1015 can be used to generate segmentation from extreme points.

Computer Systems

Figure 12:
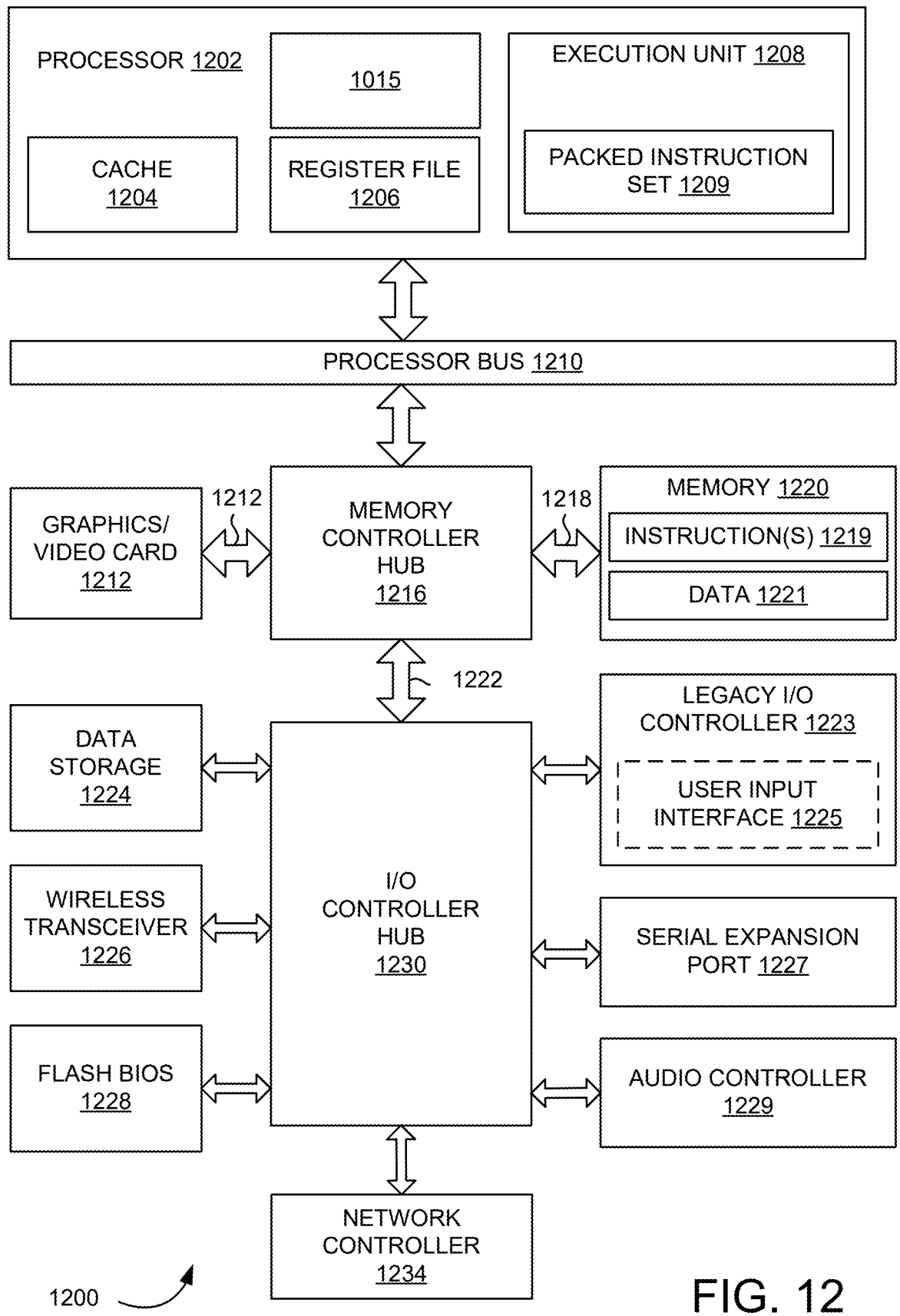
FIG. 12 illustrates a computer system, according to at least one embodiment.

FIG. 12A is a block diagram illustrating an exemplary computer system, which may be a system with interconnected devices and components, a system-on-a-chip (SOC) or some combination thereof 1200 formed with a processor that may include execution units to execute an instruction, according to at least one embodiment. In at least one embodiment, computer system 1200 may include, without limitation, a component, such as a processor 1202 to employ execution units including logic to perform algorithms for process data, in accordance with present disclosure, such as in embodiment described herein. In at least one embodiment, computer system 1200 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1200 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1200 may include, without limitation, processor 1202 that may include, without limitation, one or more execution units 1208 to perform machine learning model training and/or inferencing according to techniques described herein. In at least one embodiment, computer system 1200 is a single processor desktop or server system, but in another embodiment computer system 1200 may be a multiprocessor system. In at least one embodiment, processor 1202 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1202 may be coupled to a processor bus 1210 that may transmit data signals between processor 1202 and other components in computer system 1200.

In at least one embodiment, processor 1202 may include, without limitation, a Level 1 ("L1") internal cache memory ("cache") 1204. In at least one embodiment, processor 1202 may have a single internal cache or multiple levels of internal cache. In at least one embodiment, cache memory may reside external to processor 1202. Other embodiments may also include a combination of both internal and external caches depending on particular implementation and needs. In at least one embodiment, register file 1206 may store different types of data in various registers including, without limitation, integer registers, floating point registers, status registers, and instruction pointer register.

In at least one embodiment, execution unit 1208, including, without limitation, logic to perform integer and floating point operations, also resides in processor 1202. In at least one embodiment, processor 1202 may also include a microcode ("ucode") read only memory ("ROM") that stores microcode for certain macro instructions. In at least one embodiment, execution unit 1208 may include logic to handle a packed instruction set 1209. In at least one embodiment, by including packed instruction set 1209 in an instruction set of a general-purpose processor 1202, along with associated circuitry to execute instructions, operations used by many multimedia applications may be performed using packed data in a general-purpose processor 1202. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1208 may also be used in microcontrollers, embedded processors, graphics devices, DSPs, and other types of logic circuits. In at least one embodiment, computer system 1200 may include, without limitation, a memory 1220. In at least one embodiment, memory 1220 may be implemented as a Dynamic Random Access Memory ("DRAM") device, a Static Random Access Memory ("SRAM") device, flash memory device, or other memory device. In at least one embodiment, memory 1220 may store instruction(s) 1219 and/or data 1221 represented by data signals that may be executed by processor 1202.

In at least one embodiment, system logic chip may be coupled to processor bus 1210 and memory 1220. In at least one embodiment, system logic chip may include, without limitation, a memory controller hub ("MCH") 1216, and processor 1202 may communicate with MCH 1216 via processor bus 1210. In at least one embodiment, MCH 1216 may provide a high bandwidth memory path 1218 to memory 1220 for instruction and data storage and for storage of graphics commands, data and textures. In at least one embodiment, MCH 1216 may direct data signals between processor 1202, memory 1220, and other components in computer system 1200 and to bridge data signals between processor bus 1210, memory 1220, and a system I/O 1222. In at least one embodiment, system logic chip may provide a graphics port for coupling to a graphics controller. In at least one embodiment, MCH 1216 may be coupled to memory 1220 through a high bandwidth memory path 1218 and graphics/video card 1212 may be coupled to MCH 1216 through an Accelerated Graphics Port ("AGP") interconnect 1214.

In at least one embodiment, computer system 1200 may use system I/O 1222 that is a proprietary hub interface bus to couple MCH 1216 to I/O controller hub ("ICH") 1230. In at least one embodiment, ICH 1230 may provide direct connections to some I/O devices via a local I/O bus. In at least one embodiment, local I/O bus may include, without limitation, a high-speed I/O bus for connecting peripherals to memory 1220, chipset, and processor 1202. Examples may include, without limitation, an audio controller 1229, a firmware hub ("flash BIOS") 1228, a wireless transceiver 1226, a data storage 1224, a legacy I/O controller 1223 containing user input and keyboard interfaces 1225, a serial expansion port 1227, such as Universal Serial Bus ("USB"), and a network controller 1234. data storage 1224 may comprise a hard disk drive, a floppy disk drive, a CD-ROM device, a flash memory device, or other mass storage device.

In at least one embodiment, FIG. 12A illustrates a system, which includes interconnected hardware devices or "chips", whereas in other embodiments, FIG. 12A may illustrate an exemplary System on a Chip ("SoC"). In at least one embodiment, devices illustrated in FIG. cc may be interconnected with proprietary interconnects, standardized interconnects (e.g., PCIe) or some combination thereof. In at least one embodiment, one or more components of computer system 1200 are interconnected using compute express link (CXL) interconnects.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 12A for inferencing or predicting operations based, at least in part, on weight parameters calculated using neural network training operations, neural network functions and/or architectures, or neural network use cases described herein. In at least one embodiment, inference and/or training logic 1015 can be used to generate segmentation from extreme points.

Figure 13:
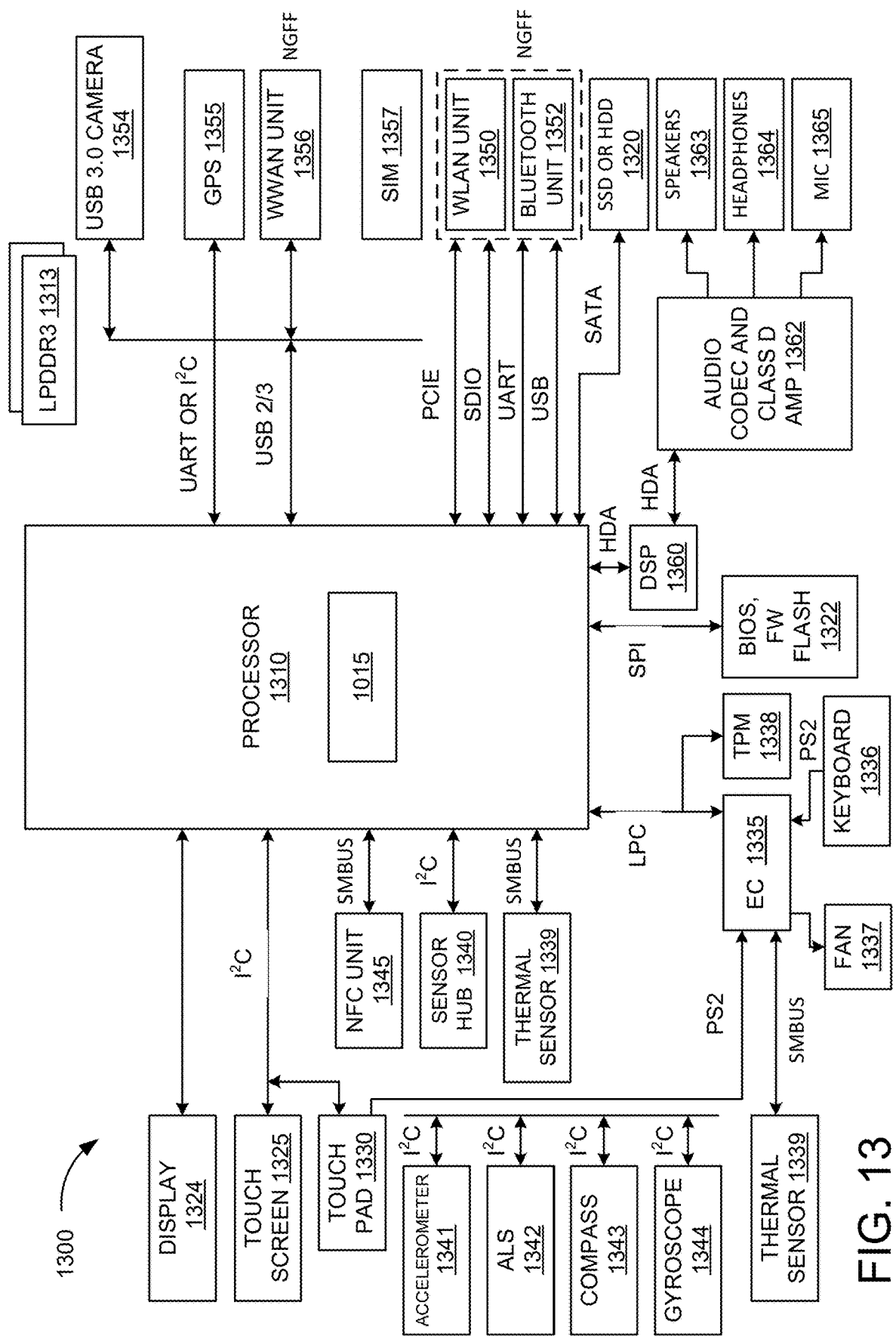
FIG. 13 illustrates a computer system, according to at least one embodiment.

FIG. 13 is a block diagram illustrating an electronic device 1300 for utilizing a processor 1310, according to at least one embodiment. In at least one embodiment, electronic device 1300 may be, for example and without limitation, a notebook, a tower server, a rack server, a blade server, a laptop, a desktop, a tablet, a mobile device, a phone, an embedded computer, or any other suitable electronic device.

In at least one embodiment, system 1300 may include, without limitation, processor 1310 communicatively coupled to any suitable number or kind of components, peripherals, modules, or devices. In at least one embodiment, processor 1310 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 13 illustrates a system, which includes interconnected hardware devices or "chips", whereas in other embodiments, FIG. 13 may illustrate an exemplary System on a Chip ("SoC"). In at least one embodiment, devices illustrated in FIG. 13 may be interconnected with proprietary interconnects, standardized interconnects (e.g., PCIe) or some combination thereof. In at least one embodiment, one or more components of FIG. 13 are interconnected using compute express link (CXL) interconnects.

In at least one embodiment, FIG. 13 may include a display 1324, a touch screen 1325, a touch pad 1330, a Near Field Communications unit ("NFC") 1345, a sensor hub 1340, a thermal sensor 1346, an Express Chipset ("EC") 1335, a Trusted Platform Module ("TPM") 1338, BIOS/firmware/flash memory ("BIOS, FW Flash") 1322, a DSP 1360, a drive 1320 such as a Solid State Disk ("SSD") or a Hard Disk Drive ("HDD"), a wireless local area network unit ("WLAN") 1350, a Bluetooth unit 1352, a Wireless Wide Area Network unit ("WWAN") 1356, a Global Positioning System (GPS) 1355, a camera ("USB 3.0 camera") 1354 such as a USB 3.0 camera, and/or a Low Power Double Data Rate ("LPDDR") memory unit ("LPDDR3") 1315 implemented in, for example, LPDDR3 standard. These components may each be implemented in any suitable manner.

In at least one embodiment, other components may be communicatively coupled to processor 1310 through components discussed above. In at least one embodiment, an accelerometer 1341, Ambient Light Sensor ("ALS") 1342, compass 1343, and a gyroscope 1344 may be communicatively coupled to sensor hub 1340. In at least one embodiment, thermal sensor 1339, a fan 1337, a keyboard 1346, and a touch pad 1330 may be communicatively coupled to EC 1335. In at least one embodiment, speaker 1363, headphones 1364, and microphone ("mic") 1365 may be communicatively coupled to an audio unit ("audio codec and class d amp") 1362, which may in turn be communicatively coupled to DSP 1360. In at least one embodiment, audio unit 1364 may include, for example and without limitation, an audio coder/decoder ("codec") and a class D amplifier. In at least one embodiment, SIM card ("SIM") 1357 may be communicatively coupled to WWAN unit 1356. In at least one embodiment, components such as WLAN unit 1350 and Bluetooth unit 1352, as well as WWAN unit 1356 may be implemented in a Next Generation Form Factor ("NGFF").

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 13 for inferencing or predicting operations based, at least in part, on weight parameters calculated using neural network training operations, neural network functions and/or architectures, or neural network use cases described herein. In at least one embodiment, inference and/or training logic 1015 can be used to generate segmentation from extreme points.

Figure 14:
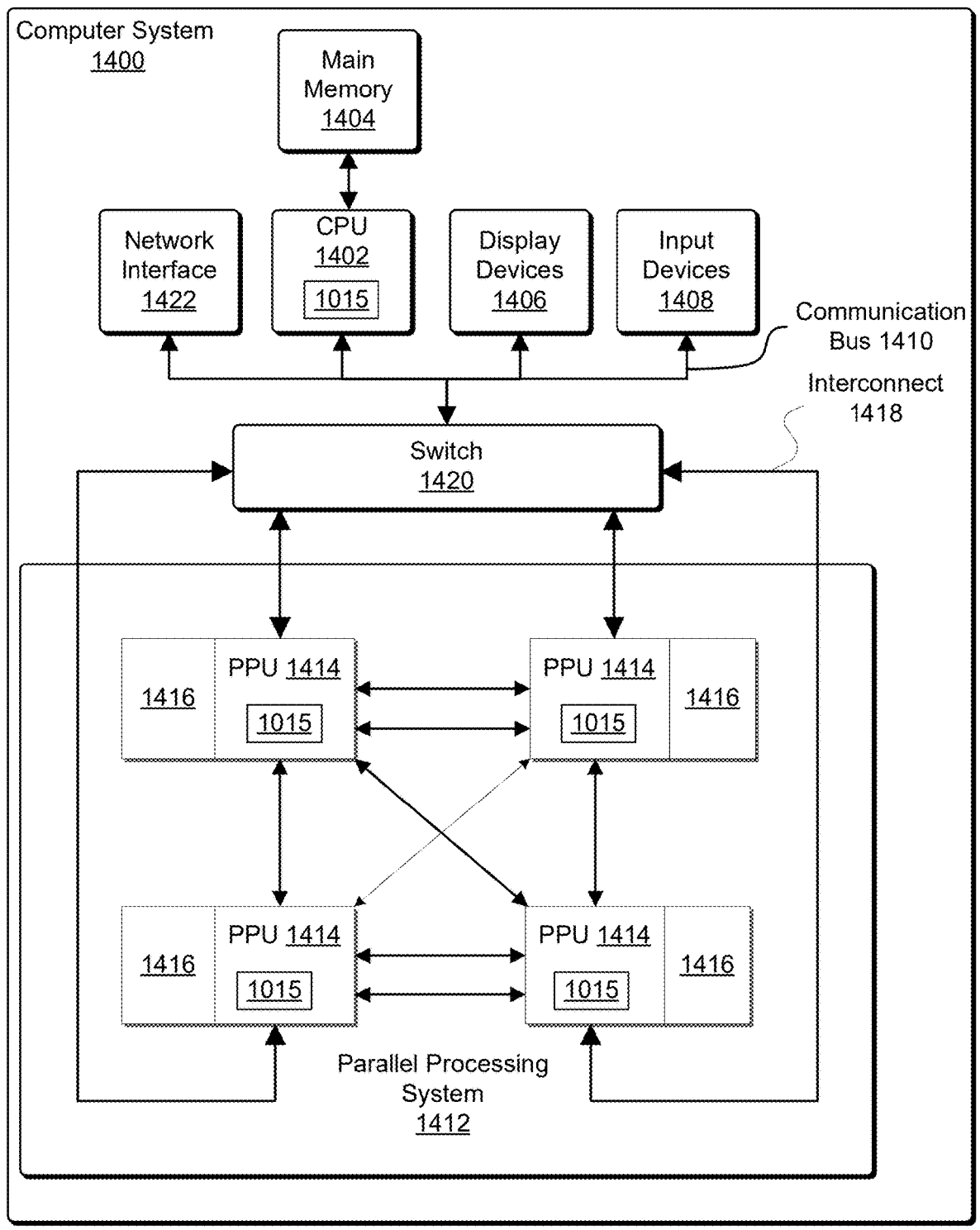
FIG. 14 illustrates a computer system, according to at least one embodiment.

FIG. 14 illustrates a computer system 1400, according to at least one embodiment. In at least one embodiment, computer system 1400 is configured to implement various processes and methods described throughout this disclosure.

In at least one embodiment, computer system 1400 comprises, without limitation, at least one central processing unit ("CPU") 1402 that is connected to a communication bus 1410 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1400 includes, without limitation, a main memory 1404 and control logic (e.g., implemented as hardware, software, or a combination thereof) and data are stored in main memory 1404 which may take form of random access memory ("RAM"). In at least one embodiment, a network interface subsystem ("network interface") 1422 provides an interface to other computing devices and networks for receiving data from and transmitting data to other systems from computer system 1400.

In at least one embodiment, computer system 1400, in at least one embodiment, includes, without limitation, input devices 1408, parallel processing system 1412, and display devices 1406 which can be implemented using a conventional cathode ray tube ("CRT"), liquid crystal display ("LCD"), light emitting diode ("LED"), plasma display, or other suitable display technologies. In at least one embodiment, user input is received from input devices 1408 such as keyboard, mouse, touchpad, microphone, and more. In at least one embodiment, each of foregoing modules can be situated on a single semiconductor platform to form a processing system.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 14 for inferencing or predicting operations based, at least in part, on weight parameters calculated using neural network training operations, neural network functions and/or architectures, or neural network use cases described herein. In at least one embodiment, inference and/or training logic 1015 can be used to generate segmentation from extreme points.

Figure 15:
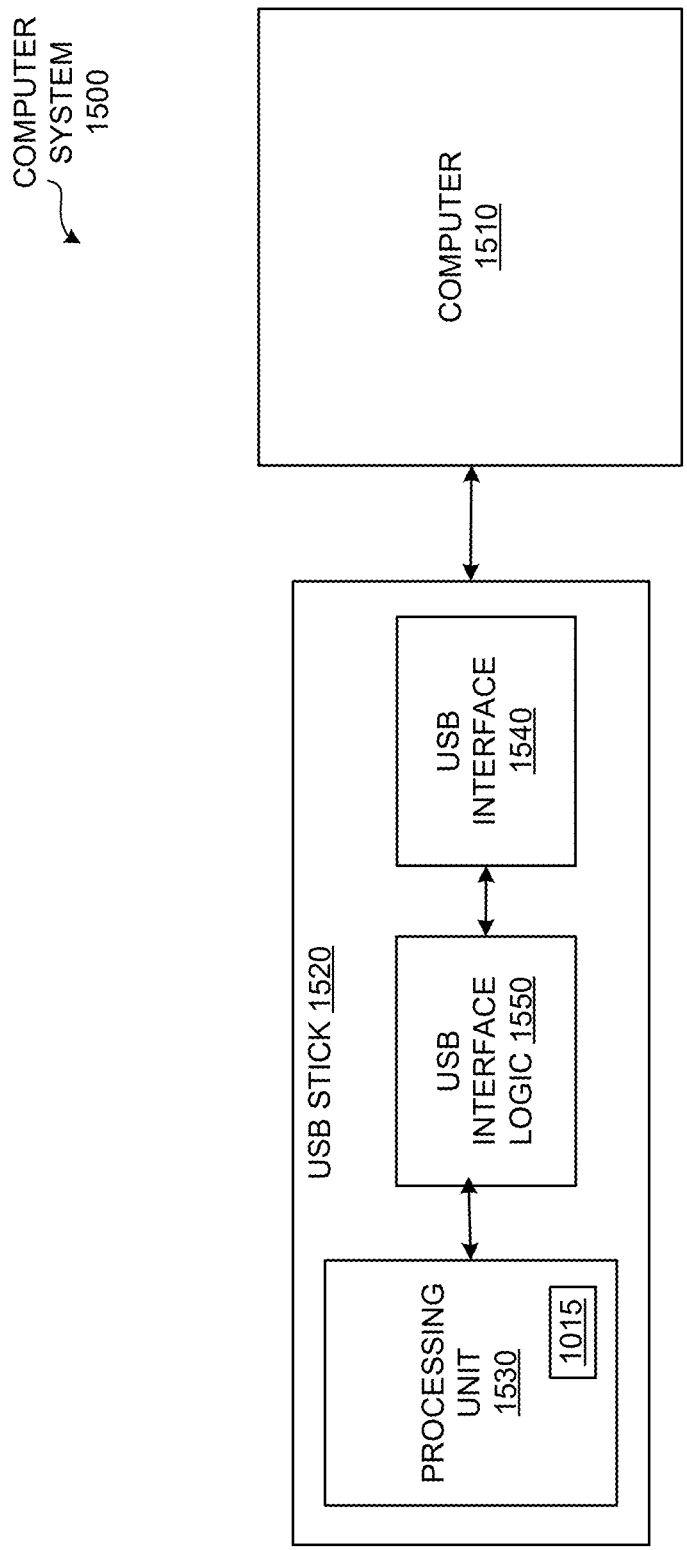
FIG. 15 illustrates a computer system, according at least one embodiment.

FIG. 15 illustrates a computer system 1500, according to at least one embodiment. In at least one embodiment, computer system 1500 includes, without limitation, a computer 1510 and a USB stick 1520. In at least one embodiment, computer 1510 may include, without limitation, any number and type of processor(s) (not shown) and a memory (not shown). In at least one embodiment, computer 1510 includes, without limitation, a server, a cloud instance, a laptop, and a desktop computer.

In at least one embodiment, USB stick 1520 includes, without limitation, a processing unit 1530, a USB interface 1540, and USB interface logic 1550. In at least one embodiment, processing unit 1530 may be any instruction execution system, apparatus, or device capable of executing instructions. In at least one embodiment, processing unit 1530 may include, without limitation, any number and type of processing cores (not shown). In at least one embodiment, processing core 1530 comprises an application specific integrated circuit ("ASIC") that is optimized to perform any amount and type of operations associated with machine learning. For instance, in at least one embodiment, processing core 1530 is a tensor processing unit ("TPC") that is optimized to perform machine learning inference operations. In at least one embodiment, processing core 1530 is a vision processing unit ("VPU") that is optimized to perform machine vision and machine learning inference operations.

In at least one embodiment, USB interface 1540 may be any type of USB connector or USB socket. For instance, in at least one embodiment, USB interface 1540 is a USB 3.0 Type-C socket for data and power. In at least one embodiment, USB interface 1540 is a USB 3.0 Type-A connector. In at least one embodiment, USB interface logic 1550 may include any amount and type of logic that enables processing unit 1530 to interface with or devices (e.g., computer 1510) via USB connector 1540.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 15 for inferencing or predicting operations based, at least in part, on weight parameters calculated using neural network training operations, neural network functions and/or architectures, or neural network use cases described herein. In at least one embodiment, inference and/or training logic 1015 can be used to generate segmentation from extreme points.

Figure 16:
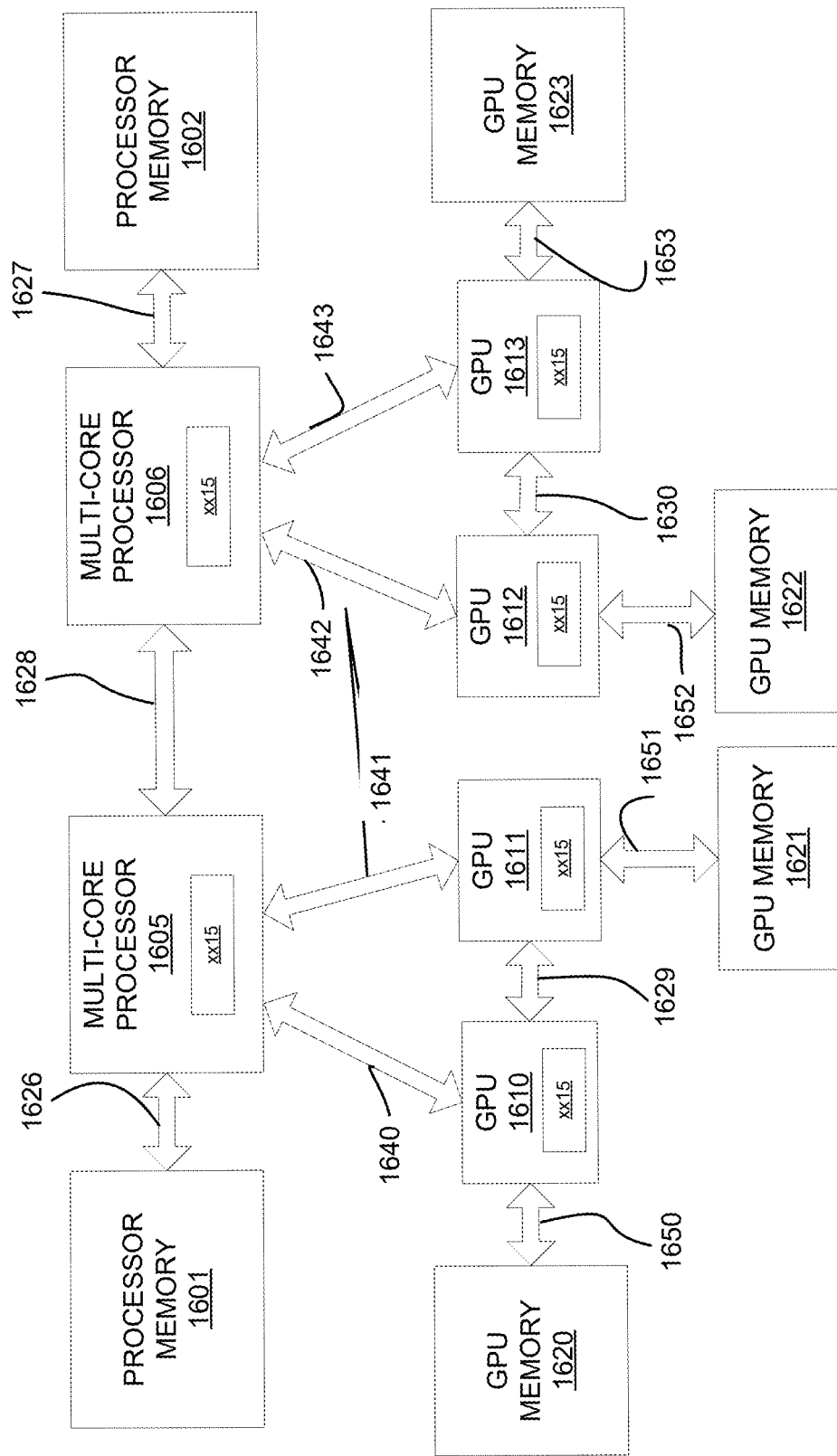
FIG. 16 illustrates a computer system, according to at least one embodiment.

FIG. 16A illustrates an exemplary architecture in which a plurality of GPUs 1610-1613 is communicatively coupled to a plurality of multi-core processors 1605-1606 over high-speed links 1640-1643 (e.g., buses, point-to-point interconnects, etc.). In one embodiment, high-speed links 1640-1643 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 1610-1613 are interconnected over high-speed links 1629-1630, which may be implemented using same or different protocols/links than those used for high-speed links 1640-1643. Similarly, two or more of multi-core processors 1605-1606 may be connected over high speed link 1628 which may be symmetric multi-processor (SMP) buses operating at 20 GB/s, 30 GB/s, 120 GB/s or higher. Alternatively, all communication between various system components shown in FIG. 16A may be accomplished using same protocols/links (e.g., over a common interconnection fabric).

In one embodiment, each multi-core processor 1605-1606 is communicatively coupled to a processor memory 1601-1602, via memory interconnects 1626-1627, respectively, and each GPU 1610-1613 is communicatively coupled to GPU memory 1620-1623 over GPU memory interconnects 1650-1653, respectively. Memory interconnects 1626-1627 and 1650-1653 may utilize same or different memory access technologies. By way of example, and not limitation, processor memories 1601-1602 and GPU memories 1620-1623 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 1601-1602 may be volatile memory and another portion may be non-volatile memory (e.g., using a two-level memory (2 LM) hierarchy).

As described below, although various processors 1605-1606 and GPUs 1610-1613 may be physically coupled to a particular memory 1601-1602, 1620-1623, respectively, a unified memory architecture may be implemented in which a same virtual system address space (also referred to as "effective address" space) is distributed among various physical memories. For example, processor memories 1601-

1602 may each comprise 64 GB of system memory address space and GPU memories 1620-1623 may each comprise 32 GB of system memory address space (resulting in a total of 256 GB addressable memory in this example).

Figure 17:
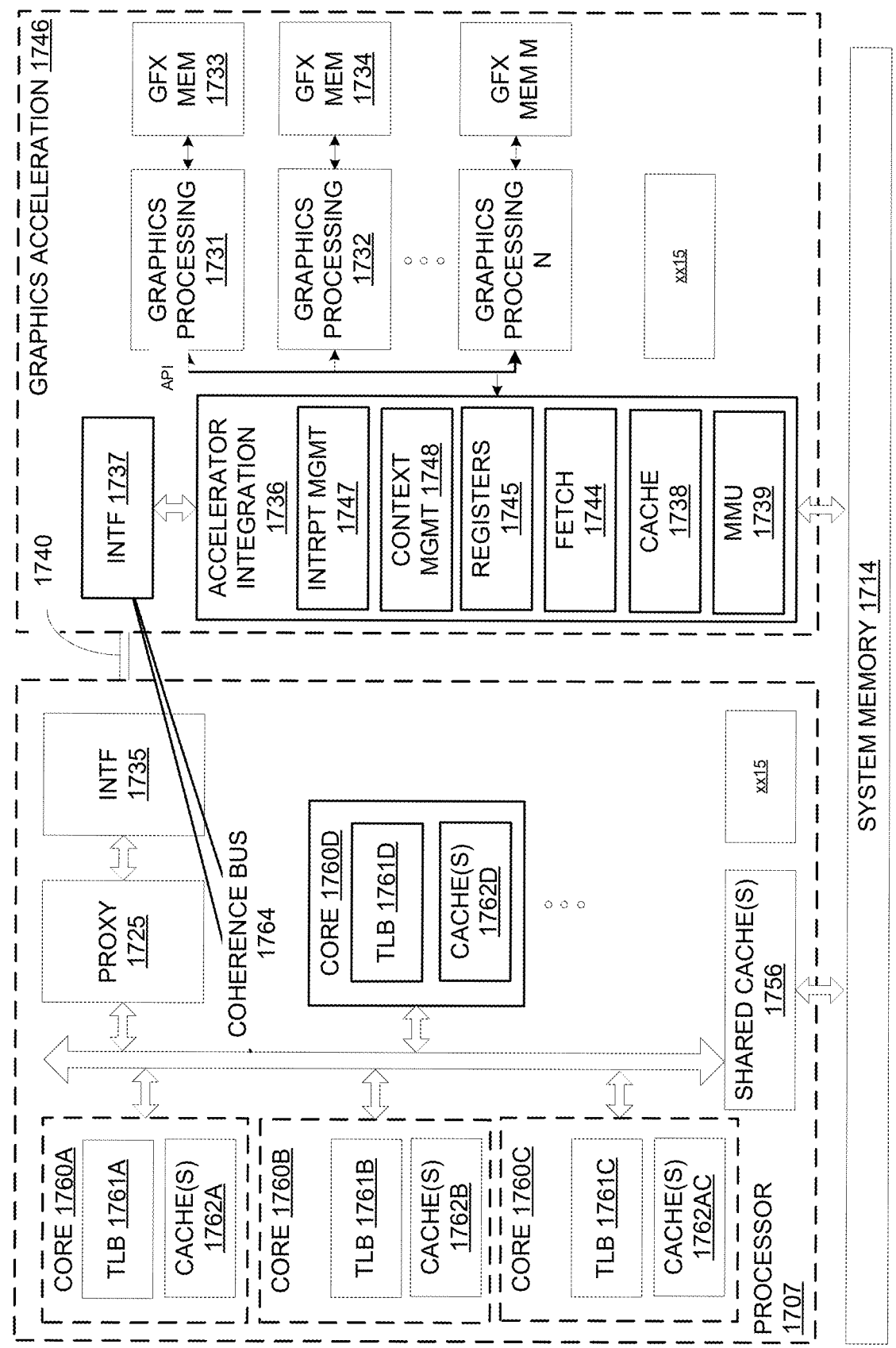
FIG. 17 illustrates a computer system, according to at least one embodiment.

FIG. 17 illustrates additional details for an interconnection between a multi-core processor 1607 and a graphics acceleration module 1646 in accordance with one exemplary embodiment. Graphics acceleration module 1646 may include one or more GPU chips integrated on a line card which is coupled to processor 1607 via high-speed link 1640. Alternatively, graphics acceleration module 1646 may be integrated on a same package or chip as processor 1607.

In at least one embodiment, illustrated processor 1607 includes a plurality of cores 1660A-1660D, each with a translation lookaside buffer 1661A-1661D and one or more caches 1662A-1662D. In at least one embodiment, cores 1660A-1660D may include various other components for executing instructions and processing data which are not illustrated. Caches 1662A-1662D may comprise level 1 (L1) and level 2 (L2) caches. In addition, one or more shared caches 1656 may be included in caches 1662A-1662D and shared by sets of cores 1660A-1660D. For example, one embodiment of processor 1607 includes 24 cores, each with its own L1 cache, twelve shared L2 caches, and twelve shared L3 caches. In this embodiment, one or more L2 and L3 caches are shared by two adjacent cores. Processor 1607 and graphics acceleration module 1646 connect with system memory 1614, which may include processor memories 1601-1602 of FIG. 16A.

Coherency is maintained for data and instructions stored in various caches 1662A-1662D, 1656 and system memory 1614 via inter-core communication over a coherence bus 1664. For example, each cache may have cache coherency logic/circuitry associated therewith to communicate to over coherence bus 1664 in response to detected reads or writes to particular cache lines. In one implementation, a cache snooping protocol is implemented over coherence bus 1664 to snoop cache accesses.

In one embodiment, a proxy circuit 1625 communicatively couples graphics acceleration module 1646 to coherence bus 1664, allowing graphics acceleration module 1646 to participate in a cache coherence protocol as a peer of cores 1660A-1660D. In particular, an interface 1635 provides connectivity to proxy circuit 1625 over high-speed link 1640 (e.g., a PCIe bus, NVLink, etc.) and an interface 1637 connects graphics acceleration module 1646 to link 1640.

In one implementation, an accelerator integration circuit 1636 provides cache management, memory access, context management, and interrupt management services on behalf of a plurality of graphics processing engines 1631, 1632, N of graphics acceleration module 1646. Graphics processing engines 1631, 1632, N may each comprise a separate graphics processing unit (GPU). Alternatively, graphics processing engines 1631, 1632, N may comprise different types of graphics processing engines within a GPU such as graphics execution units, media processing engines (e.g., video encoders/decoders), samplers, and blit engines. In at least one embodiment, graphics acceleration module 1646 may be a GPU with a plurality of graphics processing engines 1631-1632, N or graphics processing engines 1631-1632, N may be individual GPUs integrated on a common package, line card, or chip.

In one embodiment, accelerator integration circuit 1636 includes a memory management unit (MMU) 1639 for performing various memory management functions such as virtual-to-physical memory translations (also referred to as effective-to-real memory translations) and memory access protocols for accessing system memory 1614. MMU 1639 may also include a translation lookaside buffer (TLB) (not shown) for caching virtual/effective to physical/real address translations. In one implementation, a cache 1638 stores commands and data for efficient access by graphics processing engines 1631-1632, N. In one embodiment, data stored in cache 1638 and graphics memories 1633-1634, M is kept coherent with core caches 1662A-1662D, 1656, and system memory 1614. As mentioned above, this may be accomplished via proxy circuit 1625 on behalf of cache 1638 and memories 1633-1634, M (e.g., sending updates to cache 1638 related to modifications/accesses of cache lines on processor caches 1662A-1662D, 1656, and receiving updates from cache 1638).

A set of registers 1645 store context data for threads executed by graphics processing engines 1631-1632, N and a context management circuit 1648 manages thread contexts. For example, context management circuit 1648 may perform save and restore operations to save and restore contexts of various threads during contexts switches (e.g., where a first thread is saved and a second thread is stored so that a second thread can be executed by a graphics processing engine). For example, on a context switch, context management circuit 1648 may store current register values to a designated region in memory (e.g., identified by a context pointer). It may then restore register values when returning to a context. In one embodiment, an interrupt management circuit 1647 receives and processes interrupts received from system devices.

In one implementation, virtual/effective addresses from a graphics processing engine 1631 are translated to real/physical addresses in system memory 1614 by MMU 1639. One embodiment of accelerator integration circuit 1636 supports multiple (e.g., 4, 8, 16) graphics accelerator modules 1646 and/or other accelerator devices. Graphics accelerator module 1646 may be dedicated to a single application executed on processor 1607 or may be shared between multiple applications. In one embodiment, a virtualized graphics execution environment is presented in which resources of graphics processing engines 1631-1632, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1636 performs as a bridge to a system for graphics acceleration module 1646 and provides address translation and system memory cache services. In addition, accelerator integration circuit 1636 may provide virtualization facilities for a host processor to manage virtualization of graphics processing engines 1631-1632, N, interrupts, and memory management.

Because hardware resources of graphics processing engines 1631-1632, N are mapped explicitly to a real address space seen by host processor 1607, any host processor can address these resources directly using an effective address value. One function of accelerator integration circuit 1636, in one embodiment, is physical separation of graphics processing engines 1631-1632, N so that they appear to a system as independent units.

In at least one embodiment, one or more graphics memories 1633-1634, M are coupled to each of graphics processing engines 1631-1632, N, respectively. Graphics memories 1633-1634, M store instructions and data being processed by each of graphics processing engines 1631-1632, N. Graphics memories 1633-1634, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 1640, biasing techniques are used to ensure that data stored in graphics memories 1633-1634, M is data which will be used most frequently by graphics processing engines 1631-1632, N and preferably not used by cores 1660A-1660D (at least not frequently). Similarly, a biasing mechanism attempts to keep data needed by cores (and preferably not graphics processing engines 1631-1632, N) within caches 1662A-1662D, 1656 of cores and system memory 1614.

Figure 18:
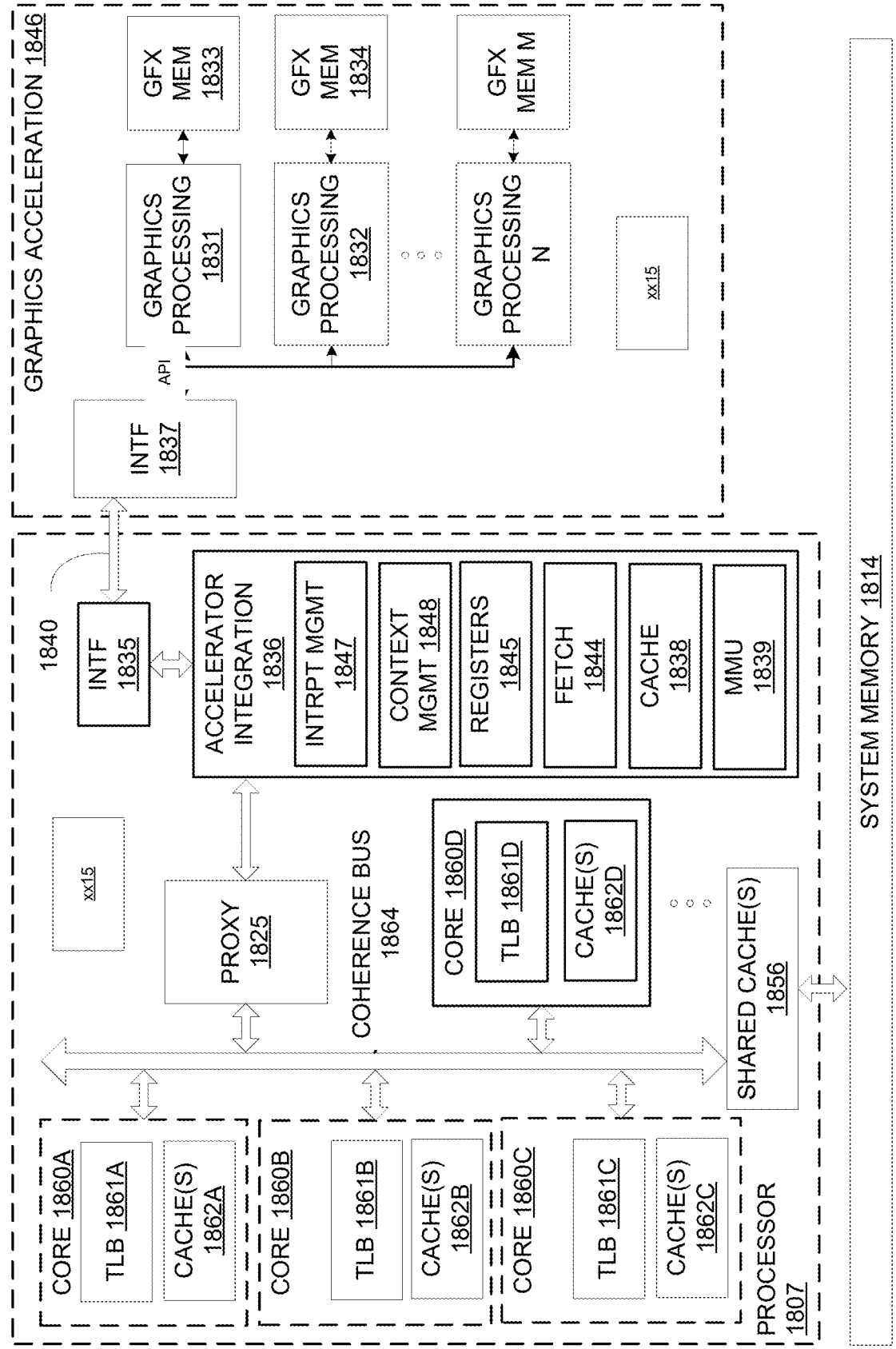
FIG. 18 illustrates a computer system, according to at least one embodiment.

FIG. 18 illustrates another exemplary embodiment in which accelerator integration circuit 1636 is integrated within processor 1607. In at least this embodiment, graphics processing engines 1631-1632, N communicate directly over high-speed link 1640 to accelerator integration circuit 1636 via interface 1637 and interface 1635 (which, again, may be utilize any form of bus or interface protocol). Accelerator integration circuit 1636 may perform same operations as those described with respect to FIG. 17, but potentially at a higher throughput given its close proximity to coherence bus 1664 and caches 1662A-1662D, 1656. At least one embodiment supports different programming models including a dedicated-process programming model (no graphics acceleration module virtualization) and shared programming models (with virtualization), which may include programming models which are controlled by accelerator integration circuit 1636 and programming models which are controlled by graphics acceleration module 1646.

In at least one embodiment, graphics processing engines 1631-1632, N are dedicated to a single application or process under a single operating system. In at least one embodiment, a single application can funnel other application requests to graphics processing engines 1631-1632, N, providing virtualization within a VM/partition.

In at least one embodiment, graphics processing engines 1631-1632, N, may be shared by multiple VM/application partitions. In at least one embodiment, shared models may use a system hypervisor to virtualize graphics processing engines 1631-1632, N to allow access by each operating system. For single-partition systems without a hypervisor, graphics processing engines 1631-1632, N are owned by an operating system. In at least one embodiment, an operating system can virtualize graphics processing engines 1631-1632, N to provide access to each process or application.

In at least one embodiment, graphics acceleration module 1646 or an individual graphics processing engine 1631-1632, N selects a process element using a process handle. In at least one embodiment, process elements are stored in system memory 1614 and are addressable using an effective address to real address translation techniques described herein. In at least one embodiment, a process handle may be an implementation-specific value provided to a host process when registering its context with graphics processing engine 1631-1632, N (that is, calling system software to add a process element to a process element linked list). In at least one embodiment, a lower 16-bits of a process handle may be an offset of a process element within a process element linked list.

Figure 19:
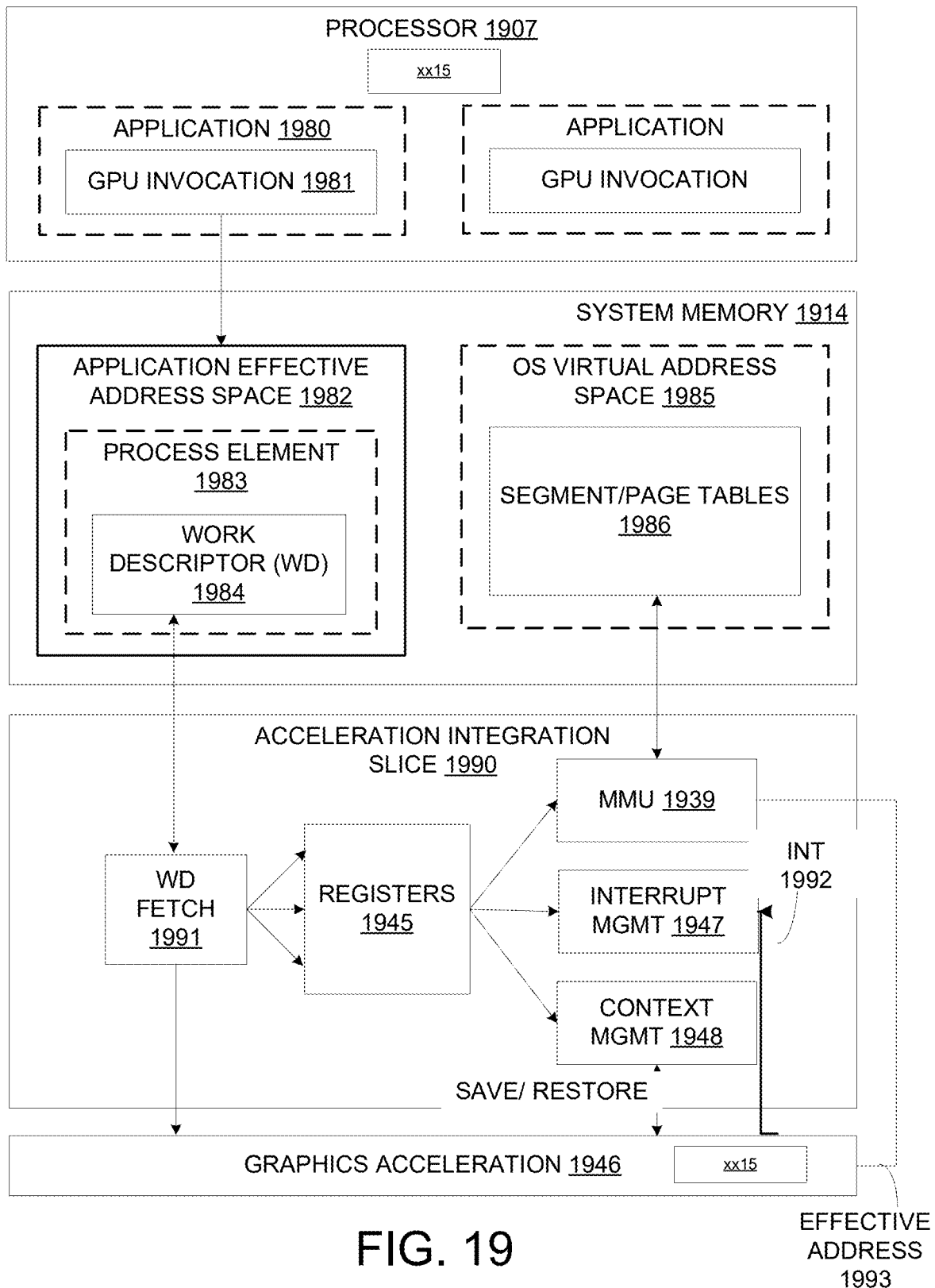
FIG. 19 illustrates a computer system, according to at least one embodiment.

FIG. 19 illustrates an exemplary accelerator integration slice 1690. As used herein, a "slice" comprises a specified portion of processing resources of accelerator integration circuit 1636. Application effective address space 1682 within system memory 1614 stores process elements 1683. In one embodiment, process elements 1683 are stored in response to GPU invocations 1681 from applications 1680 executed on processor 1607. A process element 1683 contains process state for corresponding application 1680. A work descriptor (WD) 1684 contained in process element 1683 can be a single job requested by an application or may contain a pointer to a queue of jobs. In at least one embodiment, WD 1684 is a pointer to a job request queue in an application's address space 1682.

Graphics acceleration module 1646 and/or individual graphics processing engines 1631-1632, N can be shared by all or a subset of processes in a system. In at least one embodiment, an infrastructure for setting up process state and sending a WD 1684 to a graphics acceleration module 1646 to start a job in a virtualized environment may be included.

In at least one embodiment, a dedicated-process programming model is implementation-specific. In this model, a single process owns graphics acceleration module 1646 or an individual graphics processing engine 1631. Because graphics acceleration module 1646 is owned by a single process, a hypervisor initializes accelerator integration circuit 1636 for an owning partition and an operating system initializes accelerator integration circuit 1636 for an owning process when graphics acceleration module 1646 is assigned.

In operation, a WD fetch unit 1691 in accelerator integration slice 1690 fetches next WD 1684 which includes an indication of work to be done by one or more graphics processing engines of graphics acceleration module 1646. Data from WD 1684 may be stored in registers 1645 and used by MMU 1639, interrupt management circuit 1647, and/or context management circuit 1648 as illustrated. For example, one embodiment of MMU 1639 includes segment/page walk circuitry for accessing segment/page tables 1686 within OS virtual address space 1685. Interrupt management circuit 1647 may process interrupt events 1692 received from graphics acceleration module 1646. When performing graphics operations, an effective address 1693 generated by a graphics processing engine 1631-1632, N is translated to a real address by MMU 1639.

In one embodiment, a same set of registers 1645 are duplicated for each graphics processing engine 1631-1632, N and/or graphics acceleration module 1646 and may be initialized by a hypervisor or operating system. Each of these duplicated registers may be included in an accelerator integration slice 1690. Exemplary registers that may be initialized by a hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

1 Process and Thread Identification
2 Effective Address (EA) Context Save/Restore Pointer
3 Virtual Address (VA) Accelerator Utilization Record Pointer
4 Virtual Address (VA) Storage Segment Table Pointer
5 Authority Mask
6 Work descriptor In one embodiment, each WD 1684 is specific to a particular graphics acceleration module 1646 and/or graphics processing engines 1631-1632, N. It contains all information required by a graphics processing engine 1631-1632, N to do work or it can be a pointer to a memory location where an application has set up a command queue of work to be completed.

Figure 20:
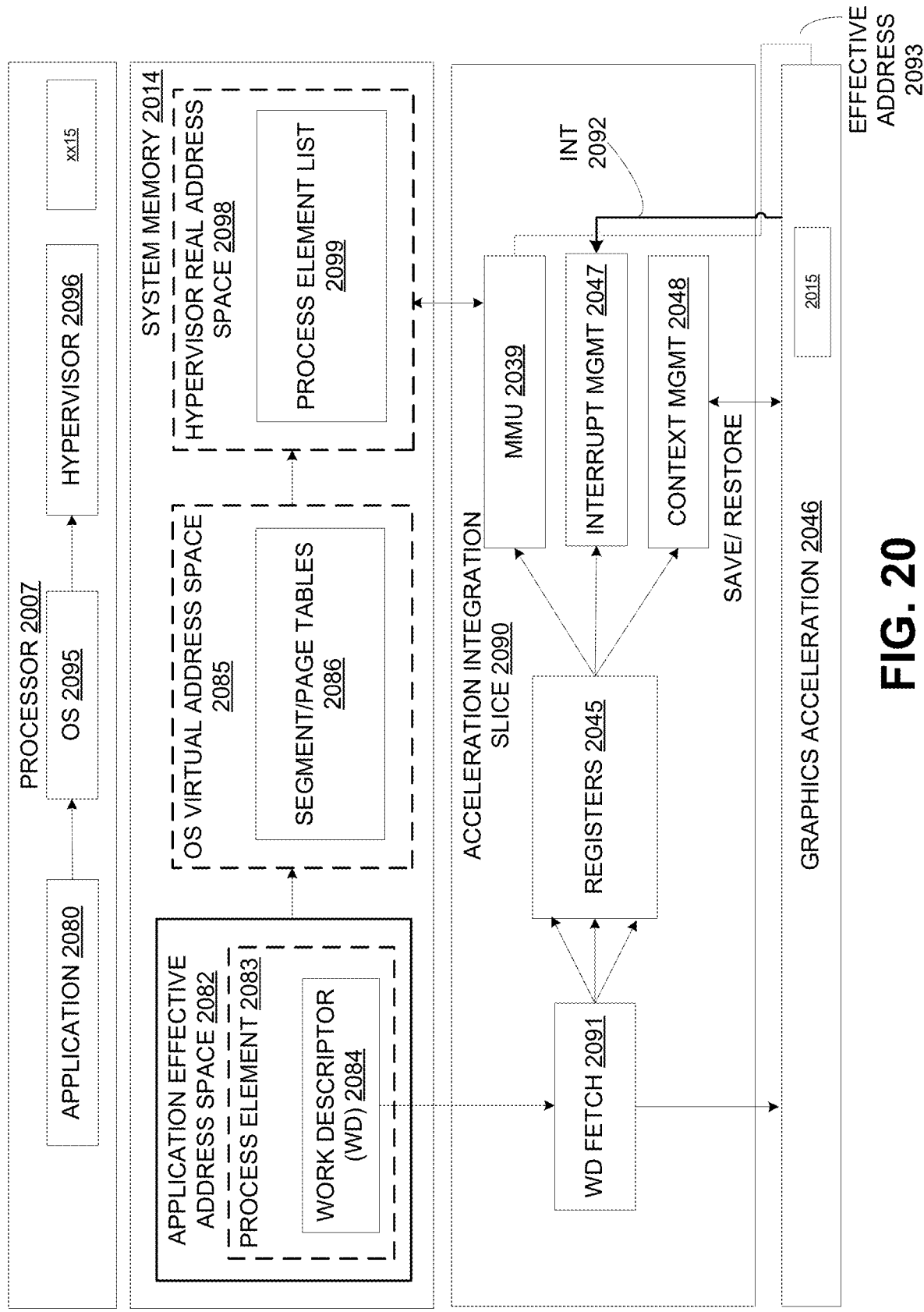
FIGS. 20 and 21 illustrate a shared programming model, according to at least one embodiment.

FIG. 20 illustrates additional details for one exemplary embodiment of a shared model. This embodiment includes a hypervisor real address space 1698 in which a process element list 1699 is stored. Hypervisor real address space 1698 is accessible via a hypervisor 1696 which virtualizes graphics acceleration module engines for operating system 1695.

In at least one embodiment, shared programming models allow for all or a subset of processes from all or a subset of partitions in a system to use a graphics acceleration module 1646. There are two programming models where graphics acceleration module 1646 is shared by multiple processes and partitions: time-sliced shared and graphics-directed shared.

In this model, system hypervisor 1696 owns graphics acceleration module 1646 and makes its function available to all operating systems 1695. For a graphics acceleration module 1646 to support virtualization by system hypervisor 1696, graphics acceleration module 1646 may adhere to the following: 1) An application's job request must be autonomous (that is, state does not need to be maintained between jobs), or graphics acceleration module 1646 must provide a context save and restore mechanism. 2) An application's job request is guaranteed by graphics acceleration module 1646 to complete in a specified amount of time, including any translation faults, or graphics acceleration module 1646 provides an ability to preempt processing of a job. 3) Graphics acceleration module 1646 must be guaranteed fairness between processes when operating in a directed shared programming model.

In at least one embodiment, application 1680 is required to make an operating system 1695 system call with a graphics acceleration module 1646 type, a work descriptor (WD), an authority mask register (AMR) value, and a context save/restore area pointer (CSRP). In at least one embodiment, graphics acceleration module 1646 type describes a targeted acceleration function for a system call. In at least one embodiment, graphics acceleration module 1646 type may be a system-specific value. In at least one embodiment, WD is formatted specifically for graphics acceleration module 1646 and can be in a form of a graphics acceleration module 1646 command, an effective address pointer to a user-defined structure, an effective address pointer to a queue of commands, or any other data structure to describe work to be done by graphics acceleration module 1646. In one embodiment, an AMR value is an AMR state to use for a current process. In at least one embodiment, a value passed to an operating system is similar to an application setting an AMR. If accelerator integration circuit 1636 and graphics acceleration module 1646 implementations do not support a User Authority Mask Override Register (UAMOR), an operating system may apply a current UAMOR value to an AMR value before passing an AMR in a hypervisor call. Hypervisor 1696 may optionally apply a current Authority Mask Override Register (AMOR) value before placing an AMR into process element 1683. In at least one embodiment, CSRP is one of registers 1645 containing an effective address of an area in an application's effective address space 1682 for graphics acceleration module 1646 to save and restore context state. This pointer is optional if no state is required to be saved between jobs or when a job is preempted. In at least one embodiment, context save/restore area may be pinned system memory.

Upon receiving a system call, operating system 1695 may verify that application 1680 has registered and been given authority to use graphics acceleration module 1646. Operating system 1695 then calls hypervisor 1696 with information shown in Table 3.

TABLE 3

OS to Hypervisor Call Parameters

1 A work descriptor (WD)
2 An Authority Mask Register (AMR) value (potentially masked)
3 An effective address (EA) Context Save/Restore Area Pointer (CSRP)
4 A process ID (PID) and optional thread ID (TID)
5 A virtual address (VA) accelerator utilization record pointer (AURP)
6 Virtual address of storage segment table pointer (SSTP)
7 A logical interrupt service number (LISN)

Upon receiving a hypervisor call, hypervisor 1696 verifies that operating system 1695 has registered and been given authority to use graphics acceleration module 1646. Hypervisor 1696 then puts process element 1683 into a process element linked list for a corresponding graphics acceleration module 1646 type. A process element may include information shown in Table 4.

TABLE 4

Process Element Information

1 A work descriptor (WD)
2 An Authority Mask Register (AMR) value (potentially masked).
3 An effective address (EA) Context Save/Restore Area Pointer (CSRP)
4 A process ID (PID) and optional thread ID (TID)
5 A virtual address (VA) accelerator utilization record pointer (AURP)
6 Virtual address of storage segment table pointer (SSTP)
7 A logical interrupt service number (LISN)
8 Interrupt vector table, derived from hypervisor call parameters
9 A state register (SR) value
10 A logical partition ID (LPID)
11 A real address (RA) hypervisor accelerator utilization record pointer
12 Storage Descriptor Register (SDR)

In at least one embodiment, hypervisor initializes a plurality of accelerator integration slice 1690 registers 1645.

Figure 21:
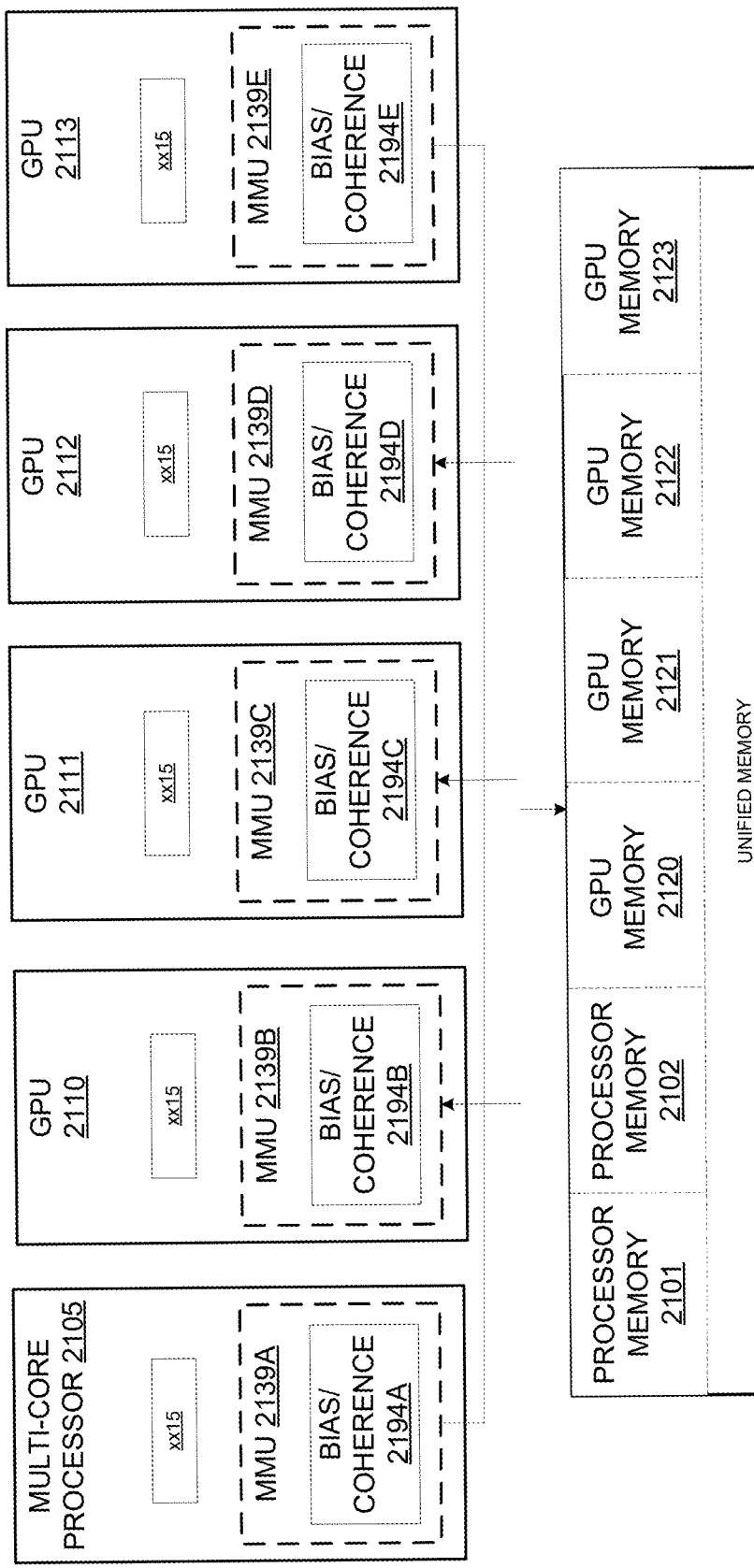

As illustrated in FIG. 21, in at least one embodiment, a unified memory is used, addressable via a common virtual memory address space used to access physical processor memories 1601-1602 and GPU memories 1620-1623. In this implementation, operations executed on GPUs 1610-1613 utilize a same virtual/effective memory address space to access processor memories 1601-1602 and vice versa, thereby simplifying programmability. In one embodiment, a first portion of a virtual/effective address space is allocated to processor memory 1601, a second portion to second processor memory 1602, a third portion to GPU memory 1620, and so on. In at least one embodiment, an entire virtual/effective memory space (sometimes referred to as an effective address space) is thereby distributed across each of processor memories 1601-1602 and GPU memories 1620-1623, allowing any processor or GPU to access any physical memory with a virtual address mapped to that memory.

In one embodiment, bias/coherence management circuitry 1694A-1694E within one or more of MMUs 1639A-1639E ensures cache coherence between caches of one or more host processors (e.g., 1605) and GPUs 1610-1613 and implements biasing techniques indicating physical memories in which certain types of data should be stored. While multiple instances of bias/coherence management circuitry 1694A-1694E are illustrated in FIG. 21, bias/coherence circuitry may be implemented within an MMU of one or more host processors 1605 and/or within accelerator integration circuit 1636.

One embodiment allows GPU-attached memory 1620-1623 to be mapped as part of system memory, and accessed using shared virtual memory (SVM) technology, but without suffering performance drawbacks associated with full system cache coherence. In at least one embodiment, an ability for GPU-attached memory 1620-1623 to be accessed as system memory without onerous cache coherence overhead provides a beneficial operating environment for GPU offload. This arrangement allows host processor 1605 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 1620-1623 without cache coherence overheads can be critical to execution time of an offloaded computation. In cases with substantial streaming write memory traffic, for example, cache coherence overhead can significantly reduce an effective write bandwidth seen by a GPU 1610-1613. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 1620-1623, with or without a bias cache in GPU 1610-1613 (e.g., to cache frequently/recently used entries of a bias table). Alternatively, an entire bias table may be maintained within a GPU.

In at least one embodiment, a bias table entry associated with each access to GPU-attached memory 1620-1623 is accessed prior to actual access to a GPU memory, causing the following operations. First, local requests from GPU 1610-1613 that find their page in GPU bias are forwarded directly to a corresponding GPU memory 1620-1623. Local requests from a GPU that find their page in host bias are forwarded to processor 1605 (e.g., over a high-speed link as discussed above). In one embodiment, requests from processor 1605 that find a requested page in host processor bias complete a request like a normal memory read. Alternatively, requests directed to a GPU-biased page may be forwarded to GPU 1610-1613. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 1605 bias to GPU bias, but is not for an opposite transition.

In one embodiment, cache coherency is maintained by temporarily rendering GPU-biased pages uncacheable by host processor 1605. To access these pages, processor 1605 may request access from GPU 1610 which may or may not grant access right away. Thus, to reduce communication between processor 1605 and GPU 1610 it is beneficial to ensure that GPU-biased pages are those which are required by a GPU but not host processor 1605 and vice versa.

Inference and/or training logic 1015 are used to perform one or more embodiments. Details regarding the inference and/or training logic 1015 are provided below in conjunction with FIGS. 9 and/or 10. In at least one embodiment inference and/or training logic 1015 are used for segmentation based on a set of extreme points.

Figure 22:
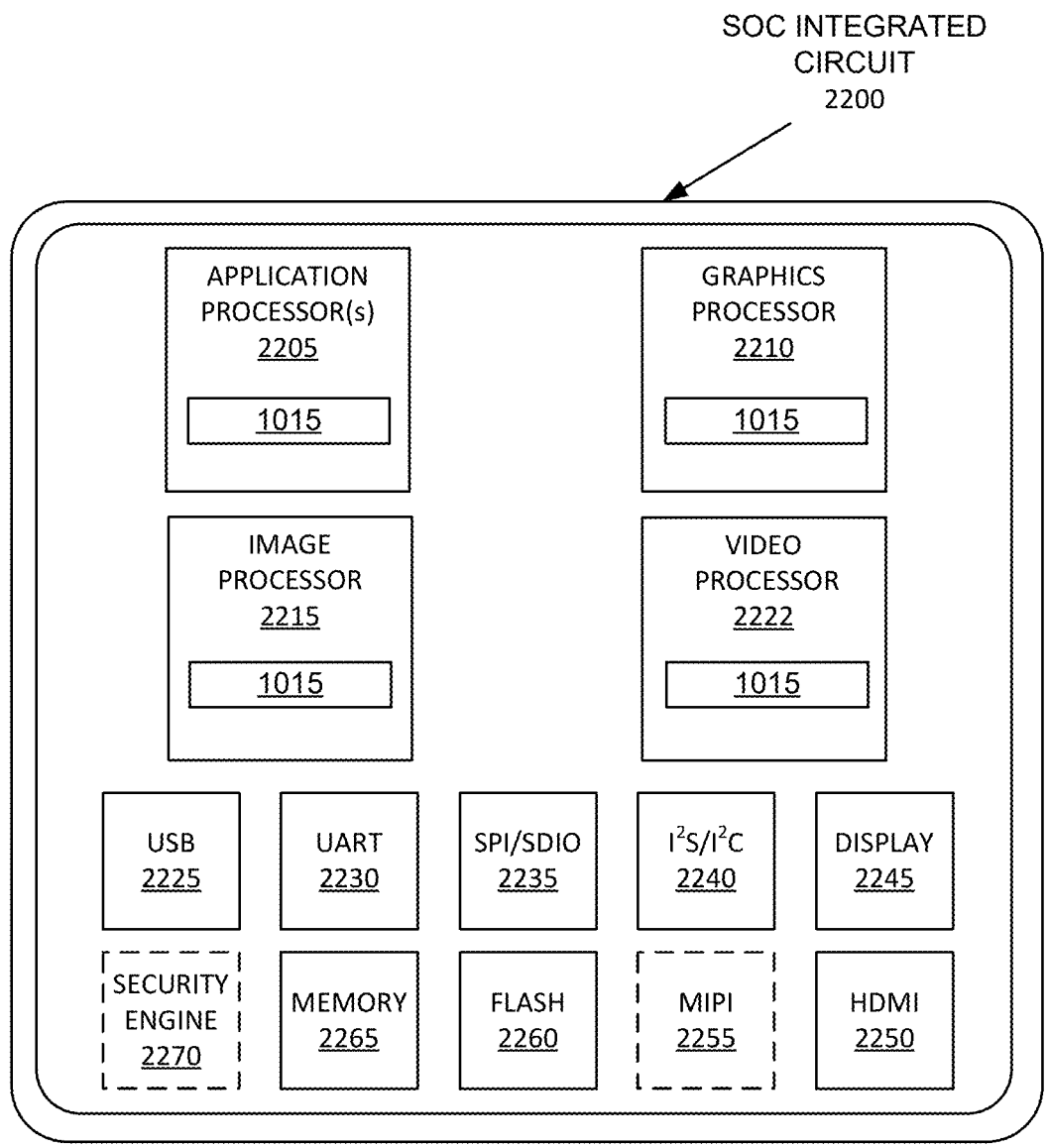
FIG. 22 illustrates exemplary integrated circuits and associated graphics processors, according to at least one embodiment.

FIG. 22 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 22 is a block diagram illustrating an exemplary system on a chip integrated circuit 2200 that may be fabricated using one or more IP cores, according to at least one embodiment. In at least one embodiment, integrated circuit 2200 includes one or more application processor(s) 2205 (e.g., CPUs), at least one graphics processor 2210, and may additionally include an image processor 2215 and/or a video processor 2220, any of which may be a modular IP core. In at least one embodiment, integrated circuit 2200 includes peripheral or bus logic including a USB controller 2225, UART controller 2230, an SPI/SDIO controller 2235, and an $I^2S/I^2C$ controller 2240. In at least one embodiment, integrated circuit 2200 can include a display device 2245 coupled to one or more of a high-definition multimedia interface (HDMI) controller 2250 and a mobile industry processor interface (MIPI) display interface 2255. In at least one embodiment, storage may be provided by a flash memory subsystem 2260 including flash memory and a flash memory controller. In at least one embodiment, memory interface may be provided via a memory controller 2265 for access to SDRAM or SRAM memory devices. In at least one embodiment, some integrated circuits additionally include an embedded security engine 2270.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in integrated circuit 2200 for inferencing or predicting operations based, at least in part, on weight parameters calculated using neural network training operations, neural network functions and/or architectures, or neural network use cases described herein. In at least one embodiment inference and/or training logic 1015 are used for segmentation based on a set of extreme points.

Figure 23:
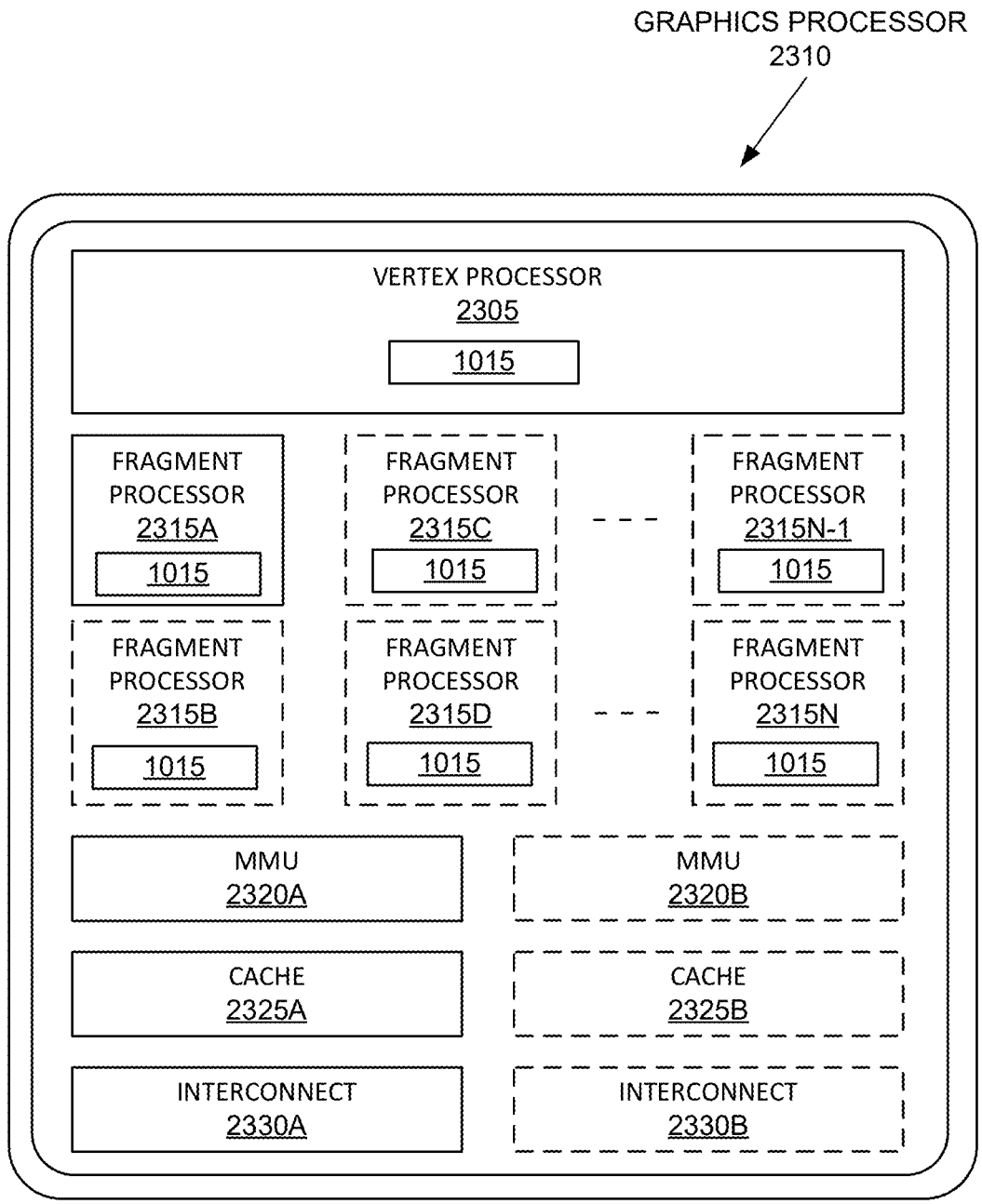
FIGS. 23-24 illustrate exemplary integrated circuits and associated graphics processors, according to at least one embodiment.
Figure 24:
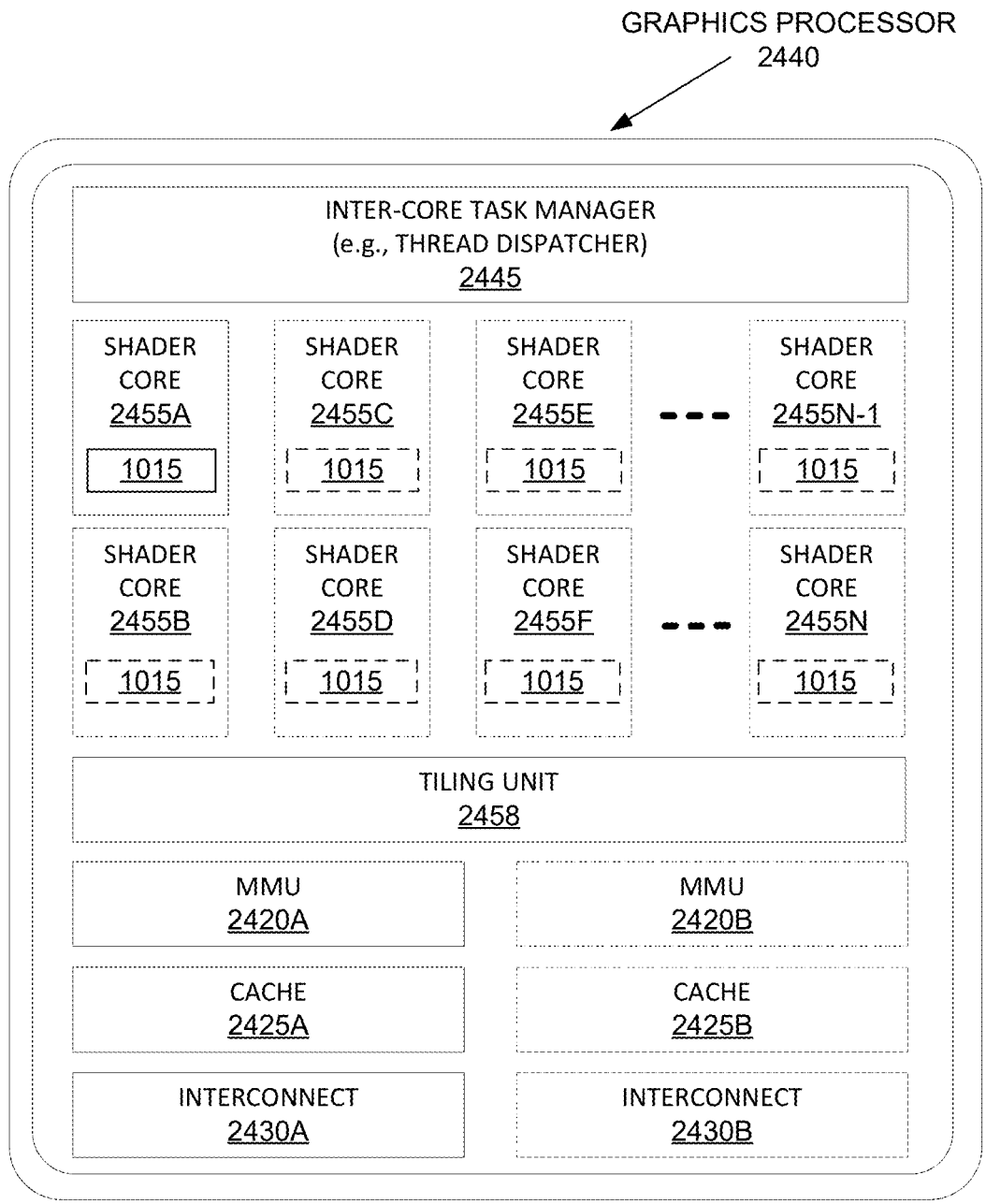

FIGS. 23-24 illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 23-24 are block diagrams illustrating exemplary graphics processors for use within an SoC, according to embodiments described herein. FIG. 23 illustrates an exemplary graphics processor 2310 of a system on a chip integrated circuit that may be fabricated using one or more IP cores, according to at least one embodiment. FIG. 24 illustrates an additional exemplary graphics processor 2340 of a system on a chip integrated circuit that may be fabricated using one or more IP cores, according to at least one embodiment. In at least one embodiment, graphics processor 2310 of FIG. 23 is a low power graphics processor core. In at least one embodiment, graphics processor 2340 of FIG. 24 is a higher performance graphics processor core. In at least one embodiment, each of graphics processors 2310, 2340 can be variants of graphics processor 2210 of FIG. 22.

In at least one embodiment, graphics processor 2310 includes a vertex processor 2305 and one or more fragment processor(s) 2315A-2315N (e.g., 2315A, 2315B, 2315C, 2315D, through 2315N-1, and 2315N). In at least one embodiment, graphics processor 2310 can execute different shader programs via separate logic, such that vertex processor 2305 is optimized to execute operations for vertex shader programs, while one or more fragment processor(s) 2315A-2315N execute fragment (e.g., pixel) shading operations for fragment or pixel shader programs. In at least one embodiment, vertex processor 2305 performs a vertex processing stage of a 3D graphics pipeline and generates primitives and vertex data. In at least one embodiment, fragment processor(s) 2315A-2315N use primitive and vertex data generated by vertex processor 2305 to produce a framebuffer that is displayed on a display device. In at least one embodiment, fragment processor(s) 2315A-2315N are optimized to execute fragment shader programs as provided for in an OpenGL API, which may be used to perform similar operations as a pixel shader program as provided for in a Direct 3D API.

In at least one embodiment, graphics processor 2310 additionally includes one or more memory management units (MMUs) 2320A-2320B, cache(s) 2325A-2325B, and circuit interconnect(s) 2330A-2330B. In at least one embodiment, one or more MMU(s) 2320A-2320B provide for virtual to physical address mapping for graphics processor 2310, including for vertex processor 2305 and/or fragment processor(s) 2315A-2315N, which may reference vertex or image/texture data stored in memory, in addition to vertex or image/texture data stored in one or more cache(s) 2325A-2325B. In at least one embodiment, one or more MMU(s) 2320A-2320B may be synchronized with other MMUs within system, including one or more MMUs associated with one or more application processor(s) 2205, image processors 2215, and/or video processors 2220 of FIG. 22, such that each processor 2205-2220 can participate in a shared or unified virtual memory system. In at least one embodiment, one or more circuit interconnect(s) 2330A-2330B enable graphics processor 2310 to interface with other IP cores within SoC, either via an internal bus of SoC or via a direct connection.

In at least one embodiment, graphics processor 2340 includes one or more MMU(s) 2320A-2320B, cache(s) 2325A-2325B, and circuit interconnect(s) 2330A-2330B of graphics processor 2310 of FIG. 23. In at least one embodiment, graphics processor 2340 includes one or more shader core(s) 2355A-2355N (e.g., 2355A, 2355B, 2355C, 2355D, 2355E, 2355F, through 2355N-1, and 2355N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2340 includes an inter-core task manager 2345, which acts as a thread dispatcher to dispatch execution threads to one or more shader cores 2355A-2355N and a tiling unit 2358 to accelerate tiling operations for tile-based rendering, in which rendering operations for a scene are subdivided in image space, for example to exploit local spatial coherence within a scene or to optimize use of internal caches.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in integrated circuit 23 and/or 24 for inferencing or predicting operations based, at least in part, on weight parameters calculated using neural network training operations, neural network functions and/or architectures, or neural network use cases described herein. In at least one embodiment inference and/or training logic 1015 are used for segmentation based on a set of extreme points.

Figure 25:
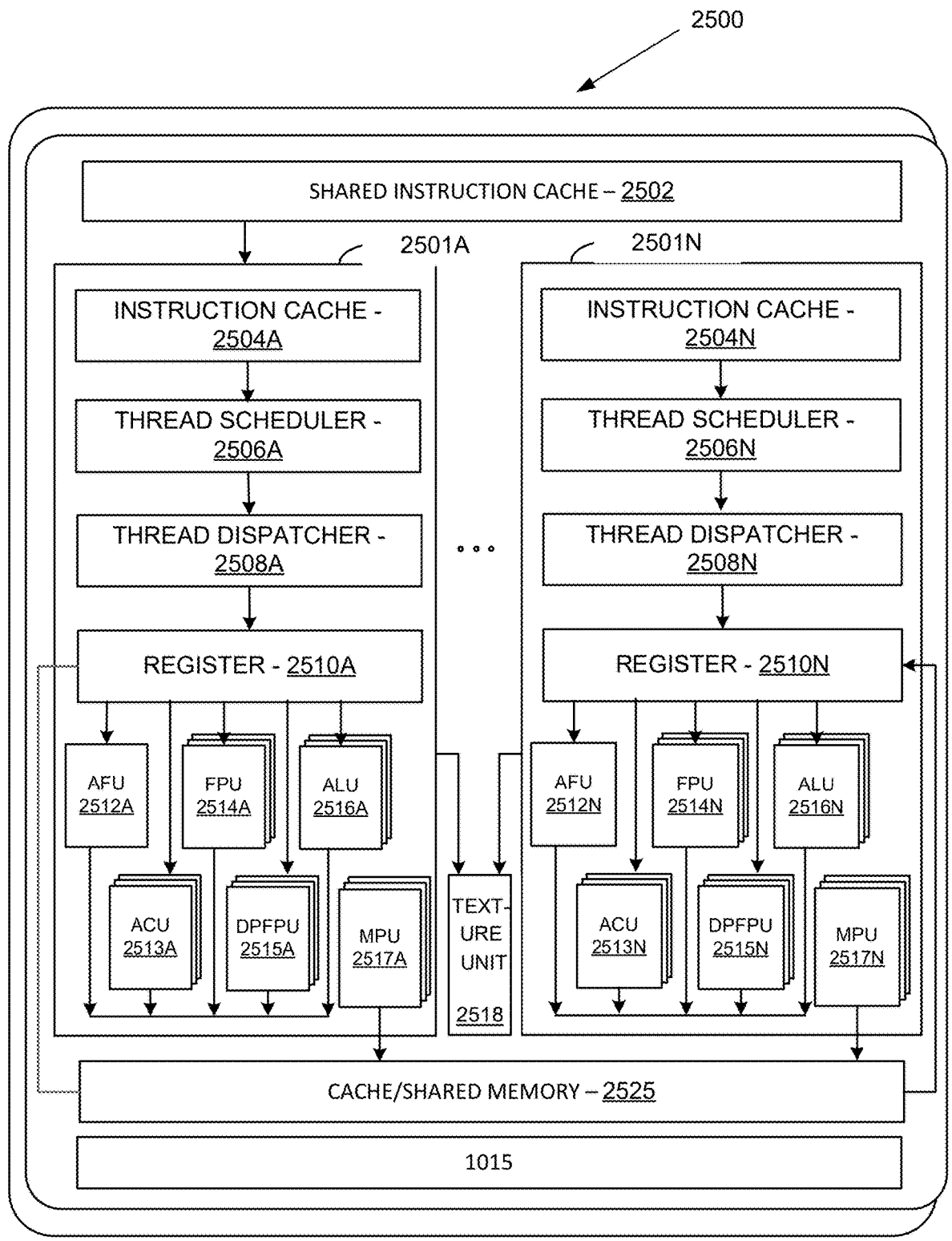
FIGS. 25-26 illustrate additional exemplary graphics processor logic, according to at least one embodiment.
Figure 26:
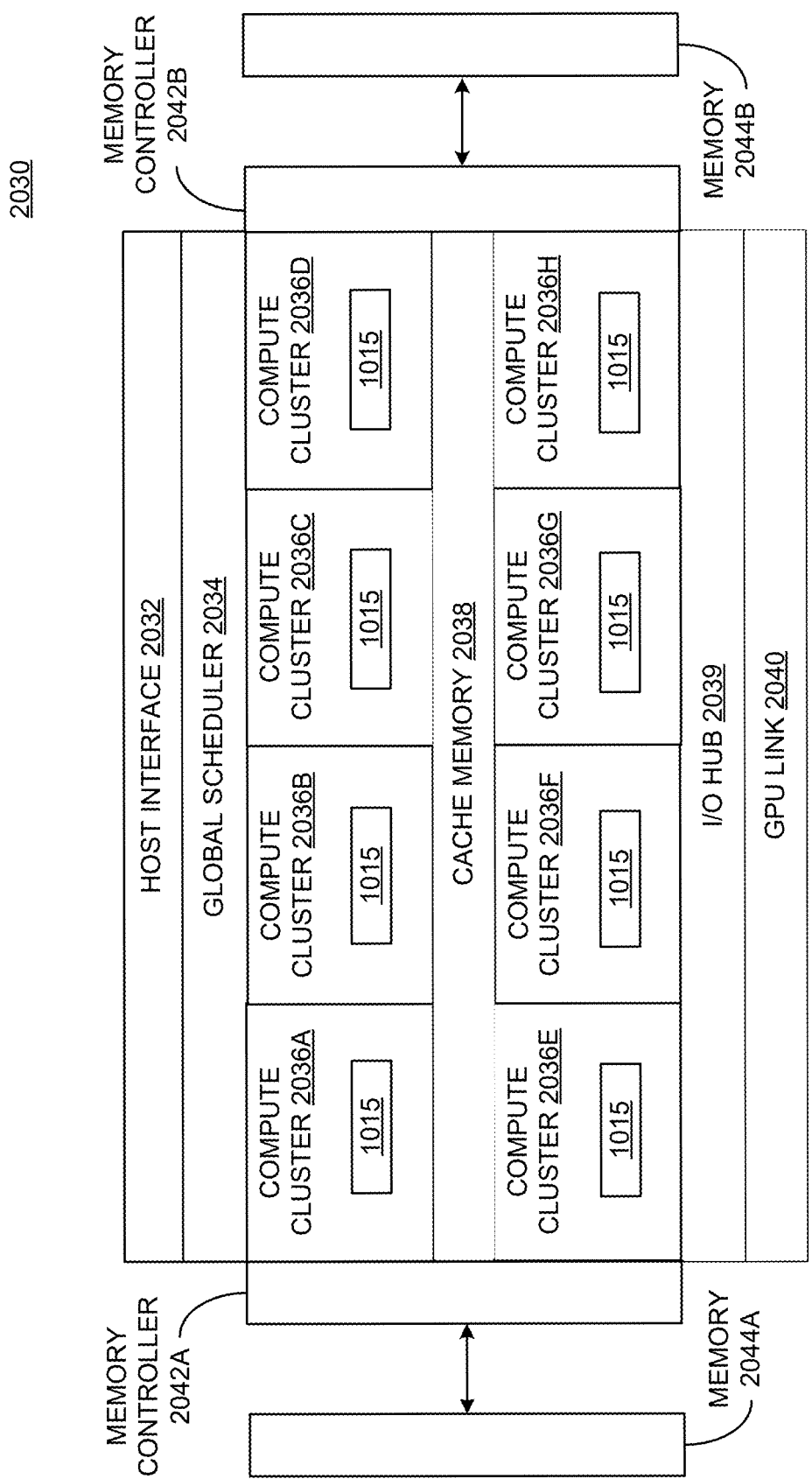

FIGS. 25-26 illustrate additional exemplary graphics processor logic according to embodiments described herein. FIG. 25 illustrates a graphics core 2500 that may be included within graphics processor 2210 of FIG. 22, in at least one embodiment, and may be a unified shader core 2355A-2355N as in FIG. 24 in at least one embodiment. FIG. 26 illustrates a highly-parallel general-purpose graphics processing unit 2530 suitable for deployment on a multi-chip module in at least one embodiment.

In at least one embodiment, graphics core 2500 includes a shared instruction cache 2502, a texture unit 2518, and a cache/shared memory 2520 that are common to execution resources within graphics core 2500. In at least one embodiment, graphics core 2500 can include multiple slices 2501A-2501N or partition for each core, and a graphics processor can include multiple instances of graphics core 2500. Slices 2501A-2501N can include support logic including a local instruction cache 2504A-2504N, a thread scheduler 2506A-2506N, a thread dispatcher 2508A-2508N, and a set of registers 2510A-2510N. In at least one embodiment, slices 2501A-2501N can include a set of additional function units (AFUs 2512A-2512N), floating-point units (FPU 2514A-2514N), integer arithmetic logic units (ALUs 2516-2516N), address computational units (ACU 2513A-2513N), double-precision floating-point units (DPFPU 2515A-2515N), and matrix processing units (MPU 2517A-2517N).

In at least one embodiment, FPUs 2514A-2514N can perform single-precision (32-bit) and half-precision (16-bit) floating point operations, while DPFPUs 2515A-2515N perform double precision (64-bit) floating point operations. In at least one embodiment, ALUs 2516A-2516N can perform variable precision integer operations at 8-bit, 16-bit, and 32-bit precision, and can be configured for mixed precision operations. In at least one embodiment, MPUs 2517A-2517N can also be configured for mixed precision matrix operations, including half-precision floating point and 8-bit integer operations. In at least one embodiment, MPUs 2517A-2517N can perform a variety of matrix operations to accelerate machine learning application frameworks, including enabling support for accelerated general matrix to matrix multiplication (GEMM). In at least one embodiment, AFUs 2512A-2512N can perform additional logic operations not supported by floating-point or integer units, including trigonometric operations (e.g., Sine, Cosine, etc.).

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in graphics core 2500 for inferencing or predicting operations based, at least in part, on weight parameters calculated using neural network training operations, neural network functions and/or architectures, or neural network use cases described herein. In at least one embodiment inference and/or training logic 1015 are used for segmentation based on a set of extreme points.

FIG. 26 illustrates a general-purpose processing unit (GPGPU) 2530 that can be configured to enable highly-parallel compute operations to be performed by an array of graphics processing units, in at least one embodiment. In at least one embodiment, GPGPU 2530 can be linked directly to other instances of GPGPU 2530 to create a multi-GPU cluster to improve training speed for deep neural networks. In at least one embodiment, GPGPU 2530 includes a host interface 2532 to enable a connection with a host processor. In at least one embodiment, host interface 2532 is a PCI Express interface. In at least one embodiment, host interjace 2532 can be a vendor specific communications interface or communications fabric. In at least one embodiment, GPGPU 2530 receives commands from a host processor and uses a global scheduler 2534 to distribute execution threads associated with those commands to a set of compute clusters 2536A-2536H. In at least one embodiment, compute clusters 2536A-2536H share a cache memory 2538. In at least one embodiment, cache memory 2538 can serve as a higher-level cache for cache memories within compute clusters 2536A-2536H.

In at least one embodiment, GPGPU 2530 includes memory 2544A-2544B coupled with compute clusters 2536A-2536H via a set of memory controllers 2542A-2542B. In at least one embodiment, memory 2544A-2544B can include various types of memory devices including dynamic random access memory (DRAM) or graphics random access memory, such as synchronous graphics random access memory (SGRAM), including graphics double data rate (GDDR) memory.

In at least one embodiment, compute clusters 2536A-2536H each include a set of graphics cores, such as graphics core 2500 of FIG. 25, which can include multiple types of integer and floating point logic units that can perform computational operations at a range of precisions including suited for machine learning computations. For example, in at least one embodiment, at least a subset of floating point units in each of compute clusters 2536A-2536H can be configured to perform 16-bit or 32-bit floating point operations, while a different subset of floating point units can be configured to perform 64-bit floating point operations.

In at least one embodiment, multiple instances of GPGPU 2530 can be configured to operate as a compute cluster. In at least one embodiment, communication used by compute clusters 2536A-2536H for synchronization and data exchange varies across embodiments. In at least one embodiment, multiple instances of GPGPU 2530 communicate over host interface 2532. In at least one embodiment, GPGPU 2530 includes an I/O hub 2539 that couples GPGPU 2530 with a GPU link 2540 that enables a direct connection to other instances of GPGPU 2530. In at least one embodiment, GPU link 2540 is coupled to a dedicated GPU-to-GPU bridge that enables communication and synchronization between multiple instances of GPGPU 2530. In at least one embodiment, GPU link 2540 couples with a high speed interconnect to transmit and receive data to other GPGPUs or parallel processors. In at least one embodiment, multiple instances of GPGPU 2530 are located in separate data processing systems and communicate via a network device that is accessible via host interface 2532. In at least one embodiment GPU, link 2540 can be configured to enable a connection to a host processor in addition to or as an alternative to host interface 2532.

In at least one embodiment, GPGPU 2530 can be configured to train neural networks. In at least one embodiment, GPGPU 2530 can be used within a inferencing platform. In at least one embodiment, in which GPGPU 2530 is used for inferencing, GPGPU may include fewer compute clusters 2536A-2536H relative to when GPGPU is used for training a neural network. In at least one embodiment, memory technology associated with memory 2544A-2544B may differ between inferencing and training configurations, with higher bandwidth memory technologies devoted to training configurations. In at least one embodiment, inferencing configuration of GPGPU 2530 can support inferencing specific instructions. For example, in at least one embodiment, an inferencing configuration can provide support for one or more 8-bit integer dot product instructions, which may be used during inferencing operations for deployed neural networks.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in GPGPU 2530 for inferencing or predicting operations based, at least in part, on weight parameters calculated using neural network training operations, neural network functions and/or architectures, or neural network use cases described herein. In at least one embodiment, inference and/or training logic 1015 are used to perform segmentation based on extreme points.

Figure 27:
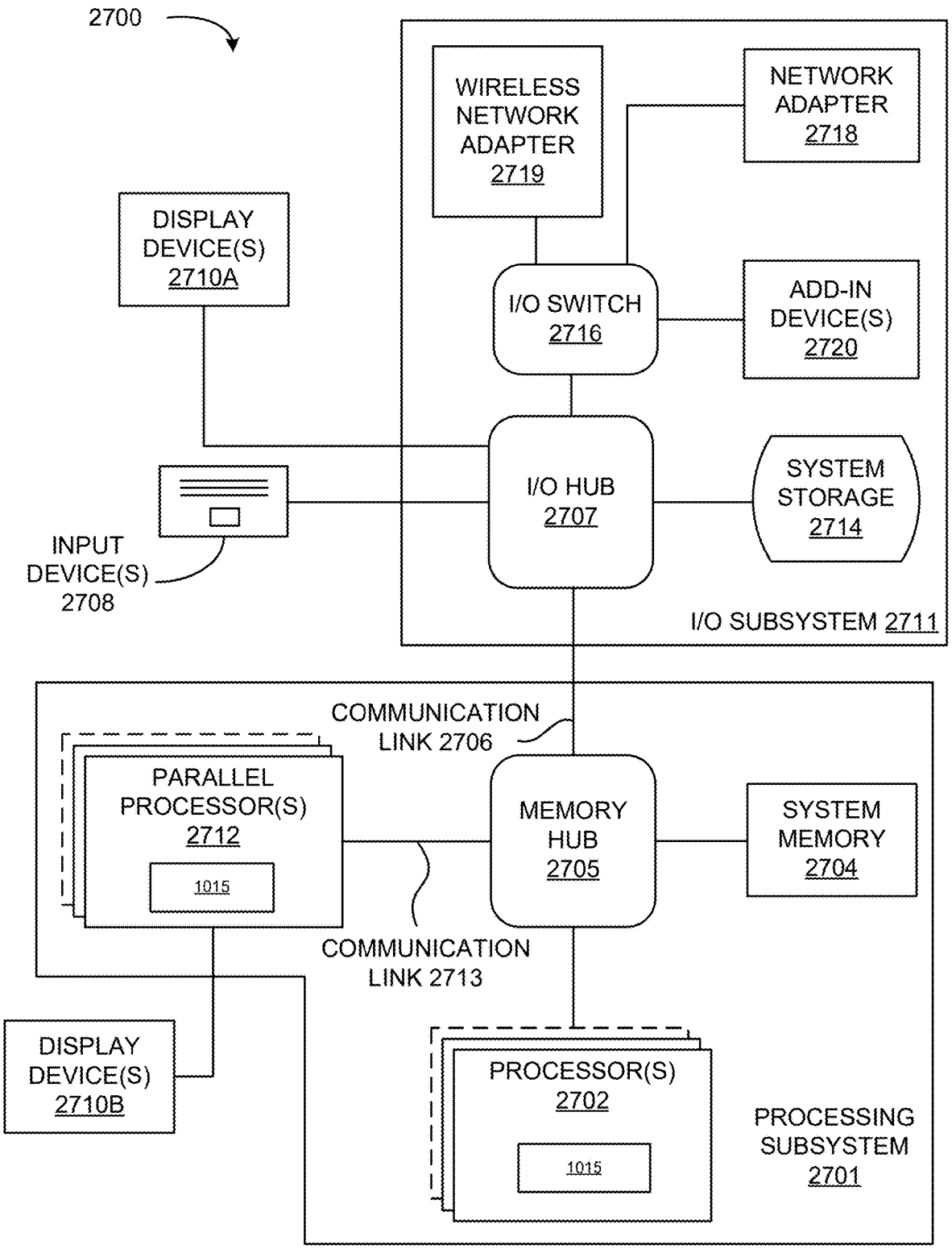
FIG. 27 illustrates a computer system, according to at least one embodiment.

FIG. 27 is a block diagram illustrating a computing system 2700 according to at least one embodiment. In at least one embodiment, computing system 2700 includes a processing subsystem 2701 having one or more processor(s) 2702 and a system memory 2704 communicating via an interconnection path that may include a memory hub 2705. In at least one embodiment, memory hub 2705 may be a separate component within a chipset component or may be integrated within one or more processor(s) 2702. In at least one embodiment, memory hub 2705 couples with an I/O subsystem 2711 via a communication link 2706. In at least one embodiment, I/O subsystem 2711 includes an I/O hub 2707 that can enable computing system 2700 to receive input from one or more input device(s) 2708. In at least one embodiment, I/O hub 2707 can enable a display controller, which may be included in one or more processor(s) 2702, to provide outputs to one or more display device(s) 2710A. In at least one embodiment, one or more display device(s)

2710A coupled with I/O hub 2707 can include a local, internal, or embedded display device.

In at least one embodiment, processing subsystem 2701 includes one or more parallel processor(s) 2712 coupled to memory hub 2705 via a bus or other communication link 2713. In at least one embodiment, communication link 2713 may be one of any number of standards based communication link technologies or protocols, such as, but not limited to PCI Express, or may be a vendor specific communications interface or communications fabric. In at least one embodiment, one or more parallel processor(s) 2712 form a computationally focused parallel or vector processing system that can include a large number of processing cores and/or processing clusters, such as a many integrated core (MIC) processor. In at least one embodiment, one or more parallel processor(s) 2712 form a graphics processing subsystem that can output pixels to one of one or more display device(s) 2710A coupled via I/O Hub 2707. In at least one embodiment, one or more parallel processor(s) 2712 can also include a display controller and display interface (not shown) to enable a direct connection to one or more display device(s) 2710B.

In at least one embodiment, a system storage unit 2714 can connect to I/O hub 2707 to provide a storage mechanism for computing system 2700. In at least one embodiment, an I/O switch 2716 can be used to provide an interface mechanism to enable connections between I/O hub 2707 and other components, such as a network adapter 2718 and/or wireless network adapter 2719 that may be integrated into a platform(s), and various other devices that can be added via one or more add-in device(s) 2720. In at least one embodiment, network adapter 2718 can be an Ethernet adapter or another wired network adapter. In at least one embodiment, wireless network adapter 2719 can include one or more of a Wi-Fi, Bluetooth, near field communication (NFC), or other network device that includes one or more wireless radios.

In at least one embodiment, computing system 2700 can include other components not explicitly shown, including USB or other port connections, optical storage drives, video capture devices, and so on, may also be connected to I/O hub 2707. In at least one embodiment, communication paths interconnecting various components in FIG. 27 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 2712 incorporate circuitry optimized for graphics and video processing, including, for example, video output circuitry, and constitutes a graphics processing unit (GPU). In at least one embodiment, one or more parallel processor(s) 2712 incorporate circuitry optimized for general purpose processing. In at least one embodiment, components of computing system 2700 may be integrated with one or more other system elements on a single integrated circuit. For example, in at least one embodiment, one or more parallel processor(s) 2712, memory hub 2705, processor(s) 2702, and I/O hub 2707 can be integrated into a system on chip (SoC) integrated circuit. In at least one embodiment, components of computing system 2700 can be integrated into a single package to form a system in package (SIP) configuration. In at least one embodiment, at least a portion of components of computing system 2700 can be integrated into a multi-chip module (MCM), which can be interconnected with other multi-chip modules into a modular computing system.

Figure 28:
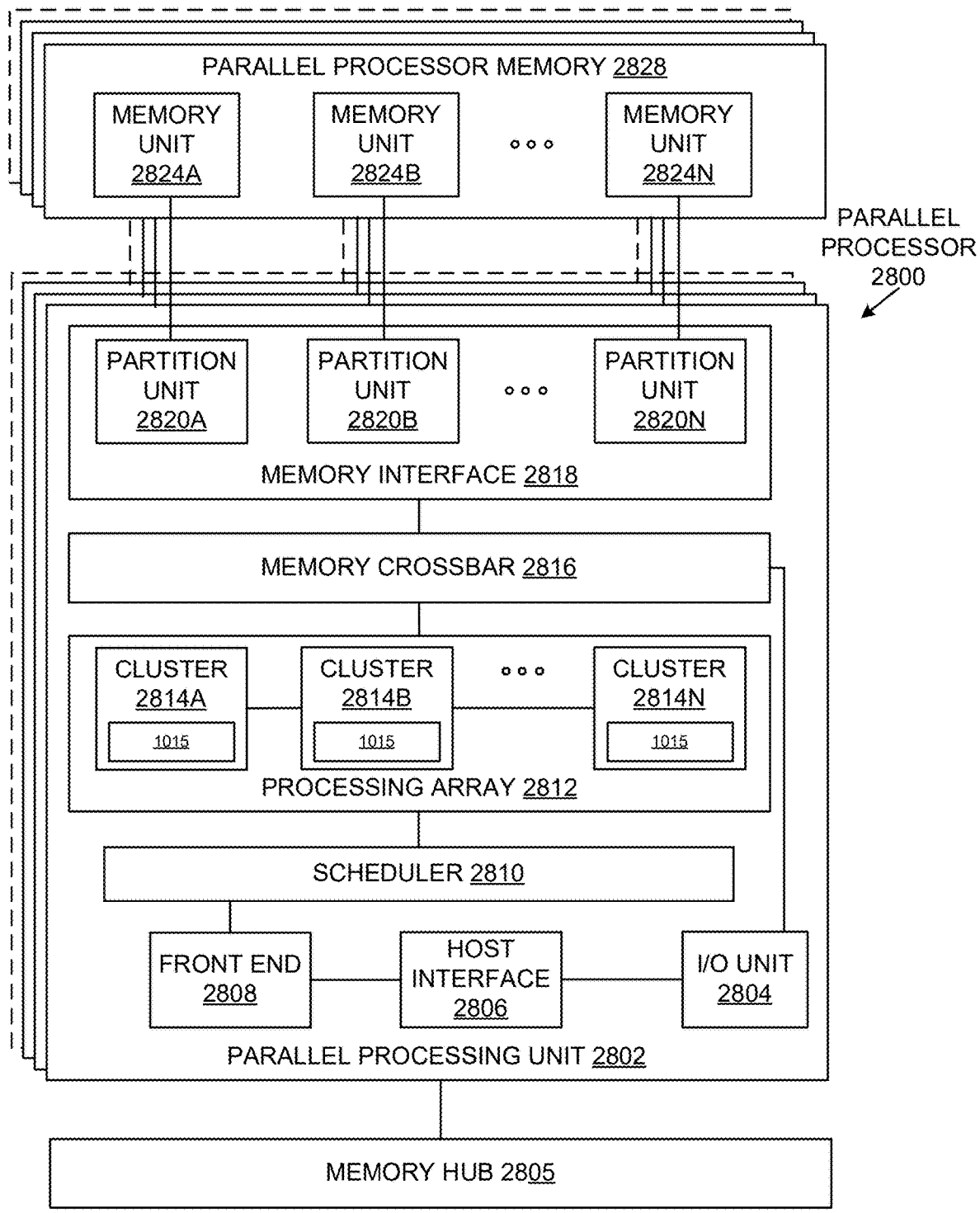
FIG. 28 illustrates a parallel processor, according to at least one embodiment.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 2700 for inferencing or predicting operations based, at least in part, on weight parameters calculated using neural network training operations, neural network functions and/or architectures, or neural network use cases described herein. Inference and/or training logic 1015 are used to perform inferencing and/or training operations associated with one or more embodiments Processors FIG. 28 illustrates a parallel processor 2800 according to at least one embodiment. In at least one embodiment, various components of parallel processor 2800 may be implemented using one or more integrated circuit devices, such as programmable processors, application specific integrated circuits (ASICs), or field programmable gate arrays (FPGA). In at least one embodiment, illustrated parallel processor 2800 is a variant of one or more parallel processor(s) 2712 shown in FIG. 27 according to an exemplary embodiment.

In at least one embodiment, parallel processor 2800 includes a parallel processing unit 2802. In at least one embodiment, parallel processing unit 2802 includes an I/O unit 2804 that enables communication with other devices, including other instances of parallel processing unit 2802. In at least one embodiment, I/O unit 2804 may be directly connected to other devices. In at least one embodiment, I/O unit 2804 connects with other devices via use of a hub or switch interface, such as memory hub 2705. In at least one embodiment, connections between memory hub 2705 and I/O unit 2804 form a communication link 2713. In at least one embodiment, I/O unit 2804 connects with a host interface 2806 and a memory crossbar 2816, where host interface 2806 receives commands directed to performing processing operations and memory crossbar 2816 receives commands directed to performing memory operations.

In at least one embodiment, when host interface 2806 receives a command buffer via I/O unit 2804, host interface 2806 can direct work operations to perform those commands to a front end 2808. In at least one embodiment, front end 2808 couples with a scheduler 2810, which is configured to distribute commands or other work items to a processing cluster array 2812. In at least one embodiment, scheduler 2810 ensures that processing cluster array 2812 is properly configured and in a valid state before tasks are distributed to processing cluster array 2812. In at least one embodiment, scheduler 2810 is implemented via firmware logic executing on a microcontroller. In at least one embodiment, microcontroller implemented scheduler 2810 is configurable to perform complex scheduling and work distribution operations at coarse and fine granularity, enabling rapid preemption and context switching of threads executing on processing array 2812. In at least one embodiment, host software can prove workloads for scheduling on processing array 2812 via one of multiple graphics processing doorbells. In at least one embodiment, workloads can then be automatically distributed across processing array 2812 by scheduler 2810 logic within a microcontroller including scheduler 2810.

In at least one embodiment, processing cluster array 2812 can include up to "N" processing clusters (e.g., cluster 2814A, cluster 2814B, through cluster 2814N). In at least one embodiment, each cluster 2814A-2814N of processing cluster array 2812 can execute a large number of concurrent threads. In at least one embodiment, scheduler 2810 can allocate work to clusters 2814A-2814N of processing cluster array 2812 using various scheduling and/or work distribution algorithms, which may vary depending on workload arising for each type of program or computation. In at least one embodiment, scheduling can be handled dynamically by scheduler 2810, or can be assisted in part by compiler logic during compilation of program logic configured for execution by processing cluster array 2812. In at least one embodiment, different clusters 2814A-2814N of processing cluster array 2812 can be allocated for processing different types of programs or for performing different types of computations.

In at least one embodiment, processing cluster array 2812 can be configured to perform various types of parallel processing operations. In at least one embodiment, processing cluster array 2812 is configured to perform general-purpose parallel compute operations. For example, in at least one embodiment, processing cluster array 2812 can include logic to execute processing tasks including filtering of video and/or audio data, performing modeling operations, including physics operations, and performing data transformations.

In at least one embodiment, processing cluster array 2812 is configured to perform parallel graphics processing operations. In at least one embodiment, processing cluster array 2812 can include additional logic to support execution of such graphics processing operations, including, but not limited to texture sampling logic to perform texture operations, as well as tessellation logic and other vertex processing logic. In at least one embodiment, processing cluster array 2812 can be configured to execute graphics processing related shader programs such as, but not limited to vertex shaders, tessellation shaders, geometry shaders, and pixel shaders. In at least one embodiment, parallel processing unit 2802 can transfer data from system memory via I/O unit 2804 for processing. In at least one embodiment, during processing, transferred data can be stored to on-chip memory (e.g., parallel processor memory 2822) during processing, then written back to system memory.

In at least one embodiment, when parallel processing unit 2802 is used to perform graphics processing, scheduler 2810 can be configured to divide a processing workload into approximately equal sized tasks, to better enable distribution of graphics processing operations to multiple clusters 2814A-2814N of processing cluster array 2812. In at least one embodiment, portions of processing cluster array 2812 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2814A-2814N may be stored in buffers to allow intermediate data to be transmitted between clusters 2814A-2814N for further processing.

In at least one embodiment, processing cluster array 2812 can receive processing tasks to be executed via scheduler 2810, which receives commands defining processing tasks from front end 2808. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2810 may be configured to fetch indices corresponding to tasks or may receive indices from front end 2808. In at least one embodiment, front end 2808 can be configured to ensure processing cluster array 2812 is configured to a valid state before a workload specified by incoming command buffers (e.g., batch-buffers, push buffers, etc.) is initiated.

In at least one embodiment, each of one or more instances of parallel processing unit 2802 can couple with parallel processor memory 2822. In at least one embodiment, parallel processor memory 2822 can be accessed via memory crossbar 2816, which can receive memory requests from processing cluster array 2812 as well as I/O unit 2804. In at least one embodiment, memory crossbar 2816 can access parallel processor memory 2822 via a memory interface 2818. In at least one embodiment, memory interface 2818 can include multiple partition units (e.g., partition unit 2820A, partition unit 2820B, through partition unit 2820N) that can each couple to a portion (e.g., memory unit) of parallel processor memory 2822. In at least one embodiment, a number of partition units 2820A-2820N is configured to be equal to a number of memory units, such that a first partition unit 2820A has a corresponding first memory unit 2824A, a second partition unit 2820B has a corresponding memory unit 2824B, and a Nth partition unit 2820N has a corresponding Nth memory unit 2824N. In at least one embodiment, a number of partition units 2820A-2820N may not be equal to a number of memory devices.

In at least one embodiment, memory units 2824A-2824N can include various types of memory devices, including dynamic random access memory (DRAM) or graphics random access memory, such as synchronous graphics random access memory (SGRAM), including graphics double data rate (GDDR) memory. In at least one embodiment, memory units 2824A-2824N may also include 3D stacked memory, including but not limited to high bandwidth memory (HBM). In at least one embodiment, render targets, such as frame buffers or texture maps may be stored across memory units 2824A-2824N, allowing partition units 2820A-2820N to write portions of each render target in parallel to efficiently use available bandwidth of parallel processor memory 2822. In at least one embodiment, a local instance of parallel processor memory 2822 may be excluded in favor of a unified memory design that utilizes system memory in conjunction with local cache memory.

In at least one embodiment, any one of clusters 2814A-2814N of processing cluster array 2812 can process data that will be written to any of memory units 2824A-2824N within parallel processor memory 2822. In at least one embodiment, memory crossbar 2816 can be configured to transfer an output of each cluster 2814A-2814N to any partition unit 2820A-2820N or to another cluster 2814A-2814N, which can perform additional processing operations on an output. In at least one embodiment, each cluster 2814A-2814N can communicate with memory interface 2818 through memory crossbar 2816 to read from or write to various external memory devices. In at least one embodiment, memory crossbar 2816 has a connection to memory interface 2818 to communicate with I/O unit 2804, as well as a connection to a local instance of parallel processor memory 2822, enabling processing units within different processing clusters 2814A-2814N to communicate with system memory or other memory that is not local to parallel processing unit 2802. In at least one embodiment, memory crossbar 2816 can use virtual channels to separate traffic streams between clusters 2814A-2814N and partition units 2820A-2820N.

In at least one embodiment, multiple instances of parallel processing unit 2802 can be provided on a single add-in card, or multiple add-in cards can be interconnected. In at least one embodiment, different instances of parallel processing unit 2802 can be configured to inter-operate even if different instances have different numbers of processing cores, different amounts of local parallel processor memory, and/or other configuration differences. For example, in at least one embodiment, some instances of parallel processing unit 2802 can include higher precision floating point units relative to other instances. In at least one embodiment, systems incorporating one or more instances of parallel processing unit 2802 or parallel processor 2800 can be implemented in a variety of configurations and form factors, including but not limited to desktop, laptop, or handheld personal computers, servers, workstations, game consoles, and/or embedded systems.

Figure 29:
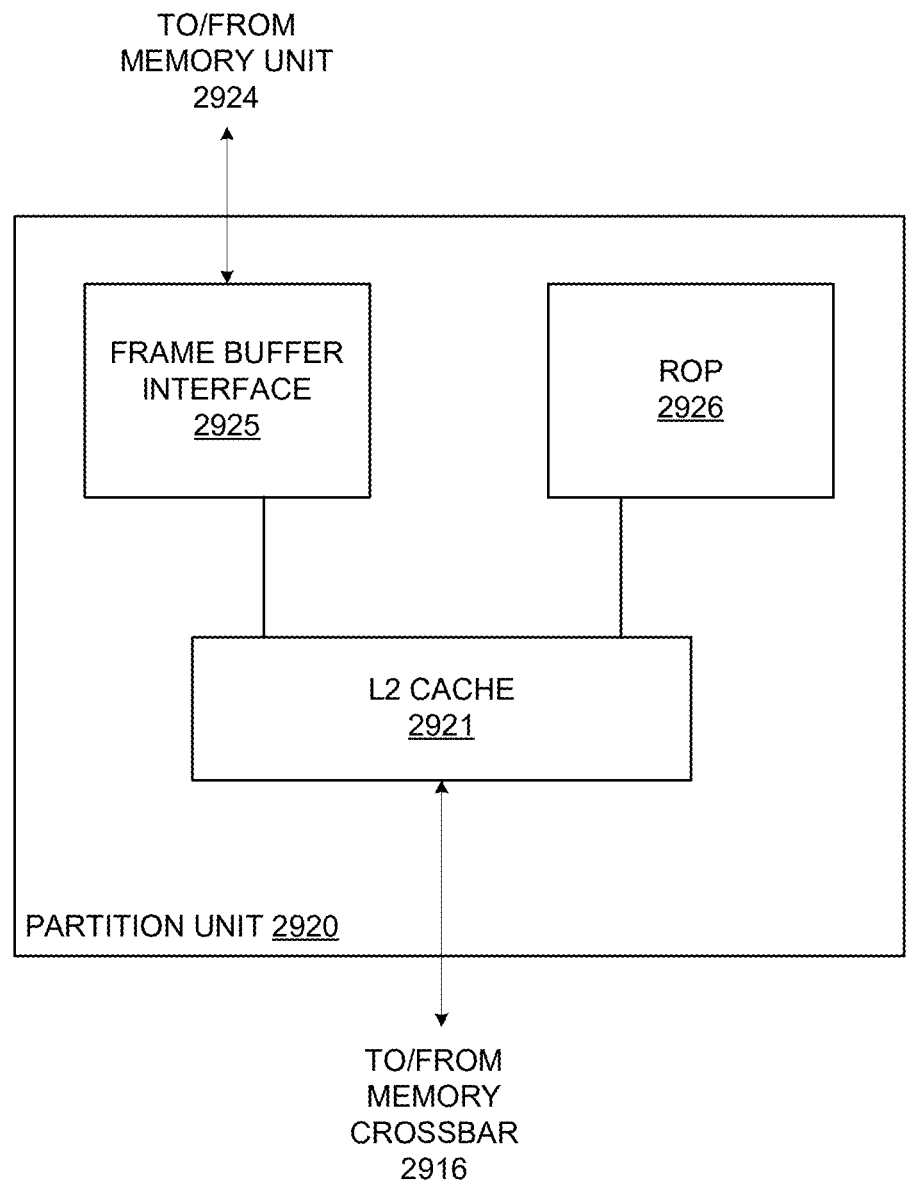
FIG. 29 illustrates a partition unit, according to at least one embodiment.

FIG. 29 is a block diagram of a partition unit 2820 according to at least one embodiment. In at least one embodiment, partition unit 2820 is an instance of one of partition units 2820A-2820N of FIG. 28. In at least one embodiment, partition unit 2820 includes an L2 cache 2821, a frame buffer interface 2825, and a raster operations unit ("ROP") 2826. L2 cache 2821 is a read/write cache that is configured to perform load and store operations received from memory crossbar 2816 and ROP 2826. In at least one embodiment, read misses and urgent write-back requests are output by L2 cache 2821 to frame buffer interface 2825 for processing. In at least one embodiment, updates can also be sent to a frame buffer via frame buffer interface 2825 for processing. In at least one embodiment, frame buffer interface 2825 interfaces with one of memory units in parallel processor memory, such as memory units 2824A-2824N of FIG. 28 (e.g., within parallel processor memory 2822).

In at least one embodiment, ROP 2826 is a processing unit that performs raster operations such as stencil, z test, blending, and so forth. In at least one embodiment, ROP 2826 then outputs processed graphics data that is stored in graphics memory. In at least one embodiment, ROP 2826 includes compression logic to compress depth or color data that is written to memory and decompress depth or color data that is read from memory. In at least one embodiment, compression logic can be lossless compression logic that makes use of one or more of multiple compression algorithms. Compression logic that is performed by ROP 2826 can vary based on statistical characteristics of data to be compressed. For example, in at least one embodiment, delta color compression is performed on depth and color data on a per-tile basis.

In at least one embodiment, ROP 2826 is included within each processing cluster (e.g., cluster 2814A-2814N of FIG. 28) instead of within partition unit 2820. In at least one embodiment, read and write requests for pixel data are transmitted over memory crossbar 2816 instead of pixel fragment data. In at least one embodiment, processed graphics data may be displayed on a display device, such as one of one or more display device(s) 2710 of FIG. 27, routed for further processing by processor(s) 2702, or routed for further processing by one of processing entities within parallel processor 2800 of FIG. 28.

Figure 30:
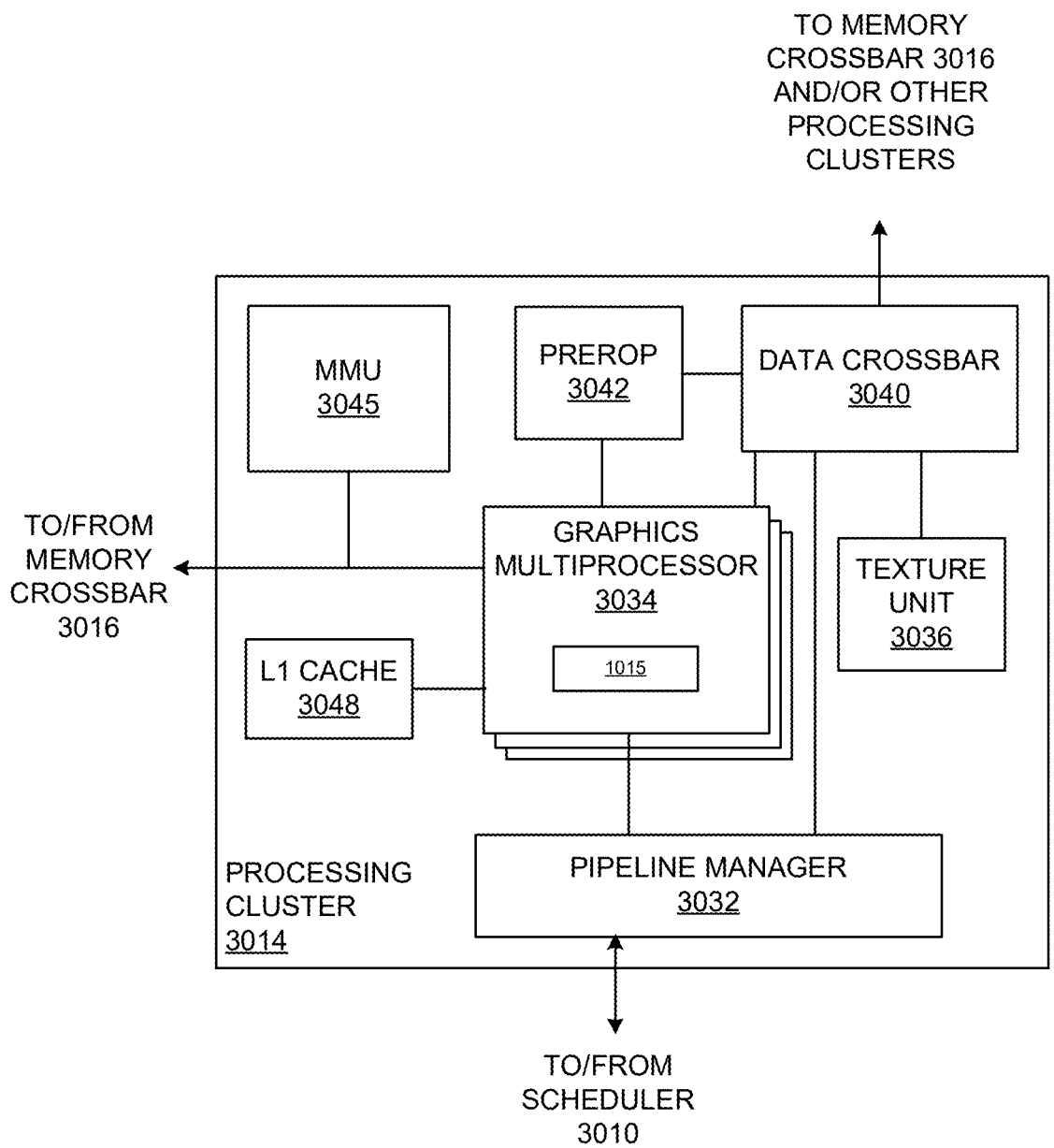
FIG. 30 illustrates a processing cluster, according to at least one embodiment.

FIG. 30 is a block diagram of a processing cluster 2814 within a parallel processing unit according to at least one embodiment. In at least one embodiment, a processing cluster is an instance of one of processing clusters 2814A-2814N of FIG. 28. In at least one embodiment, one of more of processing cluster(s) 2814 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2814 can be controlled via a pipeline manager 2832 that distributes processing tasks to SIMT parallel processors. In at least one embodiment, pipeline manager 2832 receives instructions from scheduler 2810 of FIG. 28 and manages execution of those instructions via a graphics multiprocessor 2834 and/or a texture unit 2836. In at least one embodiment, graphics multiprocessor 2834 is an exemplary instance of a SIMT parallel processor. However, in at least one embodiment, various types of SIMT parallel processors of differing architectures may be included within processing cluster 2814. In at least one embodiment, one or more instances of graphics multiprocessor 2834 can be included within a processing cluster 2814. In at least one embodiment, graphics multiprocessor 2834 can process data and a data crossbar 2840 can be used to distribute processed data to one of multiple possible destinations, including other shader units. In at least one embodiment, pipeline manager 2832 can facilitate distribution of processed data by specifying destinations for processed data to be distributed vis data crossbar 2840.

In at least one embodiment, each graphics multiprocessor 2834 within processing cluster 2814 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2814 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 2834. In at least one embodiment, a thread group may include fewer threads than a number of processing engines within graphics multiprocessor 2834. In at least one embodiment, when a thread group includes fewer threads than a number of processing engines, one or more processing engines may be idle during cycles in which that thread group is being processed. In at least one embodiment, a thread group may also include more threads than a number of processing engines within graphics multiprocessor 2834. In at least one embodiment, when a thread group includes more threads than processing engines within graphics multiprocessor 2834, processing can be performed over consecutive clock cycles. In at least one embodiment, multiple thread groups can be executed concurrently on a graphics multiprocessor 2834.

In at least one embodiment, graphics multiprocessor 2834 includes an internal cache memory to perform load and store operations. In at least one embodiment, graphics multiprocessor 2834 can forego an internal cache and use a cache memory (e.g., L1 cache 2848) within processing cluster 2814. In at least one embodiment, each graphics multiprocessor 2834 also has access to L2 caches within partition units (e.g., partition units 2820A-2820N of FIG. 28) that are shared among all processing clusters 2814 and may be used to transfer data between threads. In at least one embodiment, graphics multiprocessor 2834 may also access off-chip global memory, which can include one or more of local parallel processor memory and/or system memory. In at least one embodiment, any memory external to parallel processing unit 2802 may be used as global memory. In at least one embodiment, processing cluster 2814 includes multiple instances of graphics multiprocessor 2834 can share common instructions and data, which may be stored in L1 cache 2848.

In at least one embodiment, each processing cluster 2814 may include a memory management unit ("MMU") 2845 that is configured to map virtual addresses into physical addresses. In at least one embodiment, one or more instances of MMU 2845 may reside within memory interface 2818 of FIG. 28. In at least one embodiment, MMU 2845 includes a set of page table entries (PTEs) used to map a virtual address to a physical address of a tile and optionally a cache line index. In at least one embodiment, MMU 2845 may include address translation lookaside buffers (TLB) or caches that may reside within graphics multiprocessor 2834 or L1 cache or processing cluster 2814. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 2814 may be configured such that each graphics multiprocessor 2834 is coupled to a texture unit 2836 for performing texture mapping operations, e.g., determining texture sample positions, reading texture data, and filtering texture data. In at least one embodiment, texture data is read from an internal texture L1 cache (not shown) or from an L1 cache within graphics multiprocessor 2834 and is fetched from an L2 cache, local parallel processor memory, or system memory, as needed. In at least one embodiment, each graphics multiprocessor 2834 outputs processed tasks to data crossbar 2840 to provide processed task(s) to another processing cluster 2814 for further processing or to store processed task(s) in an L2 cache, local parallel processor memory, or system memory via memory crossbar 2816. In at least one embodiment, preROP 2842 (pre-raster operations unit) is configured to receive data from graphics multiprocessor 2834, direct data to ROP units, which may be located with partition units as described herein (e.g., partition units 2820A-2820N of FIG. 28). In at least one embodiment, PreROP 2842 unit can perform optimizations for color blending, organize pixel color data, and perform address translations.

Figure 31:
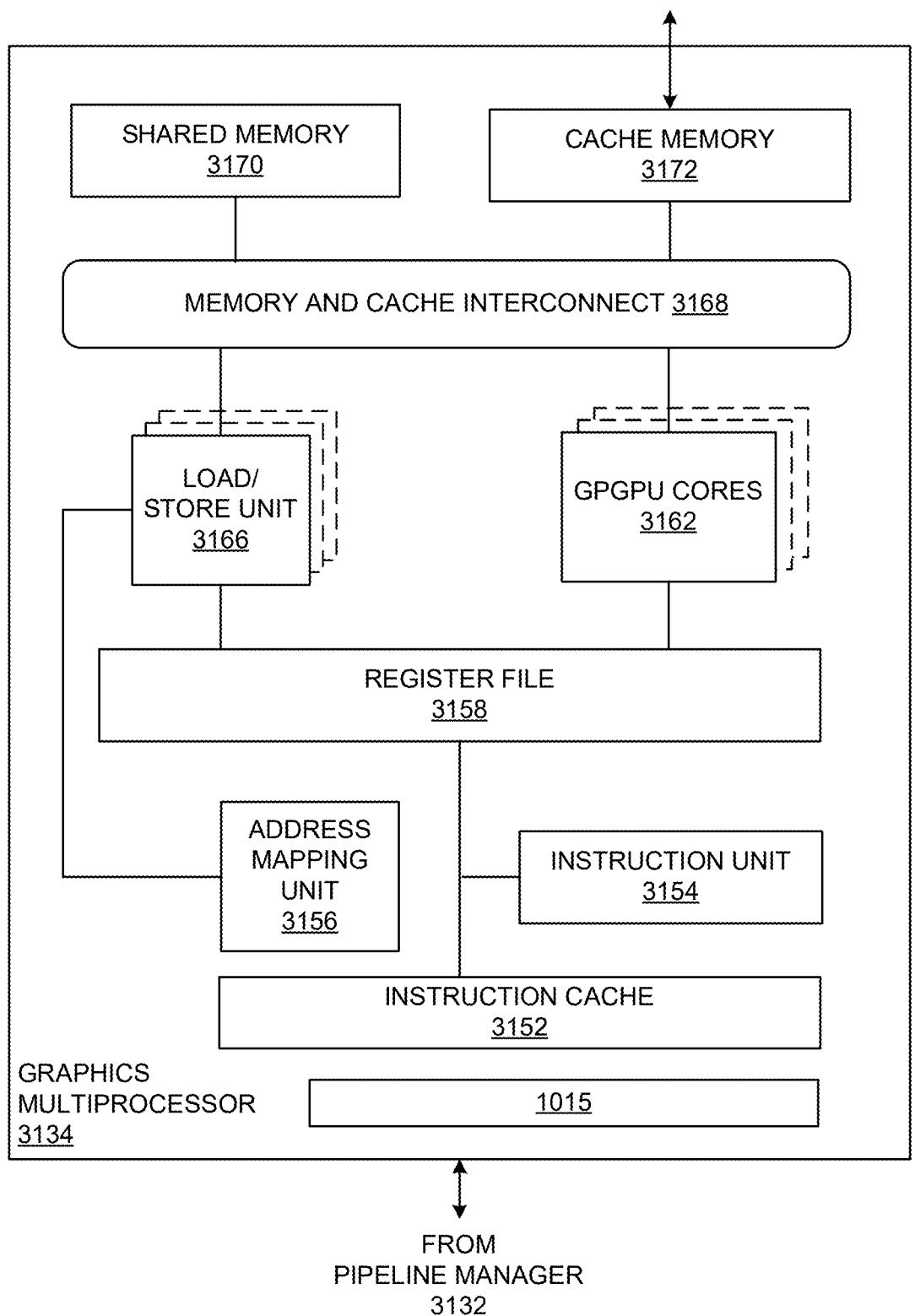
FIG. 31 illustrates a graphics multiprocessor, according to at least one embodiment.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in graphics processing cluster 2814 for inferencing or predicting operations based, at least in part, on weight parameters calculated using neural network training operations, neural network functions and/or architectures, or neural network use cases described herein. Inference and/or training logic 1015 are used to perform inferencing and/or training operations associated with one or more embodiments FIG. 31 shows a graphics multiprocessor 2834 according to at least one embodiment. In at least one embodiment, graphics multiprocessor 2834 couples with pipeline manager 2832 of processing cluster 2814. In at least one embodiment, graphics multiprocessor 2834 has an execution pipeline including but not limited to an instruction cache 2852, an instruction unit 2854, an address mapping unit 2856, a register file 2858, one or more general purpose graphics processing unit (GPGPU) cores 2862, and one or more load/store units 2866. GPGPU core(s) 2862 and load/store unit(s) 2866 are coupled with cache memory 2872 and shared memory 2870 via a memory and cache interconnect 2868.

In at least one embodiment, instruction cache 2852 receives a stream of instructions to execute from pipeline manager 2832. In at least one embodiment, instructions are cached in instruction cache 2852 and dispatched for execution by instruction unit 2854. In at least one embodiment, instruction unit 2854 can dispatch instructions as thread groups (e.g., warps), with each thread group assigned to a different execution unit within GPGPU core(s) 2862. In at least one embodiment, an instruction can access any of a local, shared, or global address space by specifying an address within a unified address space. In at least one embodiment, address mapping unit 2856 can be used to translate addresses in a unified address space into a distinct memory address that can be accessed by load/store unit(s) 2866.

In at least one embodiment, register file 2858 provides a set of registers for functional units of graphics multiprocessor 2834. In at least one embodiment, register file 2858 provides temporary storage for operands connected to data paths of functional units (e.g., GPGPU cores 2862, load/store units 2866) of graphics multiprocessor 2834. In at least one embodiment, register file 2858 is divided between each of functional units such that each functional unit is allocated a dedicated portion of register file 2858. In at least one embodiment, register file 2858 is divided between different warps being executed by graphics multiprocessor 2834.

In at least one embodiment, GPGPU cores 2862 can each include floating point units (FPUs) and/or integer arithmetic logic units (ALUs) that are used to execute instructions of graphics multiprocessor 2834. GPGPU cores 2862 can be similar in architecture or can differ in architecture. In at least one embodiment, a first portion of GPGPU cores 2862 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 2834 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 2862 include SIMD logic capable of performing a single instruction on multiple sets of data. In at least one embodiment GPGPU cores 2862 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2868 is an interconnect network that connects each functional unit of graphics multiprocessor 2834 to register file 2858 and to shared memory 2870. In at least one embodiment, memory and cache interconnect 2868 is a crossbar interconnect that allows load/store unit 2866 to implement load and store operations between shared memory 2870 and register file 2858. In at least one embodiment, register file 2858 can operate at a same frequency as GPGPU cores 2862, thus data transfer between GPGPU cores 2862 and register file 2858 is very low latency. In at least one embodiment, shared memory 2870 can be used to enable communication between threads that execute on functional units within graphics multiprocessor 2834. In at least one embodiment, cache memory 2872 can be used as a data cache for example, to cache texture data communicated between functional units and texture unit 2836. In at least one embodiment, shared memory 2870 can also be used as a program managed cache. In at least one embodiment, threads executing on GPGPU cores 2862 can programmatically store data within shared memory in addition to automatically cached data that is stored within cache memory 2872.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in graphics multiprocessor 2834 for inferencing or predicting operations based, at least in part, on weight parameters calculated using neural network training operations, neural network functions and/or architectures, or neural network use cases described herein. In at least one embodiment, inference and/or training logic 1015 are used to perform segmentation based on extreme points.

Figure 32:
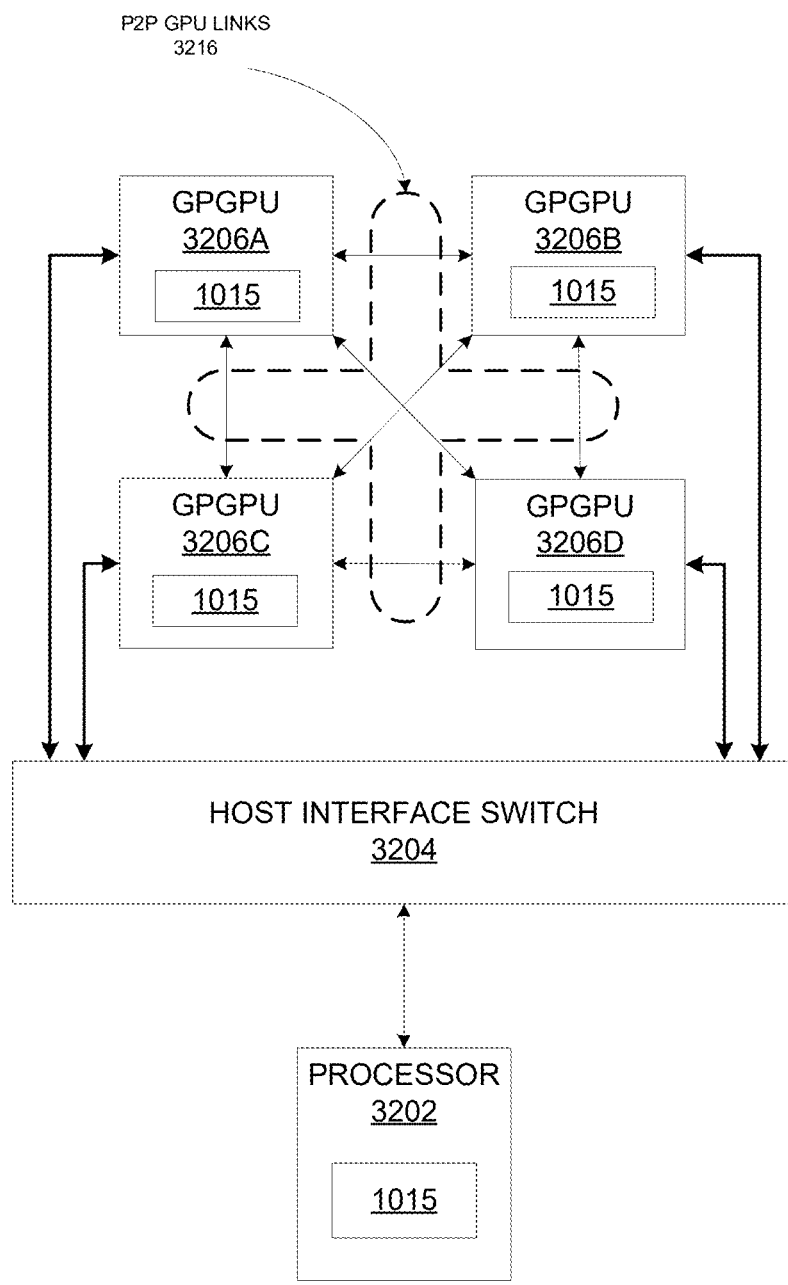
FIG. 32 illustrates a multi-graphics processing unit (GPU) system, according to at least one embodiment.

FIG. 32 illustrates a multi-GPU computing system 3200, according to at least one embodiment. In at least one embodiment, multi-GPU computing system 3200 can include a processor 3202 coupled to multiple general purpose graphics processing units (GPGPUs) 3206A-D via a host interface switch 3204. In at least one embodiment, host interface switch 3204 is a PCI express switch device that couples processor 3202 to a PCI express bus over which processor 3202 can communicate with GPGPUs 3206A-D. GPGPUs 3206A-D can interconnect via a set of high-speed point to point GPU to GPU links 3216. In at least one embodiment, GPU to GPU links 3216 connect to each of GPGPUs 3206A-D via a dedicated GPU link. In at least one embodiment, P2P GPU links 3216 enable direct communication between each of GPGPUs 3206A-D without requiring communication over host interface bus 3204 to which processor 3202 is connected. In at least one embodiment, with GPU-to-GPU traffic directed to P2P GPU links 3216, host interface bus 3204 remains available for system memory access or to communicate with other instances of multi-GPU computing system 3200, for example, via one or more network devices. While in at least one embodiment GPGPUs 3206A-D connect to processor 3202 via host interface switch 3204, in at least one embodiment processor 3202 includes direct support for P2P GPU links 3216 and can connect directly to GPGPUs 3206A-D.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in multi-GPU computing system 3200 for inferencing or predicting operations based, at least in part, on weight parameters calculated using neural network training operations, neural network functions and/or architectures, or neural network use cases described herein. In at least one embodiment, inference and/or training logic 1015 are used to perform segmentation based on extreme points.

Figure 33:
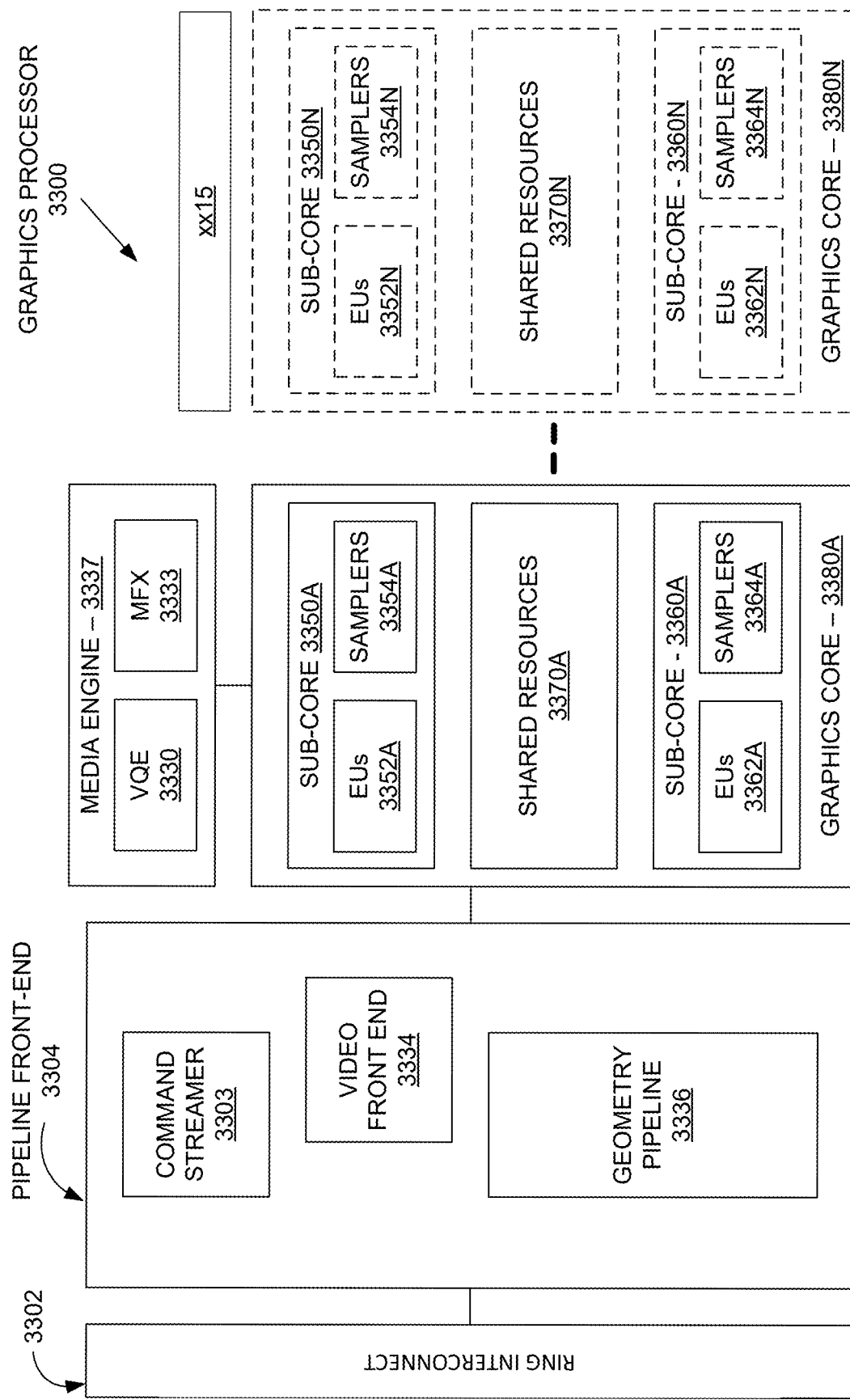
FIG. 33 illustrates a graphics processor, according to at least one embodiment.

FIG. 33 is a block diagram of a graphics processor 3300, according to at least one embodiment. In at least one embodiment, graphics processor 3300 includes a ring interconnect 3302, a pipeline front-end 3304, a media engine 3337, and graphics cores 3380A-3380N. In at least one embodiment, ring interconnect 3302 couples graphics processor 3300 to other processing units, including other graphics processors or one or more general-purpose processor cores. In at least one embodiment, graphics processor 3300 is one of many processors integrated within a multi-core processing system.

In at least one embodiment, graphics processor 3300 receives batches of commands via ring interconnect 3302. In at least one embodiment, incoming commands are interpreted by a command streamer 3303 in pipeline front-end 3304. In at least one embodiment, graphics processor 3300 includes scalable execution logic to perform 3D geometry processing and media processing via graphics core(s) 3380A-3380N. In at least one embodiment, for 3D geometry processing commands, command streamer 3303 supplies commands to geometry pipeline 3336. In at least one embodiment, for at least some media processing commands, command streamer 3303 supplies commands to a video front end 3334, which couples with a media engine 3337. In at least one embodiment, media engine 3337 includes a Video Quality Engine (VQE) 3330 for video and image post-processing and a multi-format encode/decode (MFX) 3333 engine to provide hardware-accelerated media data encode and decode. In at least one embodiment, geometry pipeline 3336 and media engine 3337 each generate execution threads for thread execution resources provided by at least one graphics core 3380A.

In at least one embodiment, graphics processor 3300 includes scalable thread execution resources featuring modular cores 3380A-3380N (sometimes referred to as core slices), each having multiple sub-cores 3350A-3350N, 3360A-3360N (sometimes referred to as core sub-slices). In at least one embodiment, graphics processor 3300 can have any number of graphics cores 3380A through 3380N. In at least one embodiment, graphics processor 3300 includes a graphics core 3380A having at least a first sub-core 3350A and a second sub-core 3360A. In at least one embodiment, graphics processor 3300 is a low power processor with a single sub-core (e.g., 3350A). In at least one embodiment, graphics processor 3300 includes multiple graphics cores 3380A-3380N, each including a set of first sub-cores 3350A-3350N and a set of second sub-cores 3360A-3360N. In at least one embodiment, each sub-core in first sub-cores 3350A-3350N includes at least a first set of execution units 3352A-3352N and media/texture samplers 3354A-3354N. In at least one embodiment, each sub-core in second sub-cores 3360A-3360N includes at least a second set of execution units 3362A-3362N and samplers 3364A-3364N. In at least one embodiment, each sub-core 3350A-3350N, 3360A-3360N shares a set of shared resources 3370A-3370N. In at least one embodiment, shared resources include shared cache memory and pixel operation logic.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in graphics processor 3300 for inferencing or predicting operations based, at least in part, on weight parameters calculated using neural network training operations, neural network functions and/or architectures, or neural network use cases described herein. In at least one embodiment, inference and/or training logic 1015 are used to perform segmentation based on extreme points.

Figure 34:
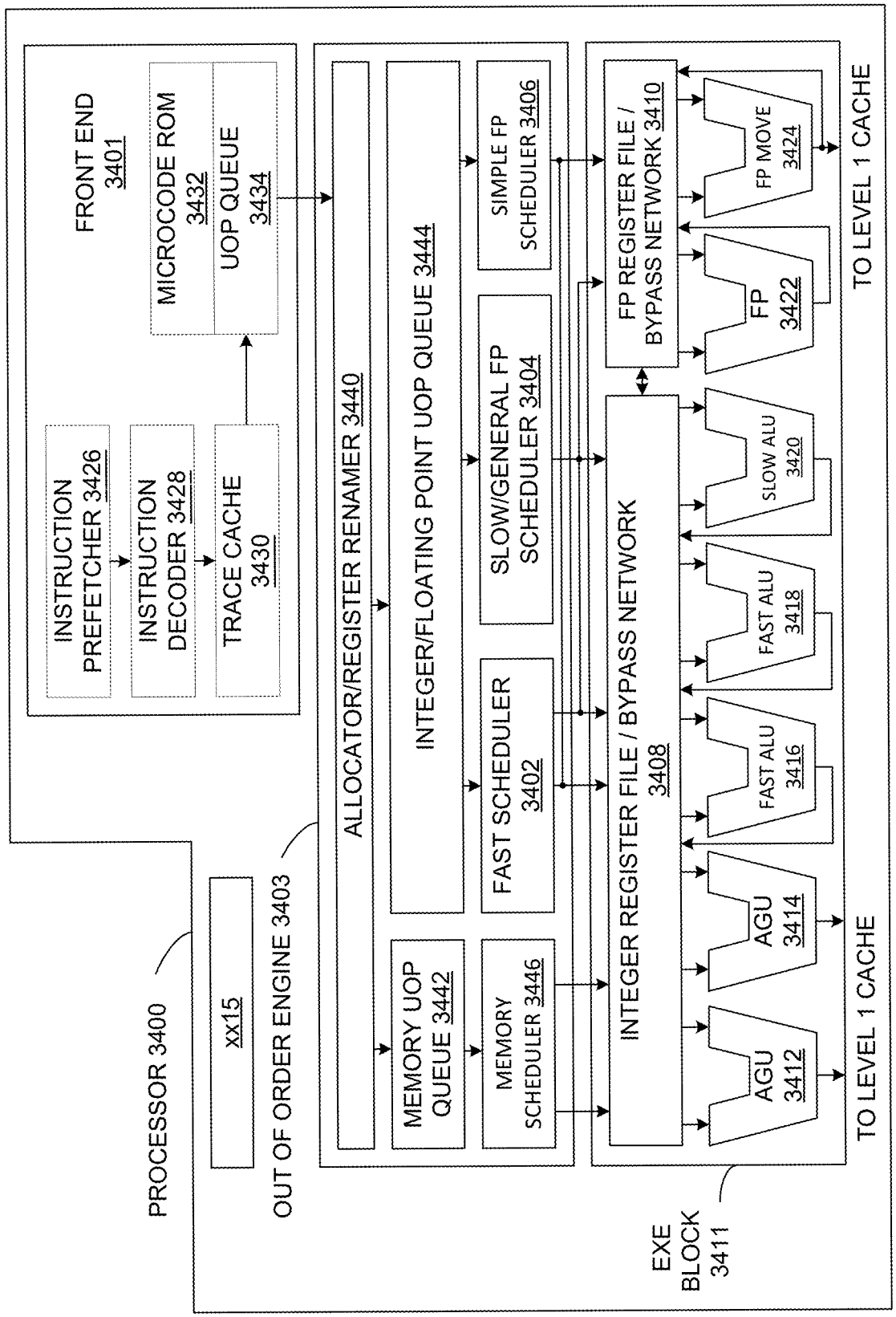
FIG. 34 illustrates a processor's micro-architecture, according to at least one embodiment.

FIG. 34 is a block diagram illustrating micro-architecture for a processor 3400 that may include logic circuits to perform instructions, according to at least one embodiment. In at least one embodiment, processor 3400 may perform instructions, including x86 instructions, ARM instructions, specialized instructions for application-specific integrated circuits (ASICs), etc. In at least one embodiment, processor 3400 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 3400 may perform instructions to accelerate machine learning or deep learning algorithms, training, or inferencing.

In at least one embodiment, processor 3400 includes an in-order front end ("front end") 3401 to fetch instructions to be executed and prepare instructions to be used later in processor pipeline. In at least one embodiment, front end 3401 may include several units. In at least one embodiment, an instruction prefetcher 3426 fetches instructions from memory and feeds instructions to an instruction decoder 3428 which in turn decodes or interprets instructions. For example, in at least one embodiment, instruction decoder 3428 decodes a received instruction into one or more operations called "micro-instructions" or "micro-operations" (also called "micro ops" or "uops") that machine may execute. In at least one embodiment, instruction decoder 3428 parses instruction into an opcode and corresponding data and control fields that may be used by micro-architecture to perform operations in accordance with at least one embodiment. In at least one embodiment, a trace cache 3430 may assemble decoded uops into program ordered sequences or traces in a uop queue 3434 for execution. In at least one embodiment, when trace cache 3430 encounters a complex instruction, a microcode ROM 3432 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 3428 may access microcode ROM 3432 to perform instruction. In at least one embodiment, an instruction may be decoded into a small number of micro-ops for processing at instruction decoder 3428. In at least one embodiment, an instruction may be stored within microcode ROM 3432 should a number of micro-ops be needed to accomplish operation. In at least one embodiment, trace cache 3430 refers to an entry point programmable logic array ("PLA") to determine a correct micro-instruction pointer for reading microcode sequences to complete one or more instructions from microcode ROM 3432 in accordance with at least one embodiment. In at least one embodiment, after microcode ROM 3432 finishes sequencing micro-ops for an instruction, front end 3401 of machine may resume fetching micro-ops from trace cache 3430.

In at least one embodiment, out-of-order execution engine ("out of order engine") 3403 may prepare instructions for execution. In at least one embodiment, out-of-order execution logic has a number of buffers to smooth out and re-order flow of instructions to optimize performance as they go down pipeline and get scheduled for execution. In at least one embodiment, out-of-order execution engine 3403 includes, without limitation, an allocator/register renamer 3440, a memory uop queue 3442, an integer/floating point uop queue 3444, a memory scheduler 3446, a fast scheduler 3402, a slow/general floating point scheduler ("slow/general FP scheduler") 3404, and a simple floating point scheduler ("simple FP scheduler") 3406. In at least one embodiment, fast schedule 3402, slow/general floating point scheduler 3404, and simple floating point scheduler 3406 are also collectively referred to herein as "uop schedulers 3402, 3404, 3406." In at least one embodiment, allocator/register renamer 3440 allocates machine buffers and resources that each uop needs in order to execute. In at least one embodiment, allocator/register renamer 3440 renames logic registers onto entries in a register file. In at least one embodiment, allocator/register renamer 3440 also allocates an entry for each uop in one of two uop queues, memory uop queue 3442 for memory operations and integer/floating point uop queue 3444 for non-memory operations, in front of memory scheduler 3446 and uop schedulers 3402, 3404, 3406. In at least one embodiment, uop schedulers 3402, 3404, 3406 determine when a uop is ready to execute based on readiness of their dependent input register operand sources and availability of execution resources uops need to complete their operation. In at least one embodiment, fast scheduler 3402 of at least one embodiment may schedule on each half of main clock cycle while slow/general floating point scheduler 3404 and simple floating point scheduler 3406 may schedule once per main processor clock cycle. In at least one embodiment, uop schedulers 3402, 3404, 3406 arbitrate for dispatch ports to schedule uops for execution.

In at least one embodiment, execution block 3411 includes, without limitation, an integer register file/bypass network 3408, a floating point register file/bypass network ("FP register file/bypass network") 3410, address generation units ("AGUs") 3412 and 3414, fast Arithmetic Logic Units (ALUs) ("fast ALUs") 3416 and 3418, a slow Arithmetic Logic Unit ("slow ALU") 3420, a floating point ALU ("FP") 3422, and a floating point move unit ("FP move") 3424. In at least one embodiment, integer register file/bypass network 3408 and floating point register file/bypass network 3410 are also referred to herein as "register files 3408, 3410." In at least one embodiment, AGUs 3412 and 3414, fast ALUs 3416 and 3418, slow ALU 3420, floating point ALU 3422, and floating point move unit 3424 are also referred to herein as "execution units 3412, 3414, 3416, 3418, 3420, 3422, and 3424." In at least one embodiment, execution block b11 may include, without limitation, any number (including zero) and type of register files, bypass networks, address generation units, and execution units, in any combination.

In at least one embodiment, register files 3408, 3410 may be arranged between uop schedulers 3402, 3404, 3406, and execution units 3412, 3414, 3416, 3418, 3420, 3422, and 3424. In at least one embodiment, integer register file/bypass network 3408 performs integer operations. In at least one embodiment, floating point register file/bypass network 3410 performs floating point operations. In at least one embodiment, each of register files 3408, 3410 may include, without limitation, a bypass network that may bypass or forward just completed results that have not yet been written into register file to new dependent uops. In at least one embodiment, register files 3408, 3410 may communicate data with each other. In at least one embodiment, integer register file/bypass network 3408 may include, without limitation, two separate register files, one register file for low-order thirty-two bits of data and a second register file for high order thirty-two bits of data. In at least one embodiment, floating point register file/bypass network 3410 may include, without limitation, 128-bit wide entries because floating point instructions typically have operands from 64 to 128 bits in width.

In at least one embodiment, execution units 3412, 3414, 3416, 3418, 3420, 3422, 3424 may execute instructions. In at least one embodiment, register files 3408, 3410 store integer and floating point data operand values that microinstructions need to execute. In at least one embodiment, processor 3400 may include, without limitation, any number and combination of execution units 3412, 3414, 3416, 3418, 3420, 3422, 3424. In at least one embodiment, floating point ALU 3422 and floating point move unit 3424, may execute floating point, MMX, SIMD, AVX and SSE, or other operations, including specialized machine learning instructions. In at least one embodiment, floating point ALU 3422 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3416, 3418. In at least one embodiment, fast ALUS 3416, 3418 may execute fast operations with an effective latency of half a clock cycle. In at least one embodiment, most complex integer operations go to slow ALU 3420 as slow ALU 3420 may include, without limitation, integer execution hardware for long-latency type of operations, such as a multiplier, shifts, flag logic, and branch processing. In at least one embodiment, memory load/store operations may be executed by AGUS 3412, 3414. In at least one embodiment, fast ALU 3416, fast ALU 3418, and slow ALU 3420 may perform integer operations on 64-bit data operands. In at least one embodiment, fast ALU 3416, fast ALU 3418, and slow ALU 3420 may be implemented to support a variety of data bit sizes including sixteen, thirty-two, 128, 256, etc. In at least one embodiment, floating point ALU 3422 and floating point move unit 3424 may be implemented to support a range of operands having bits of various widths. In at least one embodiment, floating point ALU 3422 and floating point move unit 3424 may operate on 128-bit wide packed data operands in conjunction with SIMD and multimedia instructions.

In at least one embodiment, uop schedulers 3402, 3404, 3406, dispatch dependent operations before parent load has finished executing. In at least one embodiment, as uops may be speculatively scheduled and executed in processor 3400, processor 3400 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment portions or all of inference and/or training logic 1015 may be incorporated into execution block 3411 and other memory or registers shown or not shown. For example, in at least one embodiment, training and/or inferencing techniques described herein may use one or more of ALUs illustrated in execution block 3411. Moreover, weight parameters may be stored in on-chip or off-chip memory and/or registers (shown or not shown) that configure ALUs of execution block 3411 to perform one or more machine learning algorithms, neural network architectures, use cases, or training techniques described herein. In at least one embodiment, inference and/or training logic 1015 are used to perform segmentation based on extreme points.

Figure 35:
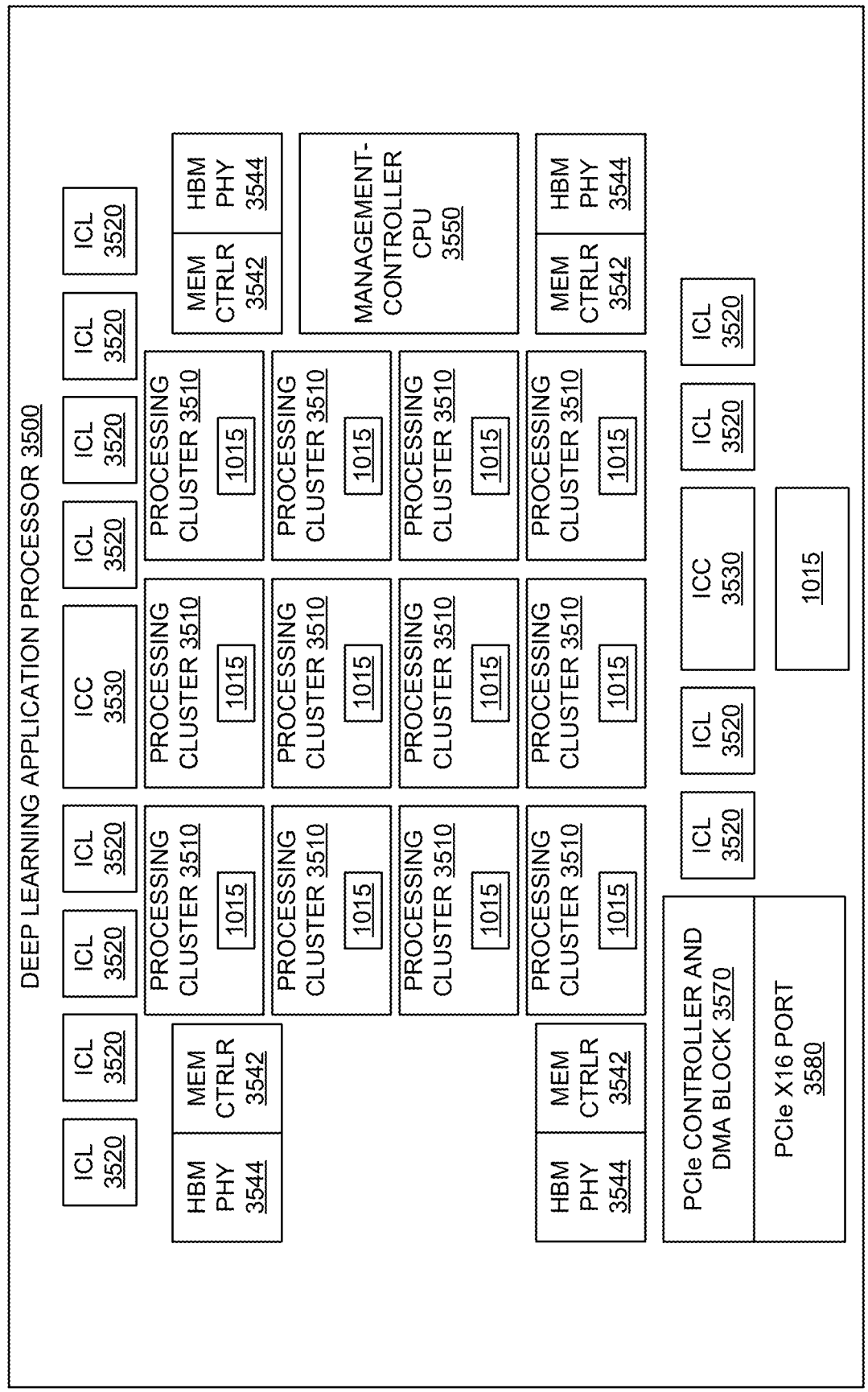
FIG. 35 illustrates a deep learning application processor, according to at least one embodiment.

FIG. 35 illustrates a deep learning application processor 3500, according to at least one embodiment. In at least one embodiment, deep learning application processor 3500 uses instructions that, if executed by deep learning application processor 3500, cause deep learning application processor 3500 to perform some or all of processes and techniques described throughout this disclosure. In at least one embodiment, deep learning application processor 3500 is an application-specific integrated circuit (ASIC). In at least one embodiment, application processor 3500 performs matrix multiply operations either "hard-wired" into hardware as a result of performing one or more instructions or both. In at least one embodiment, deep learning application processor 3500 includes, without limitation, processing clusters 3510(1)-3510(12), Inter-Chip Links ("ICLs") 3520(1)-3520(12), Inter-Chip Controllers ("ICCs") 3530(1)-3530(2), memory controllers ("Mem Ctrlrs") 3542(1)-3542(4), high bandwidth memory physical layer ("HBM PHY") 3544(1)-3544(4), a management-controller central processing unit ("management-controller CPU") 3550, a peripheral component interconnect express controller and direct memory access block ("PCIe Controller and DMA") 3570, and a sixteen-lane peripheral component interconnect express port ("PCI Express×16") 3580.

In at least one embodiment, processing clusters 3510 may perform deep learning operations, including inference or prediction operations based on weight parameters calculated one or more training techniques, including those described herein. In at least one embodiment, each processing cluster 3510 may include, without limitation, any number and type of processors. In at least one embodiment, deep learning application processor 3500 may include any number and type of processing clusters 3500. In at least one embodiment, Inter-Chip Links 3520 are bi-directional. In at least one embodiment, Inter-Chip Links 3520 and Inter-Chip Controllers 3530 enable multiple deep learning application processors 3500 to exchange information, including activation information resulting from performing one or more machine learning algorithms embodied in one or more neural networks. In at least one embodiment, deep learning application processor 3500 may include any number (including zero) and type of ICLs 3520 and ICCs 3530.

In at least one embodiment, HBM2s 3540 provide a total of 32 Gigabytes (GB) of memory. HBM2 3540(*i*) is associated with both memory controller 3542(*i*) and HBM PHY 3544(*i*). In at least one embodiment, any number of HBM2s 3540 may provide any type and total amount of high bandwidth memory and may be associated with any number (including zero) and type of memory controllers 3542 and HBM PHYs 3544. In at least one embodiment, SPI, I2C, GPIO 3560, PCIe Controller and DMA 3570, and/or PCIe 3580 may be replaced with any number and type of blocks that enable any number and type of communication standards in any technically feasible fashion.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, deep learning application processor 3500 is used to train a machine learning model, such as a neural network, to predict or infer information provided to deep learning application processor 3500. In at least one embodiment, deep learning application processor 3500 is used to infer or predict information based on a trained machine learning model (e.g., neural network) that has been trained by another processor or system or by deep learning application processor 3500. In at least one embodiment, processor 3500 may be used to perform one or more neural network use cases described herein. In at least one embodiment, inference and/or training logic 1015 are used to perform segmentation based on extreme points.

Figure 36:
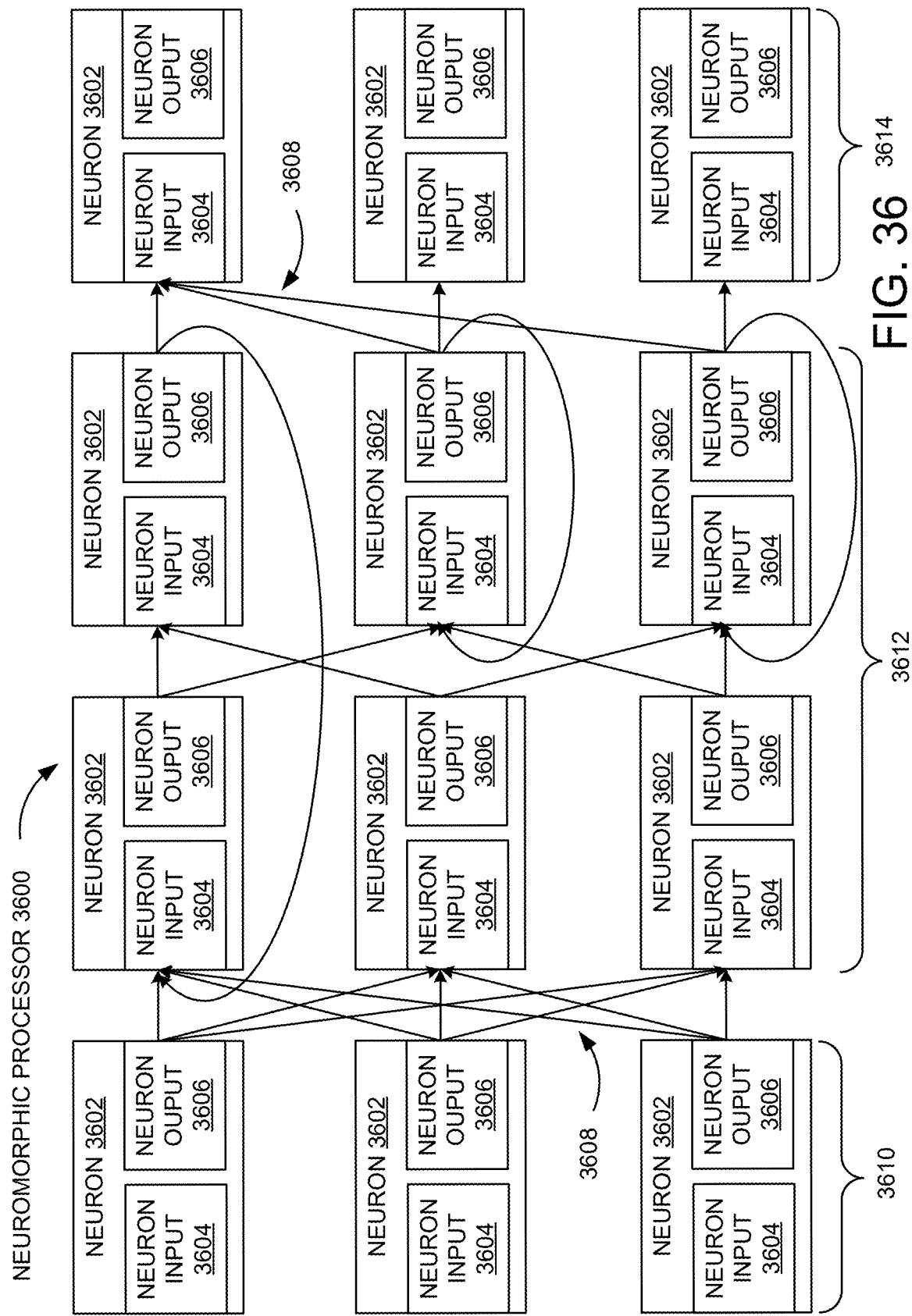
FIG. 36 illustrates an example neuromorphic processor, according to at least one embodiment.

FIG. 36 is a block diagram of a neuromorphic processor 3600, according to at least one embodiment. In at least one embodiment, neuromorphic processor 3600 may receive one or more inputs from sources external to neuromorphic processor 3600. In at least one embodiment, these inputs may be transmitted to one or more neurons 3602 within neuromorphic processor 3600. In at least one embodiment, neurons 3602 and components thereof may be implemented using circuitry or logic, including one or more arithmetic logic units (ALUs). In at least one embodiment, neuromorphic processor 3600 may include, without limitation, thousands or millions of instances of neurons 3602, but any suitable number of neurons 3602 may be used. In at least one embodiment, each instance of neuron 3602 may include a neuron input 3604 and a neuron output 3606. In at least one embodiment, neurons 3602 may generate outputs that may be transmitted to inputs of other instances of neurons 3602. For example, in at least one embodiment, neuron inputs 3604 and neuron outputs 3606 may be interconnected via synapses 3608.

In at least one embodiment, neurons 3602 and synapses 3608 may be interconnected such that neuromorphic processor 3600 operates to process or analyze information received by neuromorphic processor 3600. In at least one embodiment, neurons 3602 may transmit an output pulse (or "fire" or "spike") when inputs received through neuron input 3604 exceed a threshold. In at least one embodiment, neurons 3602 may sum or integrate signals received at neuron inputs 3604. For example, in at least one embodiment, neurons 3602 may be implemented as leaky integrate-and-fire neurons, wherein if a sum (referred to as a "membrane potential") exceeds a threshold value, neuron 3602 may generate an output (or "fire") using a transfer function such as a sigmoid or threshold function. In at least one embodiment, a leaky integrate-and-fire neuron may sum signals received at neuron inputs 3604 into a membrane potential and may also apply a decay factor (or leak) to reduce a membrane potential. In at least one embodiment, a leaky integrate-and-fire neuron may fire if multiple input signals are received at neuron inputs 3604 rapidly enough to exceed a threshold value (i.e., before a membrane potential decays too low to fire). In at least one embodiment, neurons 3602 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3602 may include, without limitation, comparator circuits or logic that generate an output spike at neuron output 3606 when result of applying a transfer function to neuron input 3604 exceeds a threshold. In at least one embodiment, once neuron 3602 fires, it may disregard previously received input information by, for example, resetting a membrane potential to 0 or another suitable default value. In at least one embodiment, once membrane potential is reset to 0, neuron 3602 may resume normal operation after a suitable period of time (or refractory period).

In at least one embodiment, neurons 3602 may be interconnected through synapses 3608. In at least one embodiment, synapses 3608 may operate to transmit signals from an output of a first neuron 3602 to an input of a second neuron 3602. In at least one embodiment, neurons 3602 may transmit information over more than one instance of synapse 3608. In at least one embodiment, one or more instances of neuron output 3606 may be connected, via an instance of synapse 3608, to an instance of neuron input 3604 in same neuron 3602. In at least one embodiment, an instance of neuron 3602 generating an output to be transmitted over an instance of synapse 3608 may be referred to as a "presynaptic neuron" with respect to that instance of synapse 3608. In at least one embodiment, an instance of neuron 3602 receiving an input transmitted over an instance of synapse 3608 may be referred to as a "post-synaptic neuron" with respect to that instance of synapse 3608. Because an instance of neuron 3602 may receive inputs from one or more instances of synapse 3608, and may also transmit outputs over one or more instances of synapse 3608, a single instance of neuron 3602 may therefore be both a "presynaptic neuron" and "post-synaptic neuron," with respect to various instances of synapses 3608, in at least one embodiment.

In at least one embodiment, neurons 3602 may be organized into one or more layers. Each instance of neuron 3602 may have one neuron output 3606 that may fan out through one or more synapses 3608 to one or more neuron inputs 3604. In at least one embodiment, neuron outputs 3606 of neurons 3602 in a first layer 3610 may be connected to neuron inputs 3604 of neurons 3602 in a second layer 3612. In at least one embodiment, layer 3610 may be referred to as a "feed-forward layer." In at least one embodiment, each instance of neuron 3602 in an instance of first layer 3610 may fan out to each instance of neuron 3602 in second layer 3612. In at least one embodiment, first layer 3610 may be referred to as a "fully connected feed-forward layer." In at least one embodiment, each instance of neuron 3602 in an instance of second layer 3612 may fan out to fewer than all instances of neuron 3602 in a third layer 3614. In at least one embodiment, second layer 3612 may be referred to as a "sparsely connected feed-forward layer." In at least one embodiment, neurons 3602 in second layer 3612 may fan out to neurons 3602 in multiple other layers, including to neurons 3602 in (same) second layer 3612. In at least one embodiment, second layer 3612 may be referred to as a "recurrent layer." In at least one embodiment, neuromorphic processor 3600 may include, without limitation, any suitable combination of recurrent layers and feed-forward layers, including, without limitation, both sparsely connected feed-forward layers and fully connected feed-forward layers.

In at least one embodiment, neuromorphic processor 3600 may include, without limitation, a reconfigurable interconnect architecture or dedicated hard wired interconnects to connect synapse 3608 to neurons 3602. In at least one embodiment, neuromorphic processor 3600 may include, without limitation, circuitry or logic that allows synapses to be allocated to different neurons 3602 as needed based on neural network topology and neuron fan-in/out. For example, in at least one embodiment, synapses 3608 may be connected to neurons 3602 using an interconnect fabric, such as network-on-chip, or with dedicated connections. In at least one embodiment, synapse interconnections and components thereof may be implemented using circuitry or logic. In at least one embodiment, inference and/or training logic 1015 are used to perform segmentation based on extreme points.

Figure 37:
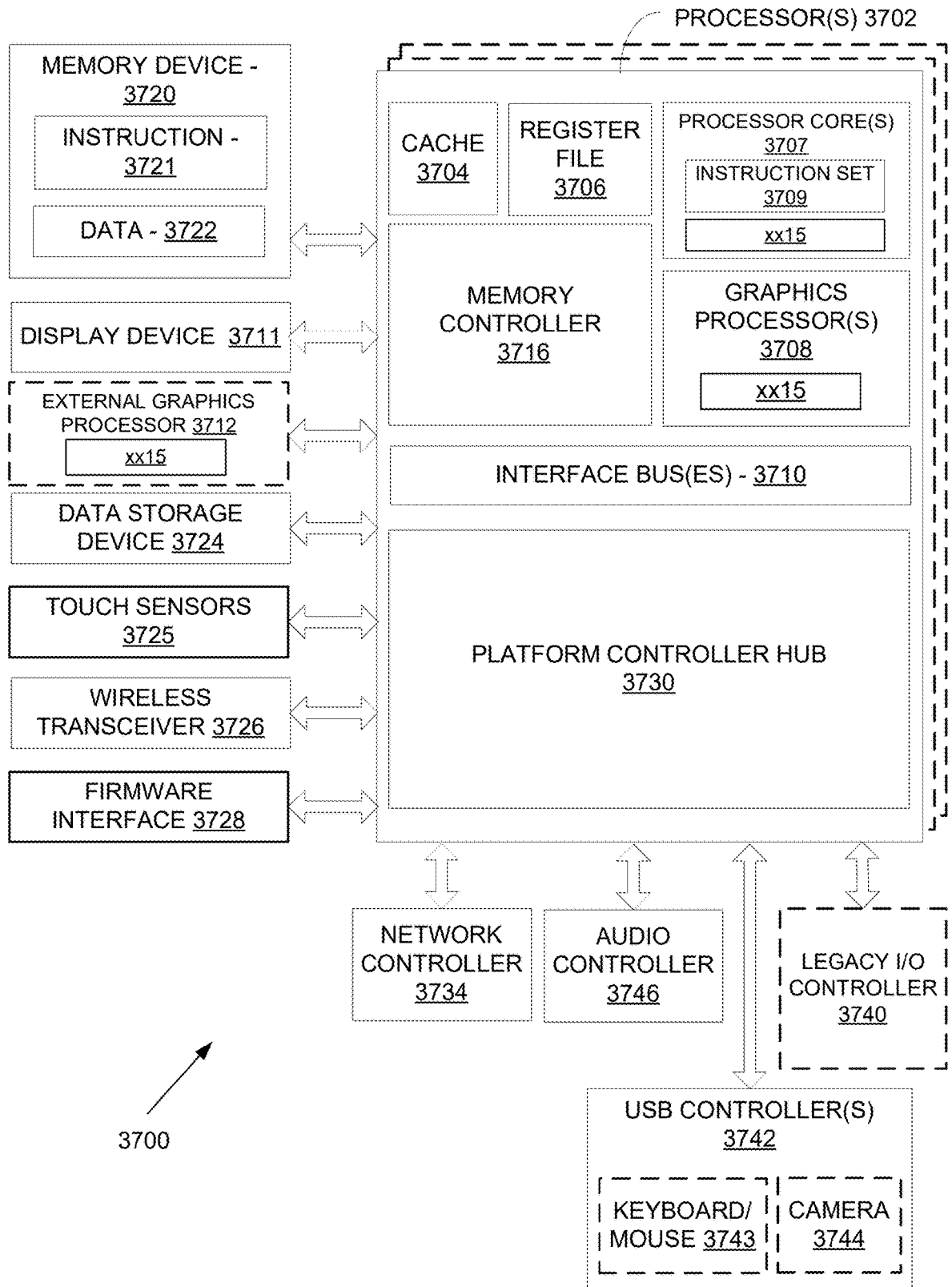
FIGS. 37 and 38 illustrate at least portions of a graphics processor, according to one or more embodiments.

FIG. 37 is a block diagram of a processing system, according to at least one embodiment. In at least one embodiment, system 3700 includes one or more processors 3702 and one or more graphics processors 3708, and may be a single processor desktop system, a multiprocessor workstation system, or a server system having a large number of processors 3702 or processor cores 3707. In at least one embodiment, system 3700 is a processing platform incorporated within a system-on-a-chip (SoC) integrated circuit for use in mobile, handheld, or embedded devices.

In at least one embodiment, system 3700 can include, or be incorporated within a server-based gaming platform, a game console, including a game and media console, a mobile gaming console, a handheld game console, or an online game console. In at least one embodiment, system 3700 is a mobile phone, smart phone, tablet computing device or mobile Internet device. In at least one embodiment, processing system 3700 can also include, couple with, or be integrated within a wearable device, such as a smart watch wearable device, smart eyewear device, augmented reality device, or virtual reality device. In at least one embodiment, processing system 3700 is a television or set top box device having one or more processors 3702 and a graphical interface generated by one or more graphics processors 3708.

In at least one embodiment, one or more processors 3702 each include one or more processor cores 3707 to process instructions which, when executed, perform operations for system and user software. In at least one embodiment, each of one or more processor cores 3707 is configured to process a specific instruction set 3709. In at least one embodiment, instruction set 3709 may facilitate Complex Instruction Set Computing (CISC), Reduced Instruction Set Computing (RISC), or computing via a Very Long Instruction Word (VLIW). In at least one embodiment, processor cores 3707 may each process a different instruction set 3709, which may include instructions to facilitate emulation of other instruction sets. In at least one embodiment, processor core 3707 may also include other processing devices, such a Digital Signal Processor (DSP).

In at least one embodiment, processor 3702 includes cache memory 3704. In at least one embodiment, processor 3702 can have a single internal cache or multiple levels of internal cache. In at least one embodiment, cache memory is shared among various components of processor 3702. In at least one embodiment, processor 3702 also uses an external cache (e.g., a Level-3 (L3) cache or Last Level Cache (LLC)) (not shown), which may be shared among processor cores 3707 using known cache coherency techniques. In at least one embodiment, register file 3706 is additionally included in processor 3702 which may include different types of registers for storing different types of data (e.g., integer registers, floating point registers, status registers, and an instruction pointer register). In at least one embodiment, register file 3706 may include general-purpose registers or other registers.

In at least one embodiment, one or more processor(s) 3702 are coupled with one or more interface bus(es) 3710 to transmit communication signals such as address, data, or control signals between processor 3702 and other components in system 3700. In at least one embodiment, interface bus 3710, in one embodiment, can be a processor bus, such as a version of a Direct Media Interface (DMI) bus. In at least one embodiment, interface 3710 is not limited to a DMI bus, and may include one or more Peripheral Component Interconnect buses (e.g., PCI, PCI Express), memory busses, or other types of interface busses. In at least one embodiment processor(s) 3702 include an integrated memory controller 3716 and a platform controller hub 3730. In at least one embodiment, memory controller 3716 facilitates communication between a memory device and other components of system 3700, while platform controller hub (PCH) 3730 provides connections to I/O devices via a local I/O bus.

In at least one embodiment, memory device 3720 can be a dynamic random access memory (DRAM) device, a static random access memory (SRAM) device, flash memory device, phase-change memory device, or some other memory device having suitable performance to serve as process memory. In at least one embodiment memory device 3720 can operate as system memory for system 3700, to store data 3722 and instructions 3721 for use when one or more processors 3702 executes an application or process. In at least one embodiment, memory controller 3716 also couples with an optional external graphics processor 3712, which may communicate with one or more graphics processors 3708 in processors 3702 to perform graphics and media operations. In at least one embodiment, a display device 3711 can connect to processor(s) 3702. In at least one embodiment display device 3711 can include one or more of an internal display device, as in a mobile electronic device or a laptop device or an external display device attached via a display interface (e.g., DisplayPort, etc.). In at least one embodiment, display device 3711 can include a head mounted display (HMD) such as a stereoscopic display device for use in virtual reality (VR) applications or augmented reality (AR) applications.

In at least one embodiment, platform controller hub 3730 enables peripherals to connect to memory device 3720 and processor 3702 via a high-speed I/O bus. In at least one embodiment, I/O peripherals include, but are not limited to, an audio controller 3746, a network controller 3734, a firmware interface 3728, a wireless transceiver 3726, touch sensors 3725, a data storage device 3724 (e.g., hard disk drive, flash memory, etc.). In at least one embodiment, data storage device 3724 can connect via a storage interface (e.g., SATA) or via a peripheral bus, such as a Peripheral Component Interconnect bus (e.g., PCI, PCI Express). In at least one embodiment, touch sensors 3725 can include touch screen sensors, pressure sensors, or fingerprint sensors. In at least one embodiment, wireless transceiver 3726 can be a Wi-Fi transceiver, a Bluetooth transceiver, or a mobile network transceiver such as a 3G, 4G, or Long Term Evolution (LTE) transceiver. In at least one embodiment, firmware interface 3728 enables communication with system firmware, and can be, for example, a unified extensible firmware interface (UEFI). In at least one embodiment, network controller 3734 can enable a network connection to a wired network. In at least one embodiment, a high-performance network controller (not shown) couples with interface bus 3710. In at least one embodiment, audio controller 3746 is a multi-channel high definition audio controller. In at least one embodiment, system 3700 includes an optional legacy I/O controller 3740 for coupling legacy (e.g., Personal System 2 (PS/2)) devices to system. In at least one embodiment, platform controller hub 3730 can also connect to one or more Universal Serial Bus (USB) controllers 3742 connect input devices, such as keyboard and mouse 3743 combinations, a camera 3744, or other USB input devices.

In at least one embodiment, an instance of memory controller 3716 and platform controller hub 3730 may be integrated into a discreet external graphics processor, such as external graphics processor 3712. In at least one embodiment, platform controller hub 3730 and/or memory controller 3716 may be external to one or more processor(s) 3702. For example, in at least one embodiment, system 3700 can include an external memory controller 3716 and platform controller hub 3730, which may be configured as a memory controller hub and peripheral controller hub within a system chipset that is in communication with processor(s) 3702.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment portions or all of inference and/or training logic 1015 may be incorporated into graphics processor 3700. For example, in at least one embodiment, training and/or inferencing techniques described herein may use one or more of ALUs embodied in graphics processor 3712. Moreover, in at least one embodiment, inferencing and/or training operations described herein may be done using logic other than logic illustrated in FIG. 9 or 10. In at least one embodiment, weight parameters may be stored in on-chip or off-chip memory and/or registers (shown or not shown) that configure ALUs of graphics processor 3700 to perform one or more machine learning algorithms, neural network architectures, use cases, or training techniques described herein. In at least one embodiment, inference and/or training logic 1015 are used to perform segmentation based on extreme points.

Figure 38:
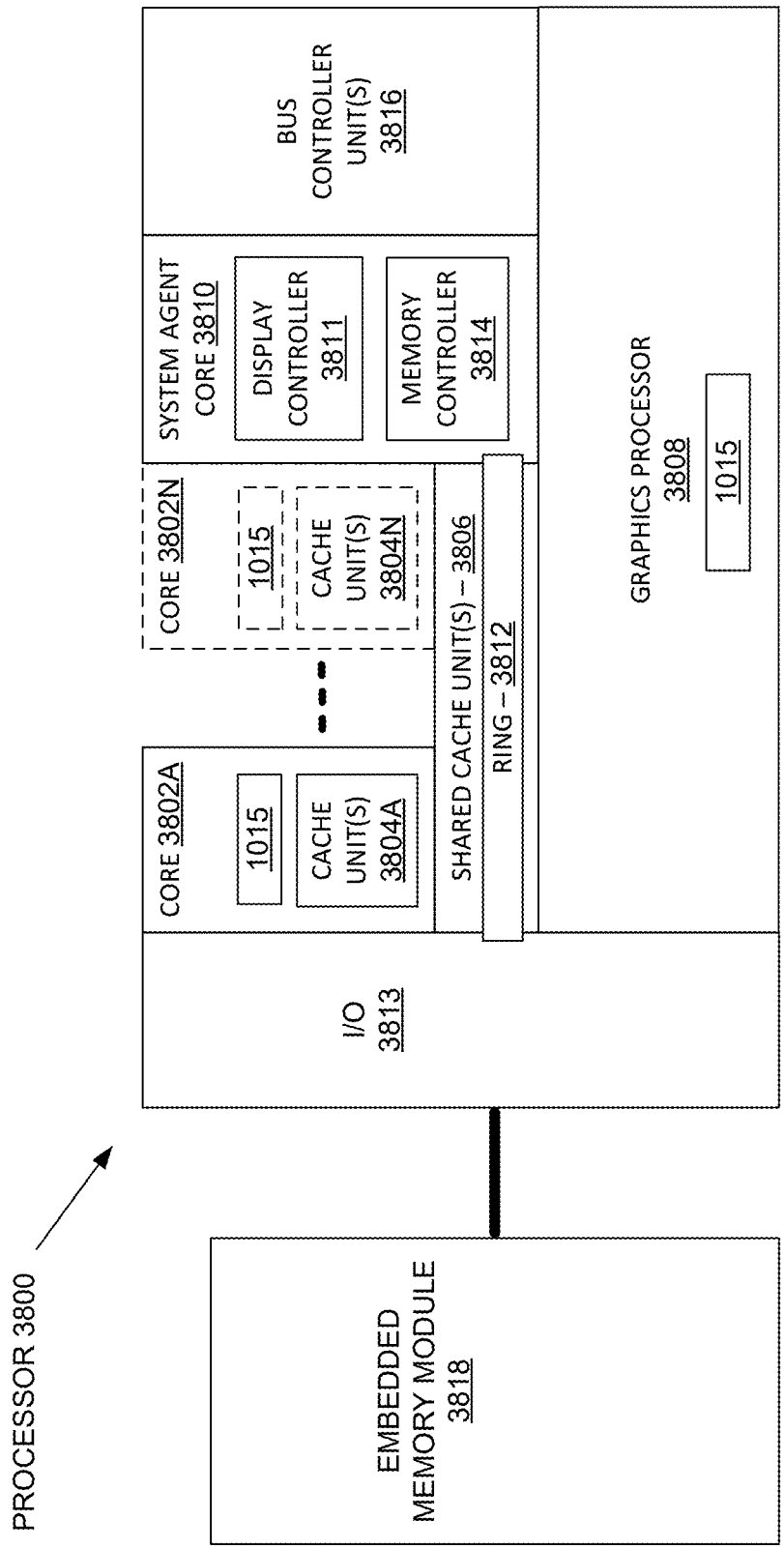

FIG. 38 is a block diagram of a processor 3800 having one or more processor cores 3802A-3802N, an integrated memory controller 3814, and an integrated graphics processor 3808, according to at least one embodiment. In at least one embodiment, processor 3800 can include additional cores up to and including additional core 3802N represented by dashed lined boxes. In at least one embodiment, each of processor cores 3802A-3802N includes one or more internal cache units 3804A-3804N. In at least one embodiment, each processor core also has access to one or more shared cached units 3806.

In at least one embodiment, internal cache units 3804A-3804N and shared cache units 3806 represent a cache memory hierarchy within processor 3800. In at least one embodiment, cache memory units 3804A-3804N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3806 and 3804A-3804N.

In at least one embodiment, processor 3800 may also include a set of one or more bus controller units 3816 and a system agent core 3810. In at least one embodiment, one or more bus controller units 3816 manage a set of peripheral buses, such as one or more PCI or PCI express busses. In at least one embodiment, system agent core 3810 provides management functionality for various processor components. In at least one embodiment, system agent core 3810 includes one or more integrated memory controllers 3814 to manage access to various external memory devices (not shown).

In at least one embodiment, one or more of processor cores 3802A-3802N include support for simultaneous multi-threading. In at least one embodiment, system agent core 3810 includes components for coordinating and operating cores 3802A-3802N during multi-threaded processing. In at least one embodiment, system agent core 3810 may additionally include a power control unit (PCU), which includes logic and components to regulate one or more power states of processor cores 3802A-3802N and graphics processor 3808.

In at least one embodiment, processor 3800 additionally includes graphics processor 3808 to execute graphics processing operations. In at least one embodiment, graphics processor 3808 couples with shared cache units 3806, and system agent core 3810, including one or more integrated memory controllers 3814. In at least one embodiment, system agent core 3810 also includes a display controller 3811 to drive graphics processor output to one or more coupled displays. In at least one embodiment, display controller 3811 may also be a separate module coupled with graphics processor 3808 via at least one interconnect, or may be integrated within graphics processor 3808.

In at least one embodiment, a ring based interconnect unit 3812 is used to couple internal components of processor 3800. In at least one embodiment, an alternative interconnect unit may be used, such as a point-to-point interconnect, a switched interconnect, or other techniques. In at least one embodiment, graphics processor 3808 couples with ring interconnect 3812 via an I/O link 3813.

In at least one embodiment, I/O link 3813 represents at least one of multiple varieties of I/O interconnects, including an on package I/O interconnect which facilitates communication between various processor components and a high-performance embedded memory module 3818, such as an eDRAM module. In at least one embodiment, each of processor cores 3802A-3802N and graphics processor 3808 use embedded memory modules 3818 as a shared Last Level Cache.

In at least one embodiment, processor cores 3802A-3802N are homogenous cores executing a common instruction set architecture. In at least one embodiment, processor cores 3802A-3802N are heterogeneous in terms of instruction set architecture (ISA), where one or more of processor cores 3802A-3802N execute a common instruction set, while one or more other cores of processor cores 3802A-38-02N executes a subset of a common instruction set or a different instruction set. In at least one embodiment, processor cores 3802A-3802N are heterogeneous in terms of microarchitecture, where one or more cores having a relatively higher power consumption couple with one or more power cores having a lower power consumption. In at least one embodiment, processor 3800 can be implemented on one or more chips or as an SoC integrated circuit.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment portions or all of inference and/or training logic 1015 may be incorporated into processor 3800. For example, in at least one embodiment, training and/or inferencing techniques described herein may use one or more of ALUs embodied in graphics processor 3712, graphics core(s) 3802A-3802N, or other components in FIG. 38. Moreover, in at least one embodiment, inferencing and/or training operations described herein may be done using logic other than logic illustrated in FIG. 9 or 10. In at least one embodiment, weight parameters may be stored in on-chip or off-chip memory and/or registers (shown or not shown) that configure ALUs of graphics processor 3800 to perform one or more machine learning algorithms, neural network architectures, use cases, or training techniques described herein. In at least one embodiment, inference and/or training logic 1015 are used to perform segmentation based on extreme points.

Figure 39:
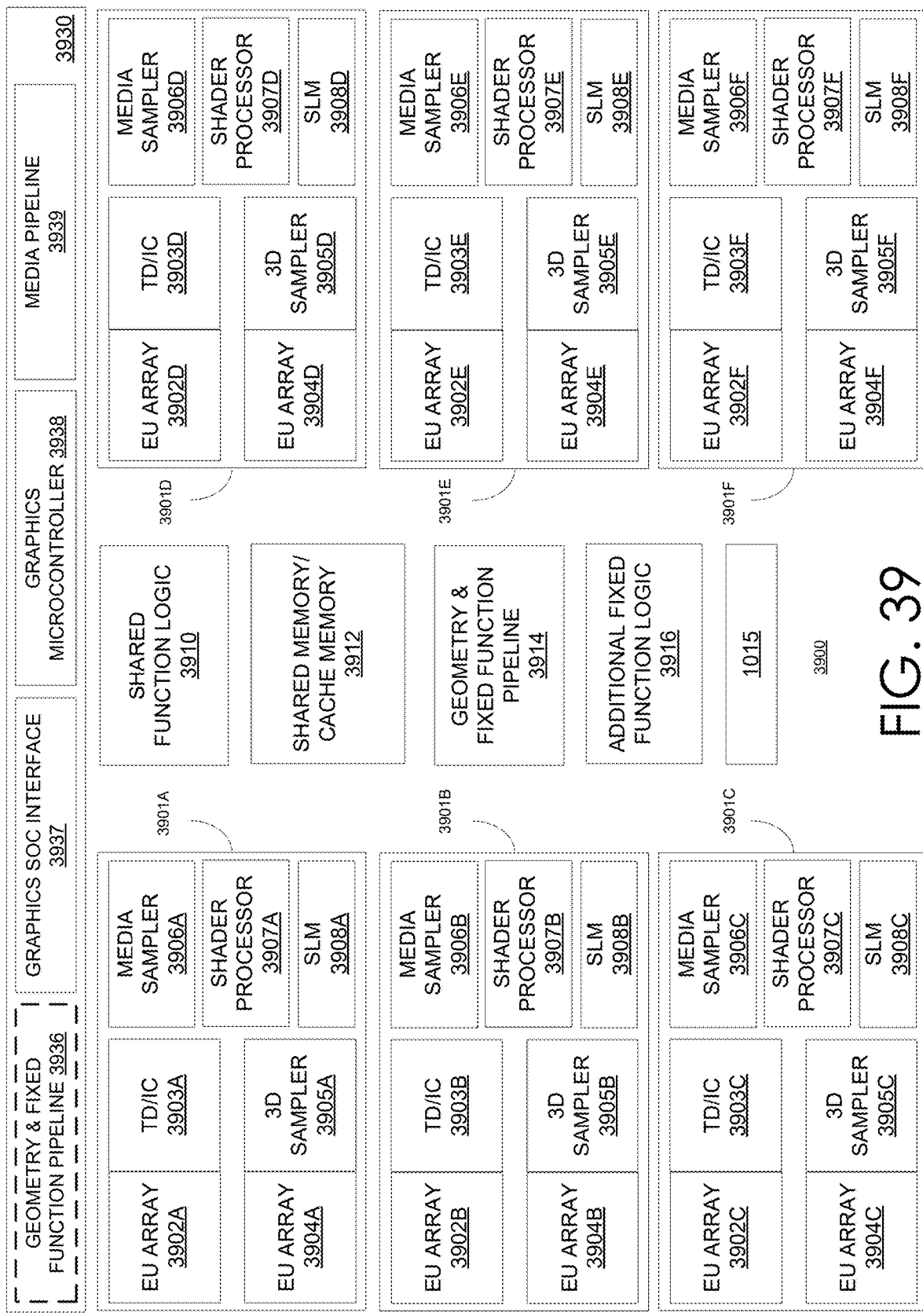
FIG. 39 illustrates at least portions of a graphics processor core, according to at least one embodiment.

FIG. 39 is a block diagram of hardware logic of a graphics processor core 3900, according to at least one embodiment described herein. In at least one embodiment, graphics processor core 3900 is included within a graphics core array. In at least one embodiment, graphics processor core 3900, sometimes referred to as a core slice, can be one or multiple graphics cores within a modular graphics processor. In at least one embodiment, graphics processor core 3900 is exemplary of one graphics core slice, and a graphics processor as described herein may include multiple graphics core slices based on target power and performance envelopes. In at least one embodiment, each graphics core 3900 can include a fixed function block 3930 coupled with multiple sub-cores 3901A-3901F, also referred to as sub-slices, that include modular blocks of general-purpose and fixed function logic.

In at least one embodiment, fixed function block 3930 includes a geometry/fixed function pipeline 3936 that can be shared by all sub-cores in graphics processor 3900, for example, in lower performance and/or lower power graphics processor implementations. In at least one embodiment, geometry/fixed function pipeline 3936 includes a 3D fixed function pipeline, a video front-end unit, a thread spawner and thread dispatcher, and a unified return buffer manager, which manages unified return buffers.

In at least one embodiment fixed, function block 3930 also includes a graphics SoC interface 3937, a graphics microcontroller 3938, and a media pipeline 3939. In at least one embodiment fixed, graphics SoC interface 3937 provides an interface between graphics core 3900 and other processor cores within a system on a chip integrated circuit. In at least one embodiment, graphics microcontroller 3938 is a programmable sub-processor that is configurable to manage various functions of graphics processor 3900, including thread dispatch, scheduling, and pre-emption. In at least one embodiment, media pipeline 3939 includes logic to facilitate decoding, encoding, pre-processing, and/or post-processing of multimedia data, including image and video data. In at least one embodiment, media pipeline 3939 implements media operations via requests to compute or sampling logic within sub-cores 3901-3901F.

In at least one embodiment, SoC interface 3937 enables graphics core 3900 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3937 can also enable communication with fixed function devices within an SoC, such as camera imaging pipelines, and enables use of and/or implements global memory atomics that may be shared between graphics core 3900 and CPUs within an SoC. In at least one embodiment, SoC interface 3937 can also implement power management controls for graphics core 3900 and enable an interface between a clock domain of graphic core 3900 and other clock domains within an SoC. In at least one embodiment, SoC interface 3937 enables receipt of command buffers from a command streamer and global thread dispatcher that are configured to provide commands and instructions to each of one or more graphics cores within a graphics processor. In at least one embodiment, commands and instructions can be dispatched to media pipeline 3939, when media operations are to be performed, or a geometry and fixed function pipeline (e.g., geometry and fixed function pipeline 3936, geometry and fixed function pipeline 3914) when graphics processing operations are to be performed.

In at least one embodiment, graphics microcontroller 3938 can be configured to perform various scheduling and management tasks for graphics core 3900. In at least one embodiment, graphics microcontroller 3938 can perform graphics and/or compute workload scheduling on various graphics parallel engines within execution unit (EU) arrays 3902A-3902F, 3904A-3904F within sub-cores 3901A-3901F. In at least one embodiment, host software executing on a CPU core of an SoC including graphics core 3900 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3938 can also facilitate low-power or idle states for graphics core 3900, providing graphics core 3900 with an ability to save and restore registers within graphics core 3900 across low-power state transitions independently from an operating system and/or graphics driver software on a system.

In at least one embodiment, graphics core 3900 may have greater than or fewer than illustrated sub-cores 3901A-3901F, up to N modular sub-cores. For each set of N sub-cores, in at least one embodiment, graphics core 3900 can also include shared function logic 3910, shared and/or cache memory 3912, a geometry/fixed function pipeline 3914, as well as additional fixed function logic 3916 to accelerate various graphics and compute processing operations. In at least one embodiment, shared function logic 3910 can include logic units (e.g., sampler, math, and/or inter-thread communication logic) that can be shared by each N sub-cores within graphics core 3900. In at least one embodiment fixed, shared and/or cache memory 3912 can be a last-level cache for N sub-cores 3901A-3901F within graphics core 3900 and can also serve as shared memory that is accessible by multiple sub-cores. In at least one embodiment, geometry/fixed function pipeline 3914 can be included instead of geometry/fixed function pipeline 3936 within fixed function block 3930 and can include same or similar logic units.

In at least one embodiment, graphics core 3900 includes additional fixed function logic 3916 that can include various fixed function acceleration logic for use by graphics core 3900. In at least one embodiment, additional fixed function logic 3916 includes an additional geometry pipeline for use in position only shading. In position-only shading, at least two geometry pipelines exist, whereas in a full geometry pipeline within geometry/fixed function pipeline 3916, 3936, and a cull pipeline, which is an additional geometry pipeline which may be included within additional fixed function logic 3916. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3916 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 3916 can also include machine-learning acceleration logic, such as fixed function matrix multiplication logic, for implementations including optimizations for machine learning training or inferencing.

In at least one embodiment, within each graphics sub-core 3901A-3901F includes a set of execution resources that may be used to perform graphics, media, and compute operations in response to requests by graphics pipeline, media pipeline, or shader programs. In at least one embodiment, graphics sub-cores 3901A-3901F include multiple EU arrays 3902A-3902F, 3904A-3904F, thread dispatch and inter-thread communication (TD/IC) logic 3903A-3903F, a 3D (e.g., texture) sampler 3905A-3905F, a media sampler 3906A-3906F, a shader processor 3907A-3907F, and shared local memory (SLM) 3908A-3908F. EU arrays 3902A-3902F, 3904A-3904F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3903A-3903F performs local thread dispatch and thread control operations for execution units within a sub-core and facilitate communication between threads executing on execution units of a sub-core. In at least one embodiment, 3D sampler 3905A-3905F can read texture or other 3D graphics related data into memory. In at least one embodiment, 3D sampler can read texture data differently based on a configured sample state and texture format associated with a given texture. In at least one embodiment, media sampler 3906A-3906F can perform similar read operations based on a type and format associated with media data. In at least one embodiment, each graphics sub-core 3901A-3901F can alternately include a unified 3D and media sampler. In at least one embodiment, threads executing on execution units within each of sub-cores 3901A-3901F can make use of shared local memory 3908A-3908F within each sub-core, to enable threads executing within a thread group to execute using a common pool of on-chip memory.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, portions or all of inference and/or training logic 1015 may be incorporated into graphics processor 3910. For example, in at least one embodiment, training and/or inferencing techniques described herein may use one or more of ALUs embodied in graphics processor 3712, graphics microcontroller 3938, geometry & fixed function pipeline 3914 and 3936, or other logic in FIG. 38. Moreover, in at least one embodiment, inferencing and/or training operations described herein may be done using logic other than logic illustrated in FIG. 9 or 10. In at least one embodiment, weight parameters may be stored in on-chip or off-chip memory and/or registers (shown or not shown) that configure ALUs of graphics processor 3900 to perform one or more machine learning algorithms, neural network architectures, use cases, or training techniques described herein. In at least one embodiment, inference and/or training logic 1015 are used to perform segmentation based on extreme points.

Figure 40:
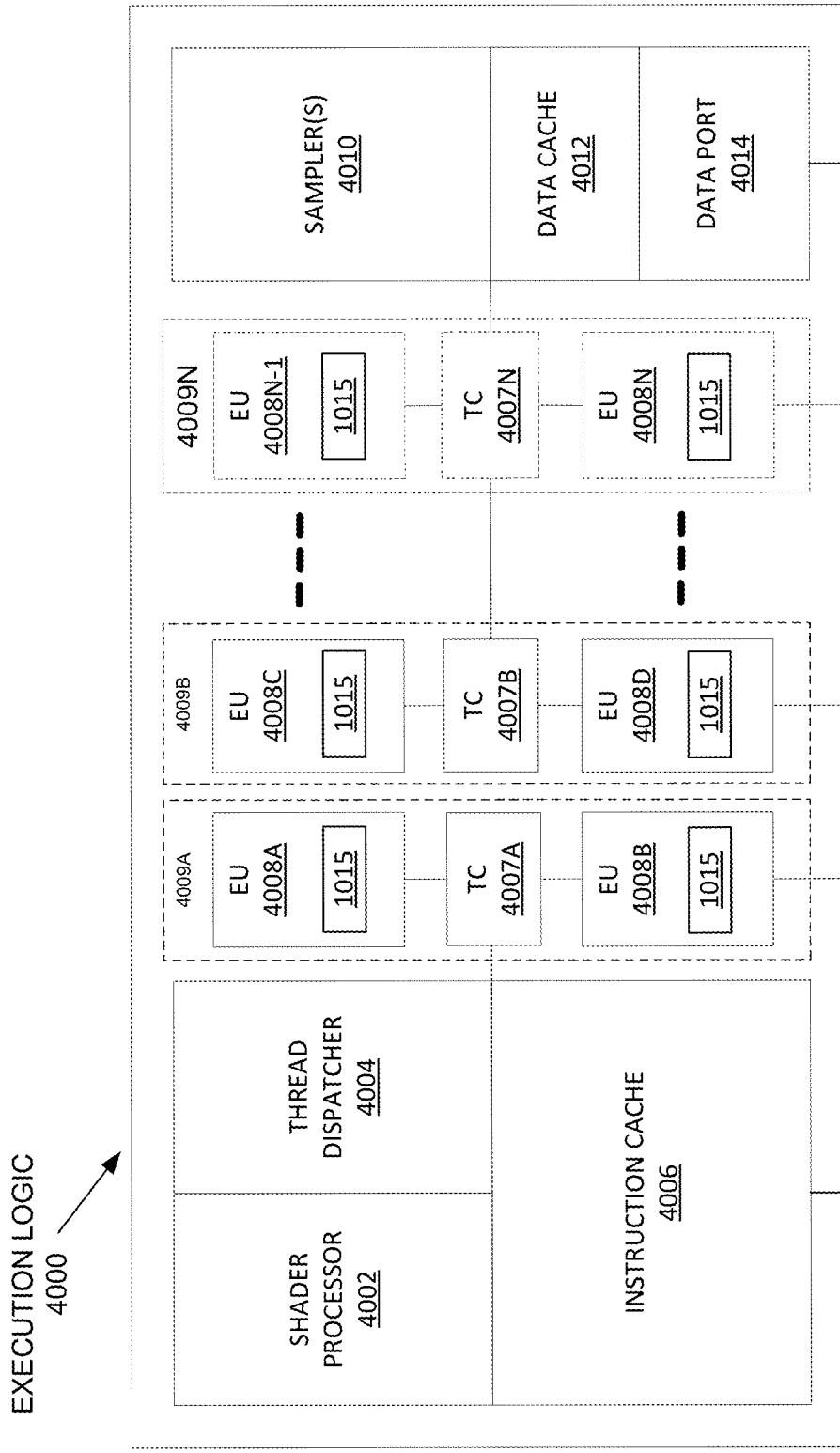
FIGS. 40-41 illustrate at least portions of a graphics processor core, according to at least one embodiment.
Figure 41:
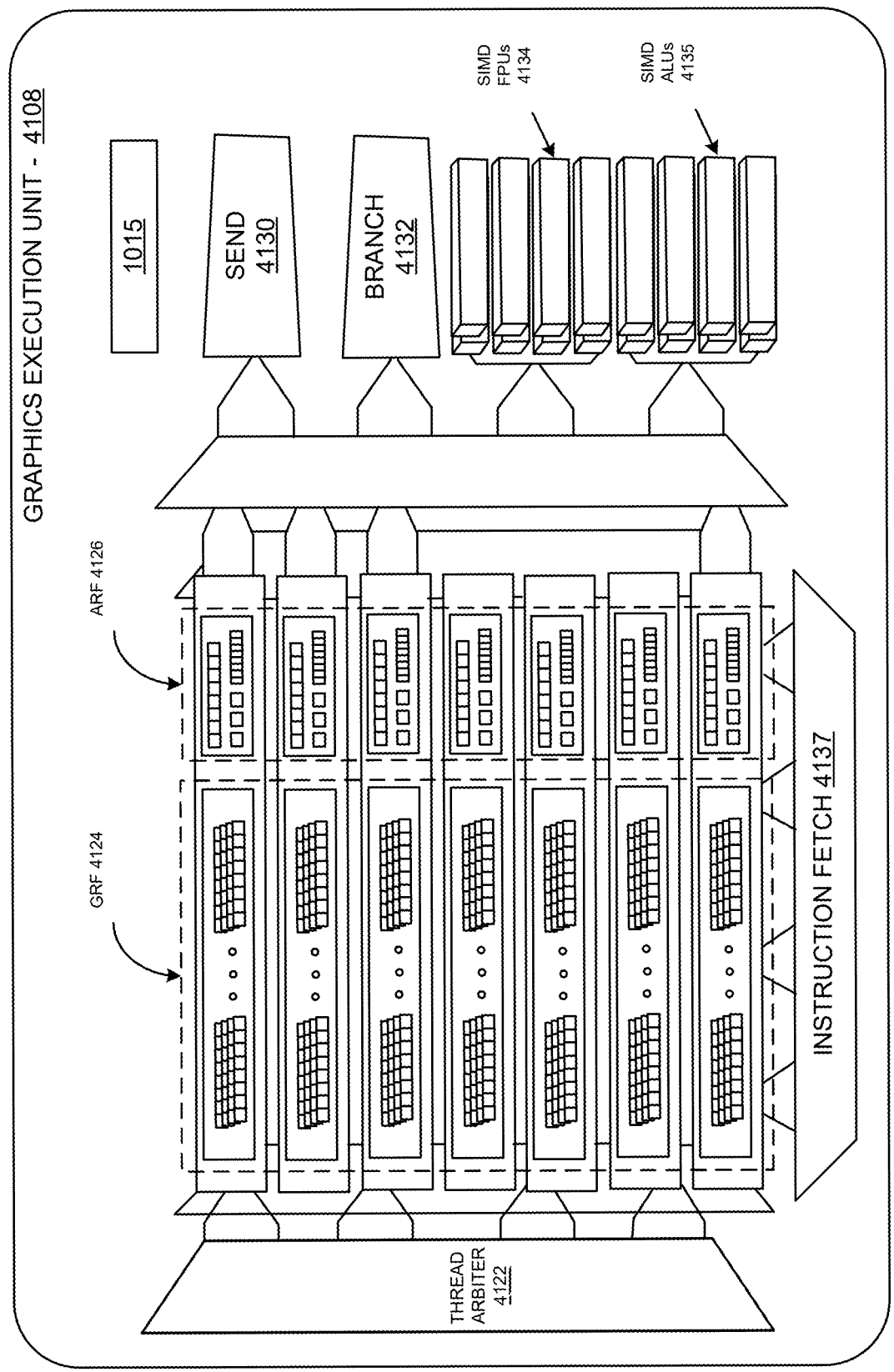

FIGS. 40-41 illustrate thread execution logic 4000 including an array of processing elements of a graphics processor core according to at least one embodiment. FIG. 40 illustrates at least one embodiment, in which thread execution logic 4000 is used. FIG. 41 illustrates exemplary internal details of an execution unit, according to at least one embodiment.

As illustrated in FIG. 40, in at least one embodiment, thread execution logic 4000 includes a shader processor 4002, a thread dispatcher 4004, instruction cache 4006, a scalable execution unit array including a plurality of execution units 4008A-4008N, sampler(s) 4010, a data cache 4012, and a data port 4014. In at least one embodiment a scalable execution unit array can dynamically scale by enabling or disabling one or more execution units (e.g., any of execution unit 4008A, 4008B, 4008C, 4008D, through 4008N-1 and 4008N) based on computational requirements of a workload, for example. In at least one embodiment, scalable execution units are interconnected via an interconnect fabric that links to each of execution unit. In at least one embodiment, thread execution logic 4000 includes one or more connections to memory, such as system memory or cache memory, through one or more of instruction cache 4006, data port 4014, sampler 4010, and execution units 4008A-4008N. In at least one embodiment, each execution unit (e.g., 4008A) is a stand-alone programmable general-purpose computational unit that is capable of executing multiple simultaneous hardware threads while processing multiple data elements in parallel for each thread. In at least one embodiment, array of execution units 4008A-4008N is scalable to include any number individual execution units.

In at least one embodiment, execution units 4008A-4008N are primarily used to execute shader programs. In at least one embodiment, shader processor 4002 can process various shader programs and dispatch execution threads associated with shader programs via a thread dispatcher 4004. In at least one embodiment, thread dispatcher 4004 includes logic to arbitrate thread initiation requests from graphics and media pipelines and instantiate requested threads on one or more execution units in execution units 4008A-4008N. For example, in at least one embodiment, a geometry pipeline can dispatch vertex, tessellation, or geometry shaders to thread execution logic for processing. In at least one embodiment, thread dispatcher 4004 can also process runtime thread spawning requests from executing shader programs.

In at least one embodiment, execution units 4008A-4008N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 4008A-4008N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 4008A-4008N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 4008A-4008N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 4008A-4008N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 4009A-4009N having thread control logic (4007A-4007N) that is common to fused EUs. In at least one embodiment, multiple EUs can be fused into an EU group. In at least one embodiment, each EU in fused EU group can be configured to execute a separate SIMD hardware thread. Number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 4009A-4009N includes at least two execution units. For example, in at least one embodiment, fused execution unit 4009A includes a first EU 4008A, second EU 4008B, and thread control logic 4007A that is common to first EU 4008A and second EU 4008B. In at least one embodiment, thread control logic 4007A controls threads executed on fused graphics execution unit 4009A, allowing each EU within fused execution units 4009A-4009N to execute using a common instruction pointer register.

In at least one embodiment, one or more internal instruction caches (e.g., 4006) are included in thread execution logic 4000 to cache thread instructions for execution units. In at least one embodiment, one or more data caches (e.g., 4012) are included to cache thread data during thread execution. In at least one embodiment, a sampler 4010 is included to provide texture sampling for 3D operations and media sampling for media operations. In at least one embodiment, sampler 4010 includes specialized texture or media sampling functionality to process texture or media data during a sampling process before providing sampled data to an execution unit.

During execution, in at least one embodiment, graphics and media pipelines send thread initiation requests to thread execution logic 4000 via thread spawning and dispatch logic. In at least one embodiment, once a group of geometric objects has been processed and rasterized into pixel data, pixel processor logic (e.g., pixel shader logic, fragment shader logic, etc.) within shader processor 4002 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 4002 then executes an application programming interface (API)-supplied pixel or fragment shader program. In at least one embodiment, to execute a shader program, shader processor 4002 dispatches threads to an execution unit (e.g., 4008A) via thread dispatcher 4004. In at least one embodiment, shader processor 4002 uses texture sampling logic in sampler 4010 to access texture data in texture maps stored in memory. In at least one embodiment, arithmetic operations on texture data and input geometry data compute pixel color data for each geometric fragment, or discards one or more pixels from further processing.

In at least one embodiment, data port 4014 provides a memory access mechanism for thread execution logic 4000 to output processed data to memory for further processing on a graphics processor output pipeline. In at least one embodiment, data port 4014 includes or couples to one or more cache memories (e.g., data cache 4012) to cache data for memory access via a data port.

As illustrated in FIG. 41, in at least one embodiment, a graphics execution unit 4008 can include an instruction fetch unit 4037, a general register file array (GRF) 4024, an architectural register file array (ARF) 4026, a thread arbiter 4022, a send unit 4030, a branch unit 4032, a set of SIMD floating point units (FPUs) 4034, and, in at least one embodiment, a set of dedicated integer SIMD ALUs 4035. In at least one embodiment, GRF 4024 and ARF 4026 includes a set of general register files and architecture register files associated with each simultaneous hardware thread that may be active in graphics execution unit 4008. In at least one embodiment, per thread architectural state is maintained in ARF 4026, while data used during thread execution is stored in GRF 4024. In at least one embodiment, execution state of each thread, including instruction pointers for each thread, can be held in thread-specific registers in ARF 4026.

In at least one embodiment, graphics execution unit 4008 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 4008 can co-issue multiple instructions, which may each be different instructions. In at least one embodiment, thread arbiter 4022 of graphics execution unit thread 4008 can dispatch instructions to one of send unit 4030, branch unit 4042, or SIMD FPU(s) 4034 for execution. In at least one embodiment, each execution thread can access 128 general-purpose registers within GRF 4024, where each register can store 32 bytes, accessible as a SIMD 8-element vector of 32-bit data elements. In at least one embodiment, each execution unit thread has access to 4 Kbytes within GRF 4024, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 4024 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 4030. In at least one embodiment, branch instructions are dispatched to a dedicated branch unit 4032 to facilitate SIMD divergence and eventual convergence.

In at least one embodiment graphics execution unit 4008 includes one or more SIMD floating point units (FPU(s)) 4034 to perform floating-point operations. In at least one embodiment, FPU(s) 4034 also support integer computation. In at least one embodiment FPU(s) 4034 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 4035 are also present, and may be specifically optimized to perform operations associated with machine learning computations.

In at least one embodiment, arrays of multiple instances of graphics execution unit 4008 can be instantiated in a graphics sub-core grouping (e.g., a sub-slice). In at least one embodiment, execution unit 4008 can execute instructions across a plurality of execution channels. In at least one embodiment, each thread executed on graphics execution unit 4008 is executed on a different channel.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, portions or all of inference and/or training logic 1015 may be incorporated into execution logic 4000. Moreover, in at least one embodiment, inferencing and/or training operations described herein may be done using logic other than logic illustrated in FIG. 9 or 10. In at least one embodiment, weight parameters may be stored in on-chip or off-chip memory and/or registers (shown or not shown) that configure ALUs of execution logic 4000 to perform one or more machine learning algorithms, neural network architectures, use cases, or training techniques described herein. In at least one embodiment, inference and/or training logic 1015 are used to perform segmentation based on extreme points.

Figure 42:
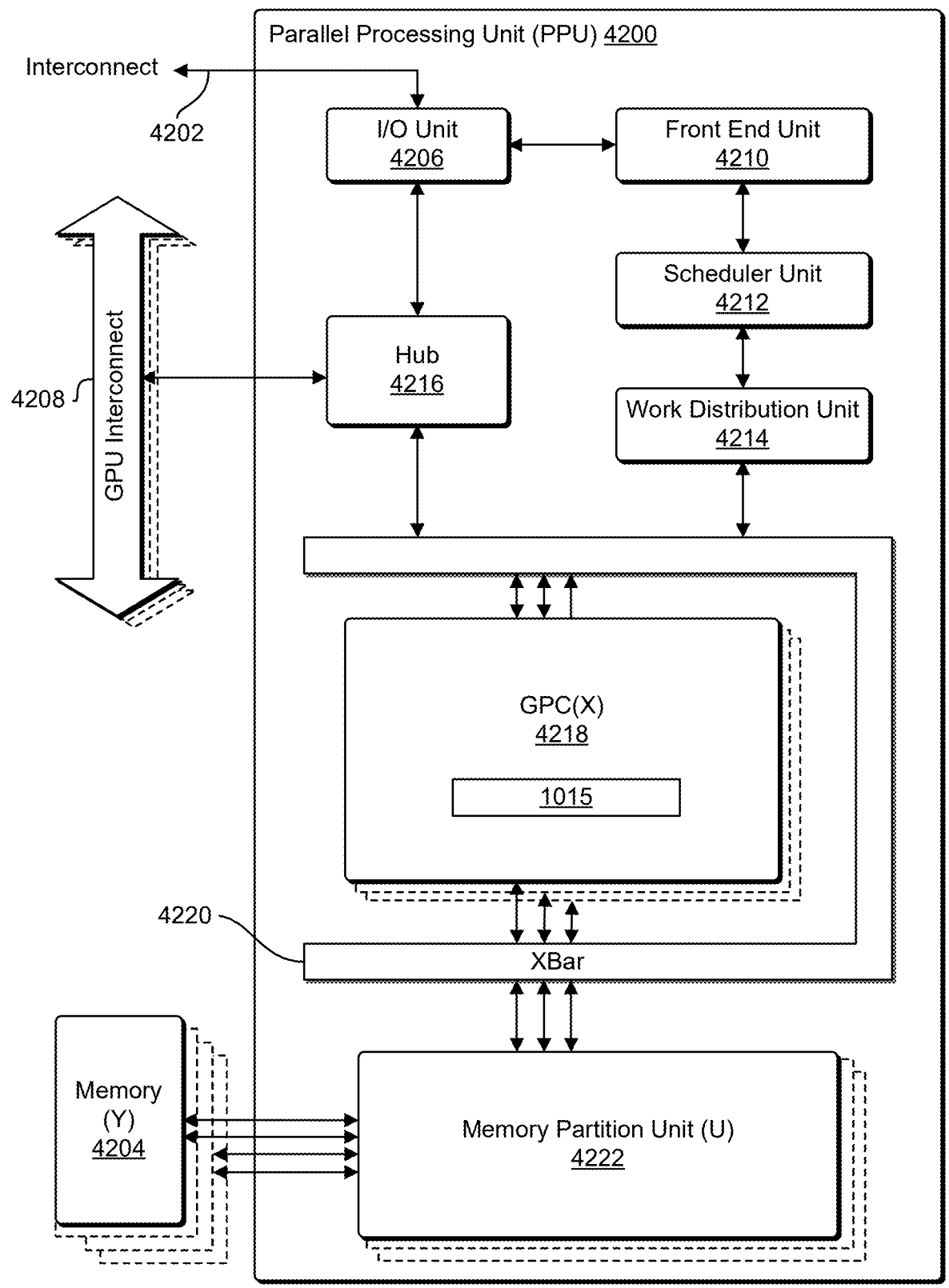
FIG. 42 illustrates a parallel processing unit ("PPU"), according to at least one embodiment.

FIG. 42 illustrates a parallel processing unit ("PPU") 4200, according to at least one embodiment. In at least one embodiment, PPU 4200 is configured with machine-readable code that, if executed by PPU 4200, causes PPU 4200 to perform some or all of processes and techniques described throughout this disclosure. In at least one embodiment, PPU 4200 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 4200. In at least one embodiment, PPU 4200 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 4200 is utilized to perform computations such as linear algebra operations and machine-learning operations. FIG. 42 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 4200 are configured to accelerate High Performance Computing ("HPC"), data center, and machine learning applications. In at least one embodiment, PPU 4200 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 4200 includes, without limitation, an Input/Output ("I/O") unit 4206, a front-end unit 4210, a scheduler unit 4212, a work distribution unit 4214, a hub 4216, a crossbar ("Xbar") 4220, one or more general processing clusters ("GPCs") 4218, and one or more partition units ("memory partition units") 4222. In at least one embodiment, PPU 4200 is connected to a host processor or other PPUs 4200 via one or more high-speed GPU interconnects ("GPU interconnects") 4208. In at least one embodiment, PPU 4200 is connected to a host processor or other peripheral devices via an interconnect 4202. In at least one embodiment, PPU 4200 is connected to a local memory comprising one or more memory devices ("memory") 4204. In at least one embodiment, memory devices 4204 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 4208 may refer to a wire-based multi-lane communications link that is used by systems to scale and include one or more PPUs 4200 combined with one or more central processing units ("CPUs"), supports cache coherence between PPUs 4200 and CPUs, and CPU mastering. In at least one embodiment, data and/or commands are transmitted by high-speed GPU interconnect 4208 through hub 4216 to/from other units of PPU 4200 such as one or more copy engines, video encoders, video decoders, power management units, and other components which may not be explicitly illustrated in FIG. 42.

In at least one embodiment, I/O unit 4206 is configured to transmit and receive communications (e.g., commands, data) from a host processor (not illustrated in FIG. 42) over system bus 4202. In at least one embodiment, I/O unit 4206 communicates with host processor directly via system bus 4202 or through one or more intermediate devices such as a memory bridge. In at least one embodiment, I/O unit 4206 may communicate with one or more other processors, such as one or more of PPUs 4200 via system bus 4202. In at least one embodiment, I/O unit 4206 implements a Peripheral Component Interconnect Express ("PCIe") interface for communications over a PCIe bus. In at least one embodiment, I/O unit 4206 implements interfaces for communicating with external devices.

In at least one embodiment, I/O unit 4206 decodes packets received via system bus 4202. In at least one embodiment, at least some packets represent commands configured to cause PPU 4200 to perform various operations. In at least one embodiment, I/O unit 4206 transmits decoded commands to various other units of PPU 4200 as specified by commands. In at least one embodiment, commands are transmitted to front-end unit 4210 and/or transmitted to hub 4216 or other units of PPU 4200 such as one or more copy engines, a video encoder, a video decoder, a power management unit, etc. (not explicitly illustrated in FIG. 42). In at least one embodiment, I/O unit 4206 is configured to route communications between and among various logical units of PPU 4200.

In at least one embodiment, a program executed by host processor encodes a command stream in a buffer that provides workloads to PPU 4200 for processing. In at least one embodiment, a workload comprises instructions and data to be processed by those instructions. In at least one embodiment, buffer is a region in a memory that is accessible (e.g., read/write) by both host processor and PPU 4200—a host interface unit may be configured to access buffer in a system memory connected to system bus 4202 via memory requests transmitted over system bus 4202 by I/O unit 4206. In at least one embodiment, host processor writes command stream to buffer and then transmits a pointer to start of command stream to PPU 4200 such that front-end unit 4210 receives pointers to one or more command streams and manages one or more command streams, reading commands from command streams and forwarding commands to various units of PPU 4200.

In at least one embodiment, front-end unit 4210 is coupled to scheduler unit 4212 that configures various GPCs 4218 to process tasks defined by one or more command streams. In at least one embodiment, scheduler unit 4212 is configured to track state information related to various tasks managed by scheduler unit 4212 where state information may indicate which of GPCs 4218 a task is assigned to, whether task is active or inactive, a priority level associated with task, and so forth. In at least one embodiment, scheduler unit 4212 manages execution of a plurality of tasks on one or more of GPCs 4218.

In at least one embodiment, scheduler unit 4212 is coupled to work distribution unit 4214 that is configured to dispatch tasks for execution on GPCs 4218. In at least one embodiment, work distribution unit 4214 tracks a number of scheduled tasks received from scheduler unit 4212 and work distribution unit 4214 manages a pending task pool and an active task pool for each of GPCs 4218. In at least one embodiment, pending task pool comprises a number of slots (e.g., 32 slots) that contain tasks assigned to be processed by a particular GPC 4218; active task pool may comprise a number of slots (e.g., 4 slots) for tasks that are actively being processed by GPCs 4218 such that as one of GPCs 4218 completes execution of a task, that task is evicted from active task pool for GPC 4218 and one of other tasks from pending task pool is selected and scheduled for execution on GPC 4218. In at least one embodiment, if an active task is idle on GPC 4218, such as while waiting for a data dependency to be resolved, then active task is evicted from GPC 4218 and returned to pending task pool while another task in pending task pool is selected and scheduled for execution on GPC 4218.

In at least one embodiment, work distribution unit 4214 communicates with one or more GPCs 4218 via XBar 4220. In at least one embodiment, XBar 4220 is an interconnect network that couples many of units of PPU 4200 to other units of PPU 4200 and can be configured to couple work distribution unit 4214 to a particular GPC 4218. In at least one embodiment, one or more other units of PPU 4200 may also be connected to XBar 4220 via hub 4216.

In at least one embodiment, tasks are managed by scheduler unit 4212 and dispatched to one of GPCs 4218 by work distribution unit 4214. GPC 4218 is configured to process task and generate results. In at least one embodiment, results may be consumed by other tasks within GPC 4218, routed to a different GPC 4218 via XBar 4220, or stored in memory 4204. In at least one embodiment, results can be written to memory 4204 via partition units 4222, which implement a memory interface for reading and writing data to/from memory 4204. In at least one embodiment, results can be transmitted to another PPU 4204 or CPU via high-speed GPU interconnect 4208. In at least one embodiment, PPU 4200 includes, without limitation, a number U of partition units 4222 that is equal to number of separate and distinct memory devices 4204 coupled to PPU 4200. In at least one embodiment, partition unit 4222 will be described in more detail below in conjunction with FIG. 44.

In at least one embodiment, a host processor executes a driver kernel that implements an application programming interface ("API") that enables one or more applications executing on host processor to schedule operations for execution on PPU 4200. In at least one embodiment, multiple compute applications are simultaneously executed by PPU 4200 and PPU 4200 provides isolation, quality of service ("QoS"), and independent address spaces for multiple compute applications. In at least one embodiment, an application generates instructions (e.g., in form of API calls) that cause driver kernel to generate one or more tasks for execution by PPU 4200 and driver kernel outputs tasks to one or more streams being processed by PPU 4200. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 44.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, deep learning application processor is used to train a machine learning model, such as a neural network, to predict or infer information provided to PPU 4200. In at least one embodiment, PPU 4200 is used to infer or predict information based on a trained machine learning model (e.g., neural network) that has been trained by another processor or system or by PPU 4200. In at least one embodiment, PPU 4200 may be used to perform one or more neural network use cases described herein. In at least one embodiment, inference and/or training logic 1015 are used to perform segmentation based on extreme points.

Figure 43:
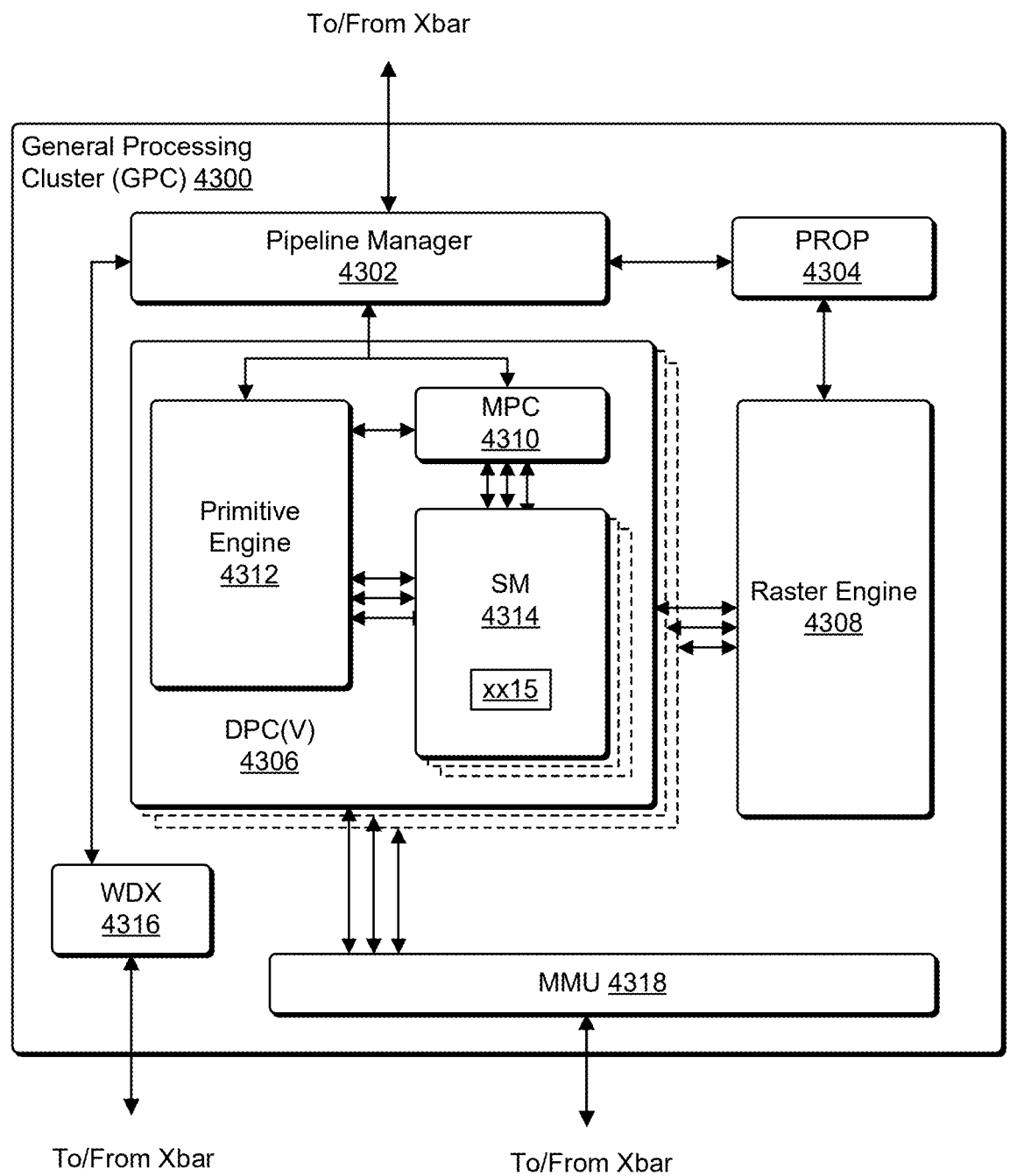
FIG. 43 illustrates a general processing cluster ("GPC"), according to at least one embodiment.

FIG. 43 illustrates a general processing cluster ("GPC") 4300, according to at least one embodiment. In at least one embodiment, GPC 4300 is GPC 4218 of FIG. 42. In at least one embodiment, each GPC 4300 includes, without limitation, a number of hardware units for processing tasks and each GPC 4300 includes, without limitation, a pipeline manager 4302, a pre-raster operations unit ("PROP") 4304, a raster engine 4308, a work distribution crossbar ("WDX") 4316, a memory management unit ("MMU") 4318, one or more Data Processing Clusters ("DPCs") 4306, and any suitable combination of parts.

In at least one embodiment, operation of GPC 4300 is controlled by pipeline manager 4302. In at least one embodiment, pipeline manager 4302 manages configuration of one or more DPCs 4306 for processing tasks allocated to GPC 4300. In at least one embodiment, pipeline manager 4302 configures at least one of one or more DPCs 4306 to implement at least a portion of a graphics rendering pipeline. In at least one embodiment, DPC 4306 is configured to execute a vertex shader program on a programmable streaming multi-processor ("SM") 4314. In at least one embodiment, pipeline manager 4302 is configured to route packets received from a work distribution unit to appropriate logical units within GPC 4300, in at least one embodiment, and some packets may be routed to fixed function hardware units in PROP 4304 and/or raster engine 4308 while other packets may be routed to DPCs 4306 for processing by a primitive engine 4312 or SM 4314. In at least one embodiment, pipeline manager 4302 configures at least one of DPCs 4306 to implement a neural network model and/or a computing pipeline.

In at least one embodiment, PROP unit 4304 is configured, in at least one embodiment, to route data generated by raster engine 4308 and DPCs 4306 to a Raster Operations ("ROP") unit in partition unit 4222, described in more detail above in conjunction with FIG. 42. In at least one embodiment, PROP unit 4304 is configured to perform optimizations for color blending, organize pixel data, perform address translations, and more. In at least one embodiment, raster engine 4308 includes, without limitation, a number of fixed function hardware units configured to perform various raster operations, in at least one embodiment, and raster engine 4308 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 4308 comprises fragments to be processed by any suitable entity such as by a fragment shader implemented within DPC 4306.

In at least one embodiment, each DPC 4306 included in GPC 4300 comprise, without limitation, an M-Pipe Controller ("MPC") 4310; primitive engine 4312; one or more SMs 4314; and any suitable combination thereof. In at least one embodiment, MPC 4310 controls operation of DPC 4306, routing packets received from pipeline manager 4302 to appropriate units in DPC 4306. In at least one embodiment, packets associated with a vertex are routed to primitive engine 4312, which is configured to fetch vertex attributes associated with vertex from memory; in contrast, packets associated with a shader program may be transmitted to SM 4314.

In at least one embodiment, SM 4314 comprises, without limitation, a programmable streaming processor that is configured to process tasks represented by a number of threads. In at least one embodiment, SM 4314 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 4314 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 4314 are described in more detail below.

In at least one embodiment, MMU 4318 provides an interface between GPC 4300 and memory partition unit (e.g., partition unit 4222 of FIG. 42) and MMU 4318 provides translation of virtual addresses into physical addresses, memory protection, and arbitration of memory requests. In at least one embodiment, MMU 4318 provides one or more translation lookaside buffers ("TLBs") for performing translation of virtual addresses into physical addresses in memory.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, deep learning application processor is used to train a machine learning model, such as a neural network, to predict or infer information provided to GPC 4300. In at least one embodiment, GPC 4300 is used to infer or predict information based on a trained machine learning model (e.g., neural network) that has been trained by another processor or system or by GPC 4300. In at least one embodiment, GPC 4300 may be used to perform one or more neural network use cases described herein. In at least one embodiment, inference and/or training logic 1015 are used to perform segmentation based on extreme points. In at least one embodiment, inference and/or training logic 1015 are used to perform segmentation based on extreme points.

Figure 44:
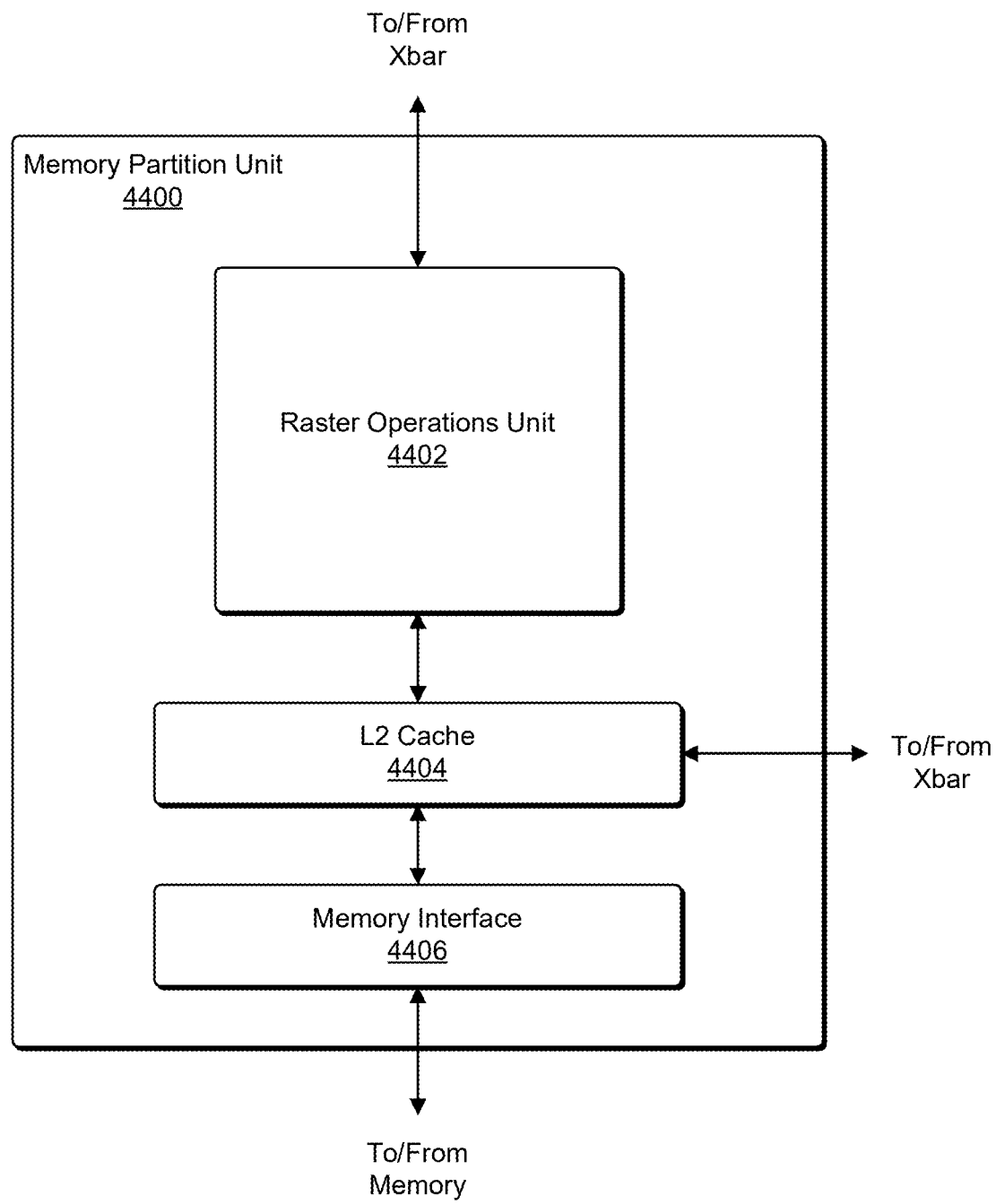
FIG. 44 illustrates a memory partition unit of a parallel processing unit ("PPU"), according to at least one embodiment.

FIG. 44 illustrates a memory partition unit 4400 of a parallel processing unit ("PPU"), in accordance with at least one embodiment. In at least one embodiment, memory partition unit 4400 includes, without limitation, a Raster Operations ("ROP") unit 4402; a level two ("L2") cache 4404; a memory interface 4406; and any suitable combination thereof. In at least one embodiment, memory interface 4406 is coupled to memory. In at least one embodiment, memory interface 4406 may implement 32, 64, 128, 1024-bit data buses, or similar implementations, for high-speed data transfer. In at least one embodiment, PPU incorporates U memory interfaces 4406, one memory interface 4406 per pair of partition units 4400, where each pair of partition units 4400 is connected to a corresponding memory device. For example, in at least one embodiment, PPU may be connected to up to Y memory devices, such as high bandwidth memory stacks or graphics double-data-rate, version 5, synchronous dynamic random a44ess memory ("GDDR5 SDRAM").

In at least one embodiment, memory interface 4406 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. In at least one embodiment, ECC provides higher reliability for compute applications that are sensitive to data corruption.

In at least one embodiment, PPU implements a multi-level memory hierarchy. In at least one embodiment, memory partition unit 4400 supports a unified memory to provide a single unified virtual address space for central processing unit ("CPU") and PPU memory, enabling data sharing between virtual memory systems. In at least one embodiment, frequency of accesses by a PPU to memory located on other processors is traced to ensure that memory pages are moved to physical memory of PPU that is accessing pages more frequently. In at least one embodiment, high-speed GPU interconnect 4208 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 4400 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 4204 of FIG. 42 or other system memory is fetched by memory partition unit 4400 and stored in L2 cache 4404, which is located on-chip and is shared between various GPCs, in accordance with at least one embodiment. Each memory partition unit 4400, in at least one embodiment, includes, without limitation, at least a portion of L2 cache associated with a corresponding memory device. In at least one embodiment, lower level caches are implemented in various units within GPCs. In at least one embodiment, each of SMs 4314 may implement a level one ("L1") cache wherein L1 cache is private memory that is dedicated to a particular SM 4314 and data from L2 cache 4404 is fetched and stored in each of L1 caches for processing in functional units of SMs 4314. In at least one embodiment, L2 cache 4404 is coupled to memory interface 4406 and XBar 4220.

ROP unit 4402 performs graphics raster operations related to pixel color, such as color compression, pixel blending, and more, in at least one embodiment. ROP unit 4402, in at least one embodiment, implements depth testing in conjunction with raster engine 4308, receiving a depth for a sample location associated with a pixel fragment from culling engine of raster engine 4308. In at least one embodiment, depth is tested against a corresponding depth in a depth buffer for a sample location associated with fragment. In at least one embodiment, if fragment passes depth test for sample location, then ROP unit 4402 updates depth buffer and transmits a result of depth test to raster engine 4308. It will be appreciated that number of partition units 4400 may be different than number of GPCs and, therefore, each ROP unit 4402 can, in at least one embodiment, be coupled to each of GPCs. In at least one embodiment, ROP unit 4402 tracks packets received from different GPCs and determines which that a result generated by ROP unit 4402 is routed to through XBar 4220.

Figure 45:
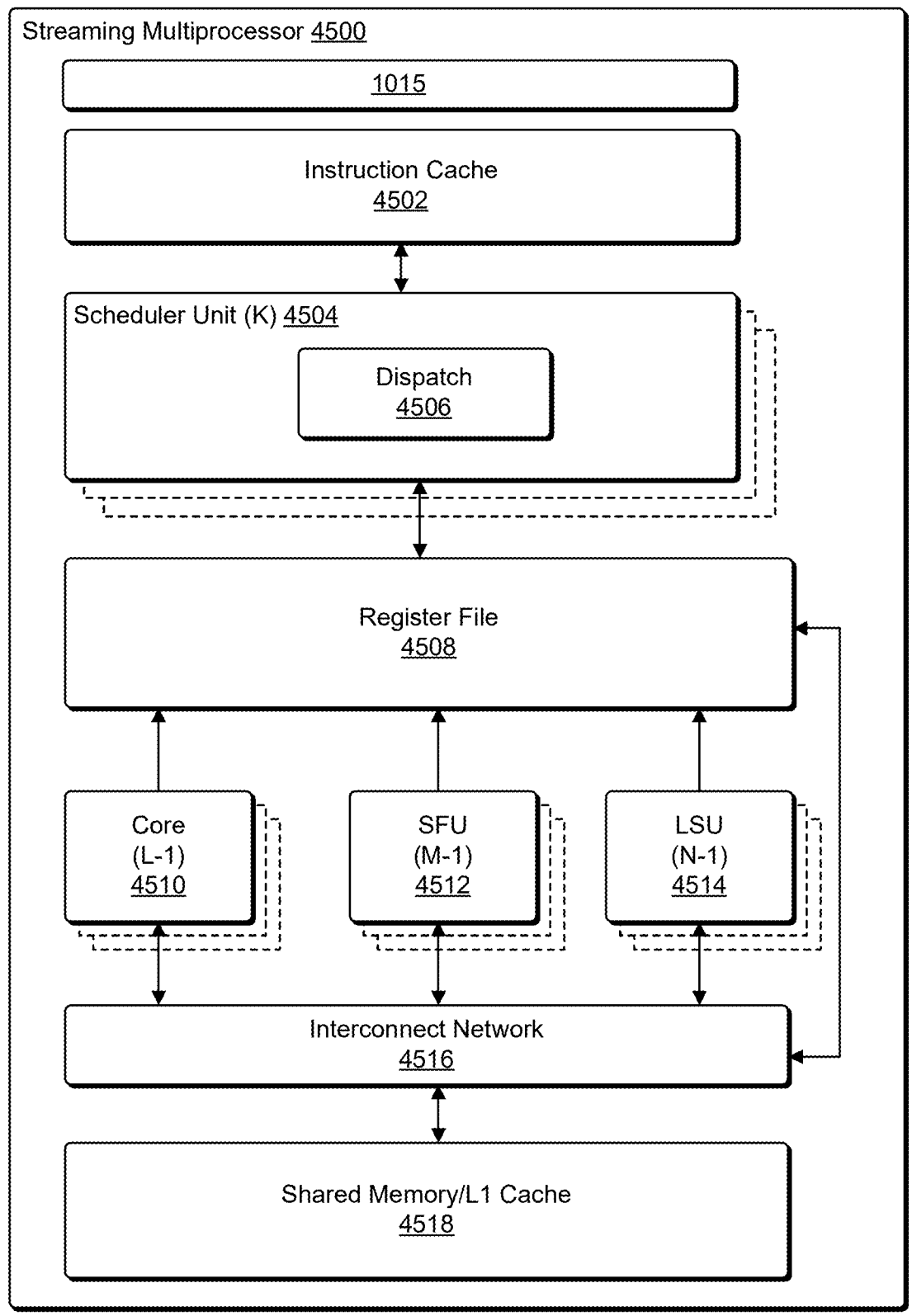
FIG. 45 illustrates a streaming multi-processor, according to at least one embodiment.

FIG. 45 illustrates a streaming multi-processor ("SM") 4500, according to at least one embodiment. In at least one embodiment, SM 4500 is SM 4314 of FIG. 43. In at least one embodiment, SM 4500 includes, without limitation, an instruction cache 4502; one or more scheduler units 4504; a register file 4508; one or more processing cores ("cores") 4510; one or more special function units ("SFUs") 4512; one or more load/store units ("LSUs") 4514; an interconnect network 4516; a shared memory/level one ("L1") cache 4518; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 4500. In at least one embodiment, scheduler unit 4504 receives tasks from work distribution unit and manages instruction scheduling for one or more thread blocks assigned to SM 4500. In at least one embodiment, scheduler unit 4504 schedules thread blocks for execution as warps of parallel threads, wherein each thread block is allocated at least one warp. In at least one embodiment, each warp executes threads. In at least one embodiment, scheduler unit 4504 manages a plurality of different thread blocks, allocating warps to different thread blocks and then dispatching instructions from plurality of different cooperative groups to various functional units (e.g., processing cores 4510, SFUs 4512, and LSUs 4514) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads ( ) function). However, In at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4506 is configured to transmit instructions to one or more of functional units and scheduler unit 4504 includes, without limitation, two dispatch units 4506 that enable two different instructions from same warp to be dispatched during each clock cycle. In at least one embodiment, each scheduler unit 4504 includes a single dispatch unit 4506 or additional dispatch units 4506.

In at least one embodiment, each SM 4500, in at least one embodiment, includes, without limitation, register file 4508 that provides a set of registers for functional units of SM 4500. In at least one embodiment, register file 4508 is divided between each of functional units such that each functional unit is allocated a dedicated portion of register file 4508. In at least one embodiment, register file 4508 is divided between different warps being executed by SM 4500 and register file 4508 provides temporary storage for operands connected to data paths of functional units. In at least one embodiment, each SM 4500 comprises, without limitation, a plurality of L processing cores 4510. In at least one embodiment, SM 4500 includes, without limitation, a large number (e.g., 128 or more) of distinct processing cores 4510. In at least one embodiment, each processing core 4510, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4510 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4510. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 4500 comprises, without limitation, M SFUs 4512 that perform special functions (e.g., attribute evaluation, reciprocal square root, etc.). In at least one embodiment, SFUs 4512 include, without limitation, a tree traversal unit configured to traverse a hierarchical tree data structure. In at least one embodiment, SFUs 4512 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4500. In at least one embodiment, texture maps are stored in shared memory/L1 cache 4518. In at least one embodiment, texture units implement texture operations such as filtering operations using mip-maps (e.g., texture maps of varying levels of detail), in accordance with at least one embodiment. In at least one embodiment, each SM 4500 includes, without limitation, two texture units.

Each SM 4500 comprises, without limitation, N LSUs 4514 that implement load and store operations between shared memory/L1 cache 4518 and register file 4508, in at least one embodiment. Each SM 4500 includes, without limitation, interconnect network 4516 that connects each of functional units to register file 4508 and LSU 4514 to register file 4508 and shared memory/L1 cache 4518 in at least one embodiment. In at least one embodiment, interconnect network 4516 is a crossbar that can be configured to connect any of functional units to any of registers in register file 4508 and connect LSUs 4514 to register file 4508 and memory locations in shared memory/L1 cache 4518.

In at least one embodiment, shared memory/L1 cache 4518 is an array of on-chip memory that allows for data storage and communication between SM 4500 and primitive engine and between threads in SM 4500, in at least one embodiment. In at least one embodiment, shared memory/L1 cache 4518 comprises, without limitation, 128 KB of storage capacity and is in path from SM 4500 to partition unit. In at least one embodiment, shared memory/L1 cache 4518, in at least one embodiment, is used to cache reads and writes. In at least one embodiment, one or more of shared memory/L1 cache 4518, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 4518 enables shared memory/L1 cache 4518 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 4500 to execute program and perform calculations, shared memory/L1 cache 4518 to communicate between threads, and LSU 4514 to read and write global memory through shared memory/L1 cache 4518 and memory partition unit. In at least one embodiment, when configured for general purpose parallel computation, SM 4500 writes commands that scheduler unit 4504 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. graphics card may be configured to interface with a PCIe slot on a motherboard of a desktop computer. In at least one embodiment, PPU may be an integrated graphics processing unit ("iGPU") included in chipset of motherboard.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, deep learning application processor is used to train a machine learning model, such as a neural network, to predict or infer information provided to SM 4500. In at least one embodiment, SM 4500 is used to infer or predict information based on a trained machine learning model (e.g., neural network) that has been trained by another processor or system or by SM 4500. In at least one embodiment, SM 4500 may be used to perform one or more neural network use cases described herein. In at least one embodiment, inference and/or training logic 1015 are used to perform segmentation based on extreme points.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 1404 and/or secondary storage. Computer programs, if executed by one or more processors, enable system 1400 to perform various functions in accordance with at least one embodiment. In at least one embodiment, memory 1404, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1402; parallel processing system 1412; an integrated circuit capable of at least a portion of capabilities of both CPU 1402; parallel processing system 1412; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1400 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1412 includes, without limitation, a plurality of parallel processing units ("PPUs") 1414 and associated memories 1416. In at least one embodiment, PPUs 1414 are connected to a host processor or other peripheral devices via an interconnect 1418 and a switch 1420 or multiplexer. In at least one embodiment, parallel processing system 1412 distributes computational tasks across PPUs 1414 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1414, although such shared memory may incur performance penalties relative to use of local memory and registers resident to a PPU 1414. In at least one embodiment, operation of PPUs 1414 is synchronized through use of a command such as syncthreads ( ) wherein all threads in a block (e.g., executed across multiple PPUs 1414) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:
1. One or more processors, comprising:
   circuitry to:
   cause one or more neural networks to generate a first segmentation of an object depicted in an image based, at least in part, on a plurality of pixels selected randomly from within a user-indicated boundary area that surrounds the object; and
   train the one or more neural networks to generate a second segmentation of the object based, at least in part, on the first segmentation of the object, wherein the one or more neural networks are trained to generate the second segmentation based at least on use of the first segmentation as a supervisory signal.

2. The one or more processors of claim 1, wherein the circuitry is to:
generate one or more scribbles from pairs of a plurality of points indicative of extremities of the object, wherein the one or more scribbles comprise the plurality of pixels, the one or more scribble generated based, at least in part, on a random walker algorithm.

3. The one or more processors of claim 1, wherein the circuitry is further to:
generate the first segmentation from one or more scribbles.

4. The one or more processors of claim 1, wherein the circuitry is further to:
provide the first segmentation and the plurality of pixels to the one or more neural networks for inferring the second segmentation.

5. The one or more processors of claim 1, wherein the circuitry is further to:
perform refinement on the second segmentation.

6. The one or more processors of claim 1, wherein the plurality of pixels corresponds to one or more scribbles between extreme points on a surface of the object as represented in one or more images.

7. A system comprising:
one or more processors to cause one or more neural networks to generate a first segmentation of an object depicted in an image based, at least in part, on a plurality of pixels selected randomly from within a user-indicated boundary area that surrounds the object; and
train the one or more neural networks to generate a second segmentation of the object based, at least in part, on the first segmentation of the object, wherein the one or more neural networks are trained to generate the second segmentation based at least on use of the first segmentation as a supervisory signal; and
one or more memories to store the one or more neural networks.

8. The system of claim 7, wherein the one or more processors are further to be configured to:
generate, based at least in part on a random walker algorithm, one or more scribbles from pairs of a plurality of points indicative of extremities of the object, wherein the one or more scribbles comprise the plurality of pixels.

9. The system of claim 7, wherein the one or more processors are further to be configured to:
generate the first segmentation from at least a subset of one or more scribbles.

10. The system of claim 7, wherein the one or more processors are further to be configured to:
provide the first segmentation and the plurality of pixels to the one or more neural networks for inferring the second segmentation.

11. The system of claim 7, wherein the one or more processors are further to be configured to:
perform refinement on the second segmentation.

12. The system of claim 7, wherein the plurality of pixels corresponds to one or more scribbles between extreme points on a surface of the object as represented in one or more images.

13. A method comprising:
generating a first segmentation of an object depicted in an image based, at least in part, on a plurality of pixels selected randomly from within a user-indicated boundary area that surrounds the object using one or more neural networks, and
training the one or more neural networks to generate a second segmentation of the object based, at least in part, on the first segmentation of the object, wherein the one or more neural networks are trained to generate the second segmentation based at least on use of the first segmentation as a supervisory signal.

14. The method of claim 13, further comprising: generating one or more scribbles from pairs of a plurality of points,
wherein the plurality of pixels is selected based, at least in part, on a random walker algorithm.

15. The method of claim 13, further comprising: generating the first segmentation from at least a subset of the one or more scribbles.

16. The method of claim 13, further comprising: providing the first segmentation and the plurality of pixels to the one or more neural networks for inferring the second segmentation.

17. The method of claim 13, further comprising:
performing refinement on the second segmentation.

18. A non-transitory machine-readable medium having stored thereon a set of instructions, which if performed by one or more processors, cause the one or more processors to at least:
cause one or more neural networks to generate a first segmentation of an object depicted in an image based, at least in part, on a plurality of pixels selected randomly from within a user-indicated boundary area that surrounds the object; and
train the one or more neural networks to generate a second segmentation of the object based, at least in part, on the first segmentation of the object, wherein the one or more neural networks are trained to generate the second segmentation based at least on use of the first segmentation as a supervisory signal.

19. The non-transitory machine-readable medium of claim 18, wherein the instructions if performed further cause the one or more processors to:
generate one or more scribbles from pairs of a plurality of points, wherein the one or more scribbles comprise the plurality of pixels.

20. The non-transitory machine-readable medium of claim 18, wherein the instructions if performed further cause the one or more processors to:
generate the first segmentation from one or more scribbles.

21. The non-transitory machine-readable medium of claim 18, wherein the instructions if performed further cause the one or more processors to:
provide the first segmentation and the plurality of pixels to the one or more neural networks for inferring the second segmentation.

22. The non-transitory machine-readable medium of claim 18, wherein the instructions if performed further cause the one or more processors to:
perform refinement on the second segmentation.

23. A medical imaging system, comprising:
an image capture system for capturing image data including a representation of an object of interest; and
one or more processors to cause one or more neural networks to generate a first segmentation of the object depicted in an image based, at least in part, on a plurality of pixels selected randomly from within a user-indicated boundary area that surrounds the object; and train the one or more neural networks to generate a second segmentation of the object within one or more images captured by the image capture system based, at least in part, on the first segmentation of the object, wherein the one or more neural networks are trained to generate the second segmentation based at least on use of the first segmentation as a supervisory signal.

24. The medical imaging system of claim 23, wherein the one or more processors are further to be configured to:
generate one or more scribbles from pairs of a plurality of points, wherein the one or more scribbles comprise the plurality of randomly selected pixels.

25. The medical imaging system of claim 23, wherein the one or more processors are further to be configured to:
generate the first segmentation from at least a subset of one or more scribbles.

26. The medical imaging system of claim 23, wherein the one or more processors are further to be configured to:
provide the first segmentation and the plurality of pixels to the one or more neural networks for inferring the second segmentation.

27. The medical imaging system of claim 23, wherein the one or more processors are further to be configured to:
perform refinement on the second segmentation.

28. One or more processors comprising:
circuitry to train one or more neural networks to generate a second segmentation of an object based, at least in part, on a first segmentation of the object depicted in an image based, at least in part, on a plurality of pixels selected randomly from within a user-indicated boundary area that surrounds the object, wherein the one or more neural networks are trained to generate the second segmentation based at least on use of the first segmentation as a supervisory signal.

29. The one or more processors of claim 28, wherein the circuitry is to:
generate one or more scribbles from pairs of a plurality of points, wherein the one or more scribbles comprise the plurality of pixels.

30. The one or more processors of claim 28, wherein the circuitry is further to:
generate the first segmentation from at least a subset of one or more scribbles.

31. The one or more processors of claim 28, wherein the circuitry is further to:
provide the first segmentation and the plurality of pixels to the one or more neural networks for inferring the second segmentation.

32. The one or more processors of claim 28, wherein the circuitry is further to:
perform refinement on the second segmentation.

* * * * *